US012801685B2

(12) United States Patent
Blanchard et al.

(10) Patent No.: US 12,801,685 B2
(45) Date of Patent: *Nov. 17, 2026

(54) TECHNIQUES FOR GENERATING SYNTHETIC DATA

(71) Applicant: SAS Institute Inc., Cary, NC (US)

(72) Inventors: Robert Winston Blanchard, San Diego, CA (US); Ruiwen Zhang, Cary, NC (US); William Nadolski, Marysville, OH (US); Vrushali Sawant, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,543

(22) Filed: Dec. 3, 2024

(65) Prior Publication Data

US 2025/0322260 A1 Oct. 16, 2025

Related U.S. Application Data

(60) Provisional application No. 63/634,354, filed on Apr. 15, 2024.

(51) Int. Cl.
*G06F 17/11* (2006.01)
*G06F 17/18* (2006.01)
(Continued)

(52) U.S. Cl.
CPC ............ *G06F 17/11* (2013.01); *G06F 18/241* (2023.01); *G06N 3/0985* (2023.01); *G06N 5/01* (2023.01); *G06N 20/00* (2019.01); *G06F 17/18* (2013.01)

(58) Field of Classification Search
CPC ............................ G06N 3/0985; G06F 18/241
See application file for complete search history.

(56) References Cited

U.S. PATENT DOCUMENTS 11,416,712 B1 8/2022 Dizche et al.
11,797,705 B1 * 10/2023 Voinea ............... G06F 21/6245
(Continued)

OTHER PUBLICATIONS

SAS Help Center: Gaussian Mixture Model, Mar. 2024, 1 page.
(Continued)

*Primary Examiner* — Matthew Ell
*Assistant Examiner* — Ishan Moundi
(74) *Attorney, Agent, or Firm* — Padowithz Alce; Quintin Scheitlin; Alce PLLC

(57) ABSTRACT

A system and method include generating synthetic data by generating a first set of hyperparameters for a first trained machine learning model and a second set of hyperparameters for a second trained machine learning model, generating a plurality of synthetic data vectors using the first and second trained machine learning models, computing an error function for the first and second set of hyperparameters using a third machine learning model, computing an objective function value, responsive to determining that the objective function value is not an optimal value, updating the first set of hyperparameters and the second set of hyperparameters or responsive to determining that the objective function value is an optimal value outputting the plurality of synthetic data vectors as a set of synthetic data.

22 Claims, 32 Drawing Sheets

(51) Int. Cl.

| | |
|---|---|
| ***G06F 18/241*** | (2023.01) |
| ***G06N 3/0985*** | (2023.01) |
| ***G06N 5/01*** | (2023.01) |
| ***G06N 20/00*** | (2019.01) |

(56) References Cited

U.S. PATENT DOCUMENTS

| | | | | |
|---|---|---|---|---|
| 12,119,848 | B1 * | 10/2024 | Li | H03M 7/6011 |
| 12,199,643 | B1 | 1/2025 | Li | |
| 12,236,699 | B1 * | 2/2025 | Huang | G06V 30/2552 |
| 2021/0295205 | A1 | 9/2021 | Ranco | |
| 2021/0374128 | A1 | 12/2021 | El Emam | |
| 2023/0044378 | A1 | 2/2023 | Walters | |
| 2023/0274183 | A1 * | 8/2023 | Mauser | G06F 21/6245 706/12 |
| 2023/0409607 | A1 | 12/2023 | Pratik | |
| 2024/0071367 | A1 * | 2/2024 | Bera | G10L 15/063 |
| 2024/0144141 | A1 * | 5/2024 | Cella | G06Q 30/0206 |
| 2024/0330404 | A1 | 10/2024 | Lefebvre | |
| 2024/0354647 | A1 | 10/2024 | Rashidi | |
| 2024/0391608 | A1 | 11/2024 | Chen | |
| 2025/0068933 | A1 | 2/2025 | Zhang et al. | |
| 2025/0111273 | A1 | 4/2025 | Rosenoer | |
| 2025/0124332 | A1 | 4/2025 | Nakamura Sakai | |

OTHER PUBLICATIONS

"Marginal Distribution: Definition, Examples," Statistics How to, 5 pages, retrieved Aug. 19, 2024, https://www.statisticshowto.com/probability-and-statistics/statistics-definitions/marginal-distribution/.

Torfi, et al., "CorGAN: Correlation-Capturing Convolutional Generative Adversarial Networks for Generating Synthetic Healthcare Records," Mar. 4, 2020, 7 pages.

Blanchard, Robert, "Generating Better Synthetic Data," SAS Explore, Sep. 29, 2023, 22 pages.

SAS Data Science Blog, "Maximize model performance without maximizing effort," Apr. 8, 2020, 7 pages.

SAS Help Center: The CPCTGAN Model, Mar. 14, 2024, 1 page.

Non-Final Office Action in U.S. Appl. No. 18/969,422 dated Jan. 31, 2025, 13 pages.

Non-Final Office Action in U.S. Appl. No. 18/969,496 dated Mar. 25, 2025, 50 pages.

Non-Final Office Action in U.S. Appl. No. 18/969,588 dated Mar. 26, 2025, 53 pages.

Notice of Allowance in U.S. Appl. No. 18/969,422 dated May 6, 2025, 9 pages.

Yingzhou Lu, "Machine Learning for Synthetic Data Generation: A Review," arXiv.Org, Feb. 8, 2023.

* cited by examiner

500

1000

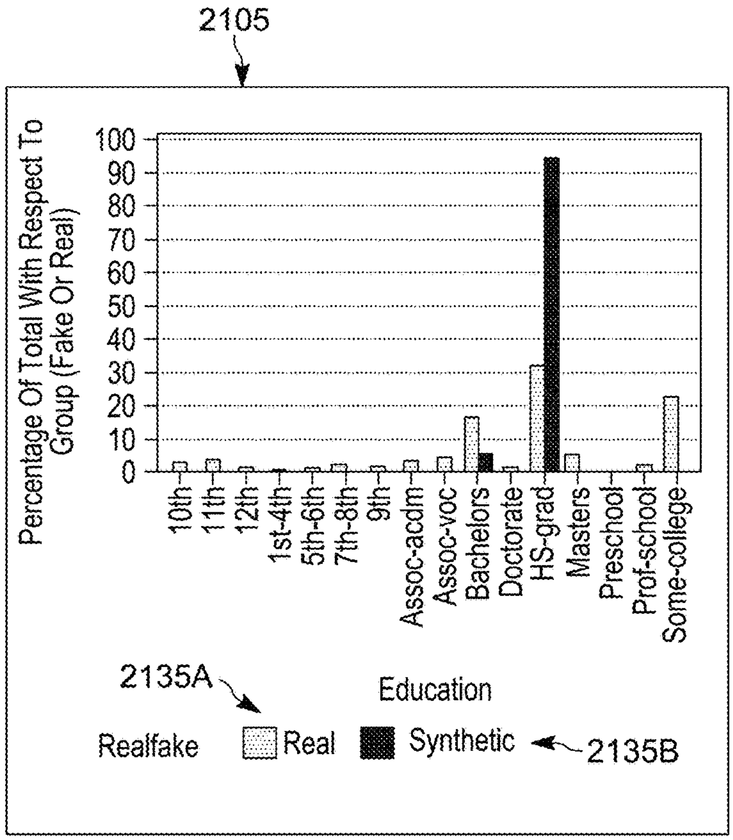
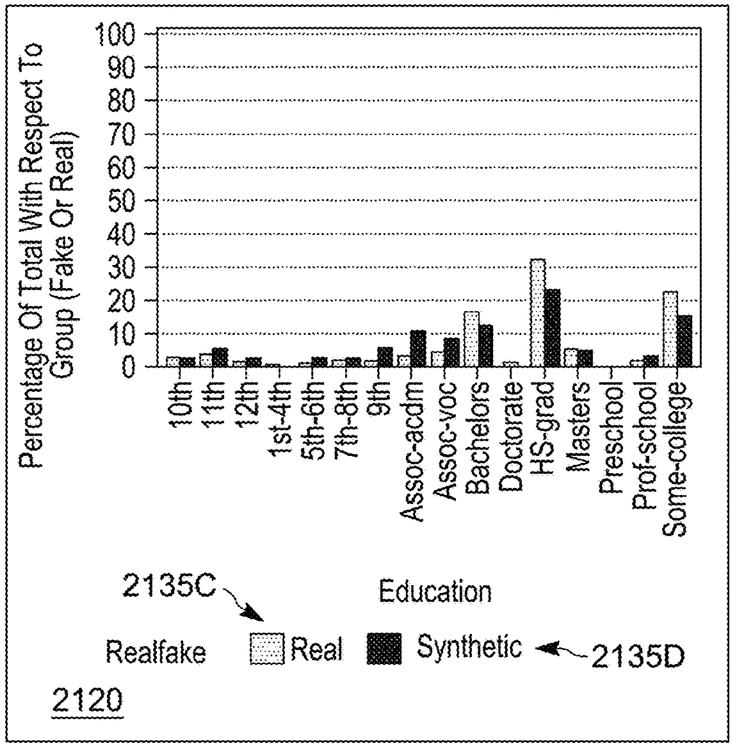
FIG. 21 (Continued)

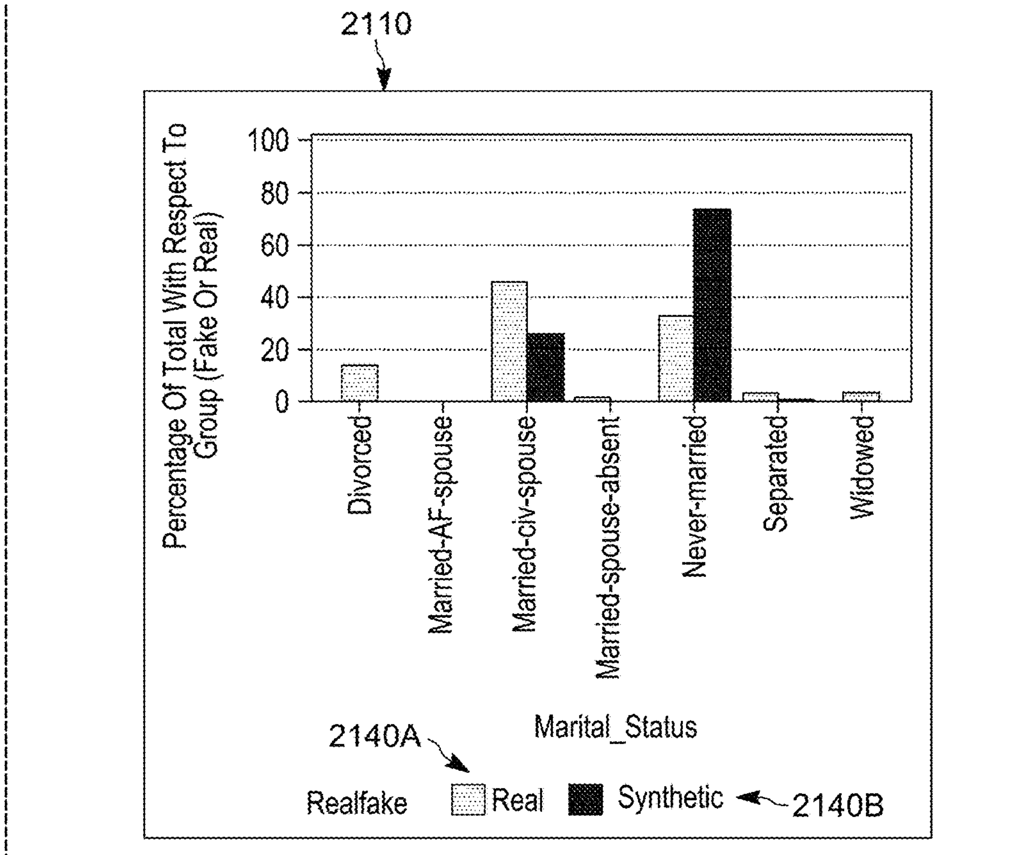
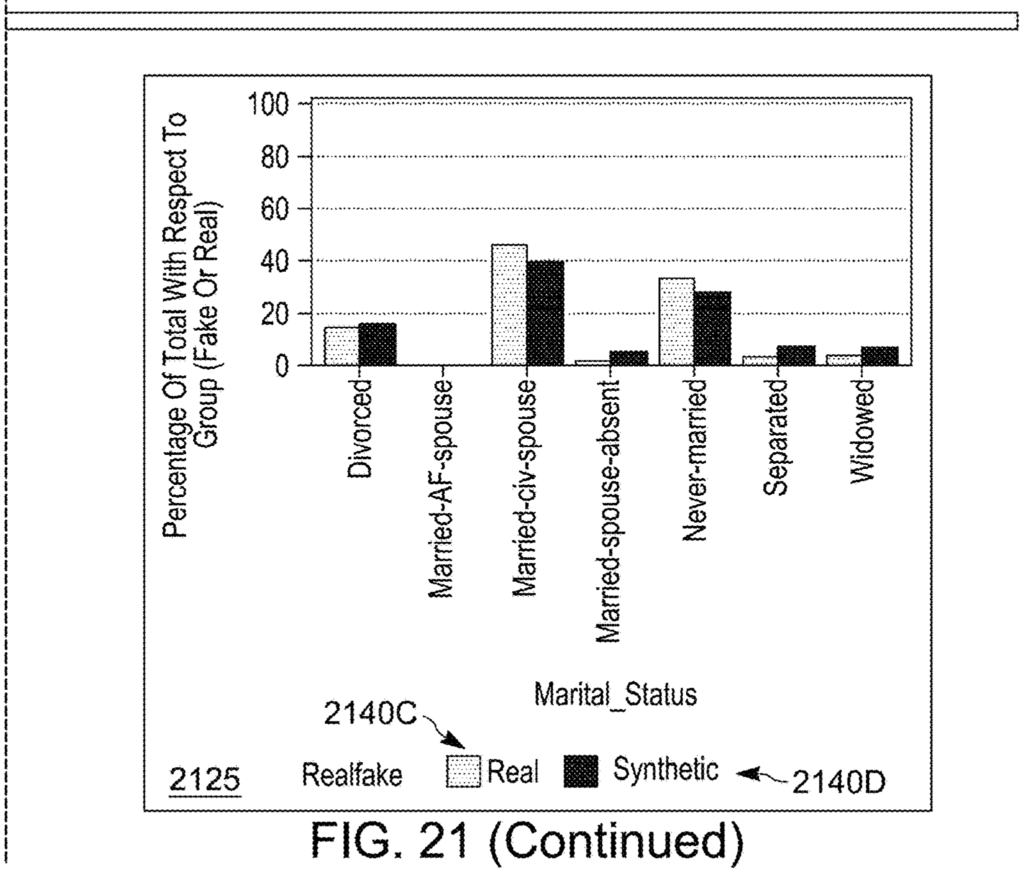
FIG. 21 (Continued)

2205

2305 Real Data Only

2310 Baseline GAN + Real Data

2315 Proposed Approach + Real Data

2300

| Dataset | Model Type | F1 Score (2305 Real Data Only) | F1 Score (2310 Baseline GAN + Real Data) | F1 Score (2315 Proposed Approach + Real Data) |
|---|---|---|---|---|
| Dataset 1 (PVA97nk) | Weighted Bayesian Network | 0.198805 | 0.197824 | 0.198983 |
| | Weighted Random Forest | 0.196644 | 0.20027 | 0.202393 |
| | Weighted Gradboost Forest | 0.200897 | 0.200415 | 0.207852 |
| Dataset 2 (Census) | Weighted Support Vector Machine | - | 0.8306 | 0.8135 |
| | Weighted Random Forest | - | 0.8464 | 0.8477 |
| 2320 | Weighted Gradboost Forest | - | 0.8628 | 0.8699 |

FIG. 23

2400

| Prediction Bias Parity: Variable RACE | | | | |
|---|---|---|---|---|
| | Random Forest | Logistic Regression | SVM | Gradient Boosting |
| Baseline Approach | .7952 | .8455 | .4095 | .8075 |
| Proposed Approach | .1075 | .1314 | .00007 | .1531 |

FIG. 24

TECHNIQUES FOR GENERATING SYNTHETIC DATA

CROSS-REFERENCE TO RELATED APPLICATIONS

This application is a non-provisional of U.S. provisional application No. 63/634,354, filed on Apr. 15, 2024, the entirety of which is incorporated by reference herein.

BACKGROUND

Synthetic data, also referred to as artificial, simulated, or fake data, is data that is generated using mathematical or computational models. Real data or original data, in contrast, is data that is gathered from observations, user inputs, databases, sensors, or other applications or events occurring in the real world. Availability of real data may be limited for any of a variety of reasons. Thus, synthetic data may provide a powerful tool for studying complex systems and behaviors, training machine learning models, or generally improving decision making capabilities. To be useful, synthetic data is often desired to mimic real data, or at least have similar properties as the real data. However, current techniques of generating synthetic data are limited in how closely they mimic real data.

SUMMARY

In accordance with at least some aspects of the present disclosure, a non-transitory computer-readable medium having computer-readable instructions stored thereon is disclosed. The computer-readable instructions when executed by a processor cause the processor to (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) generate a plurality of cluster centroids from the set of real data and the values of the first set of hyperparameters using the first trained machine learning model; (D) generate a plurality of synthetic data vectors based on the plurality of cluster centroids, the values of the second set of hyperparameters, and the set of real data using the second trained machine learning model; (E) compute an error function based on the plurality of synthetic data vectors for the first set of hyperparameters and the second set of hyperparameters based on predictions made by a third machine learning model, wherein the error function comprises a combination of a similarity error function indicative of a difference in marginal probability distribution between the plurality of synthetic data vectors and the set of real data, a prediction error function indicative of a difference in conditional probability distribution between the plurality of synthetic data vectors and the set of real data, and a bias assessment error function indicative of bias in the first trained machine learning model or the second trained machine learning model; (F) compute an objective function value based on at least one of the similarity error function, the prediction error function, or the bias assessment error function; (G) determine that the objective function is not an optimal value; (H) responsive to determining that the objective function value is not an optimal value, update the values of the first set of hyperparameters and the values of the second set of hyperparameters and repeat (B)-(G), or responsive to determining that the objective function value is an optimal value, execute (H); and (I) output the plurality of synthetic data vectors as a set of synthetic data.

In accordance with at least some other aspects of the present disclosure, a system is disclosed. The system includes a memory having computer-readable instructions stored thereon and a processor that executes the computer-readable instructions to (A) generate a first set of hyperparameters for a first trained machine learning model and a second set of hyperparameters for a second trained machine learning model; (B) input the first set of hyperparameters and a set of real data into the first trained machine learning model and the second set of hyperparameters and the set of real data into the second trained machine learning model; (C) generate a plurality of cluster centroids from the set of real data and the first set of hyperparameters using the first trained machine learning model; (D) generate a plurality of synthetic data vectors based on the plurality of cluster centroids, the second set of hyperparameters, and the set of real data using the second trained machine learning model; (E) compute an error function based on the plurality of synthetic data vectors for the first set of hyperparameters and the second set of hyperparameters based on predictions made by a third machine learning model, wherein the error function comprises a combination of a similarity error function indicative of a difference in marginal probability distribution between the plurality of synthetic data vectors and the set of real data, a prediction error function indicative of a difference in conditional probability distribution between the plurality of synthetic data vectors and the set of real data, and a bias assessment error function indicative of bias in the first trained machine learning model or the second trained machine learning model; (F) compute an objective function value based on at least one of the similarity error function, the prediction error function, or the bias assessment error function; (G) determine that the objective function is not an optimal value; (H) responsive to determining that the objective function value is not an optimal value, update the values of the first set of hyperparameters and the values of the second set of hyperparameters and repeat (B)-(G), or responsive to determining that the objective function value is an optimal value, execute (H); and (I) output the plurality of synthetic data vectors as a set of synthetic data.

In accordance with at least some other aspects of the present disclosure, a method is disclosed. The method includes (A) generating, by a processor executing computer-readable instructions stored on a memory, a first set of hyperparameters for a first trained machine learning model and a second set of hyperparameters for a second trained machine learning model; (B) inputting, by the processor, the first set of hyperparameters and a set of real data into the first trained machine learning model and the second set of hyperparameters and the set of real data into the second trained machine learning model; (C) generating, by the processor, a plurality of cluster centroids from the set of real data and the first set of hyperparameters using the first trained machine learning model; (D) generating, by the processor, a plurality of synthetic data vectors based on the plurality of cluster centroids, the second set of hyperparameters, and the set of real data using the second trained machine learning model; (E) computing, by the processor, an error function for the first set of hyperparameters and the second set of hyperparameters based on the plurality of synthetic data vectors using a third machine learning model, wherein the error function comprises a combination of a similarity error function indicative of a difference in marginal probability distribution between the plurality of synthetic data vectors and the set of real data, a prediction error function indicative of a difference in conditional probability distribution between the plurality of synthetic data vectors and the set of real data, and a bias assessment error function indicative of a bias in the first trained machine learning model or the second trained machine learning model; (F) computing, by the processor, an objective function value based on at least one of the similarity error function, the prediction error function, or the bias assessment error function; (G) determining, by the processor, that the objective function is not an optimal value; (H) responsive to determining that the objective function value is not an optimal value, updating, by the processor, the first set of hyperparameters and the second set of hyperparameters and repeat (B)-(H), or responsive to determining that the objective function value is an optimal value, executing, by the processor, (I); and (I) outputting, by the processor, the plurality of synthetic data vectors as a set of synthetic data.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIG. 23 illustrates example tables comparing synthetic data generated using the proposed approach with synthetic data generated using a conventional approach, according to embodiments of the present technology.

FIG. 24 illustrates an example table comparing synthetic data generated using the proposed approach with synthetic data generated using a conventional approach, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
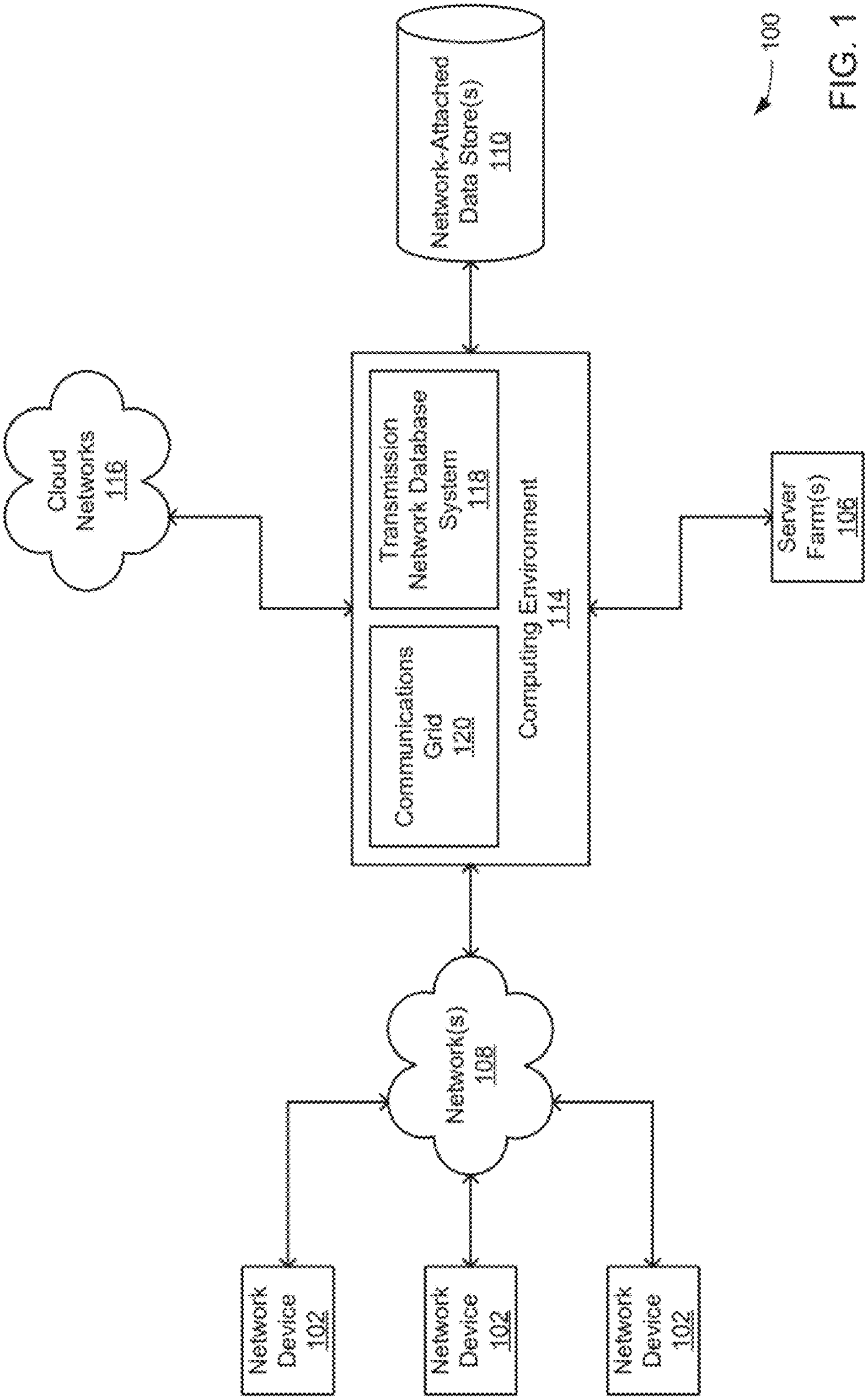
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
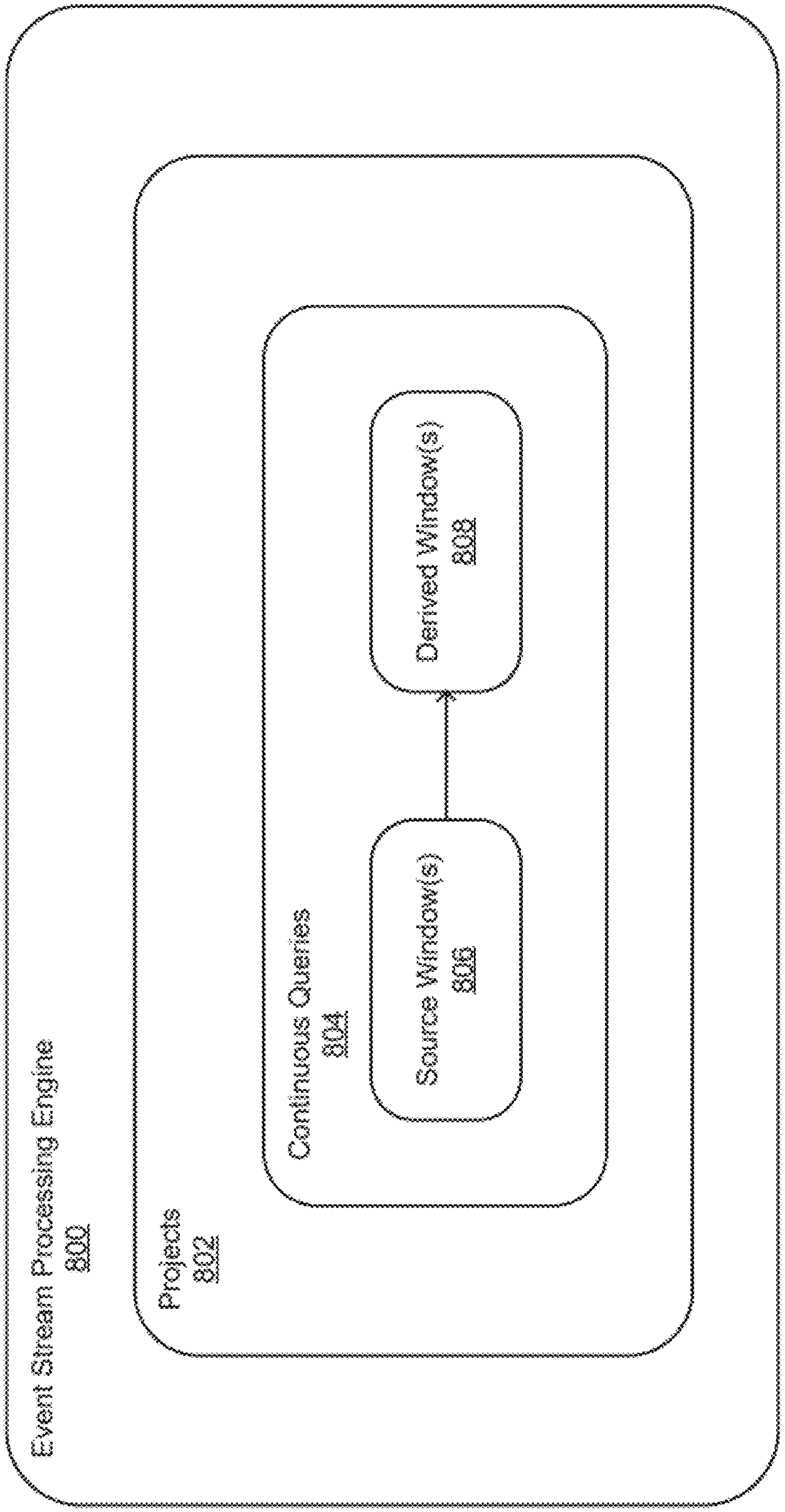
FIG. 8 illustrates a block diagram including components of an Event Stream Processing Engine (ESPE), according to embodiments of the present technology.
Figure 9:
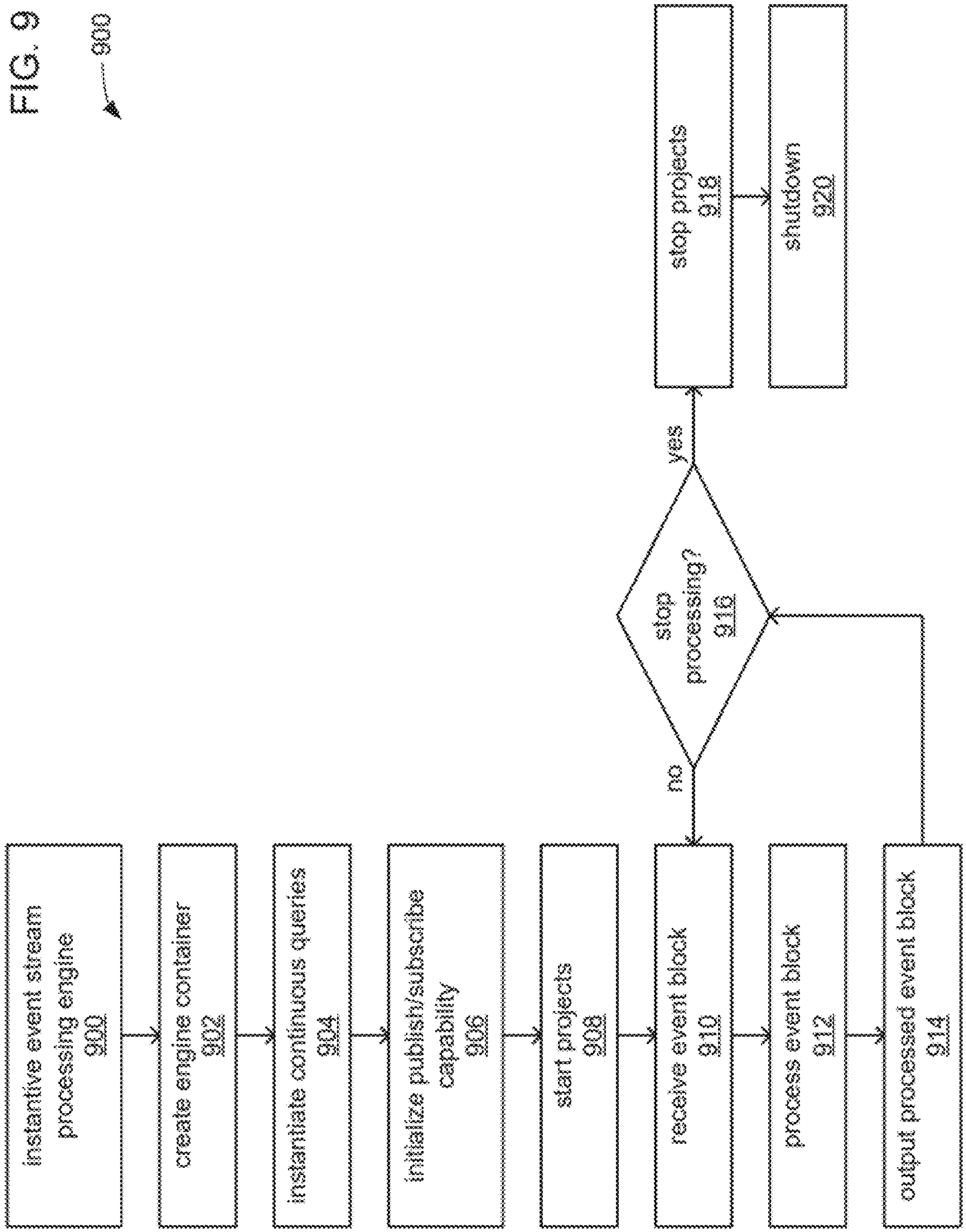
FIG. 9 illustrates a flow chart showing an example process including operations performed by an event stream processing engine, according to some embodiments of the present technology.
Figure 10:
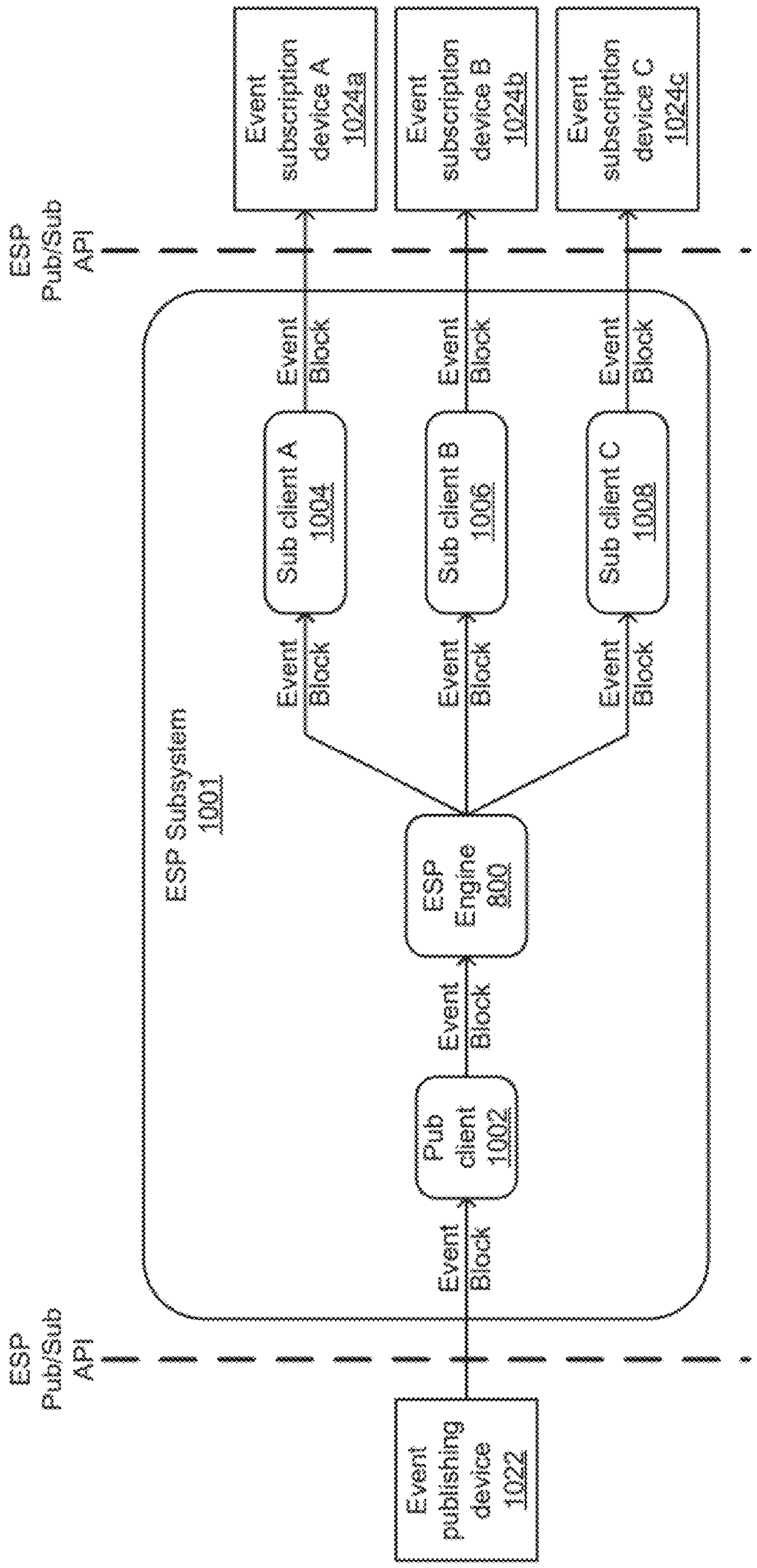
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
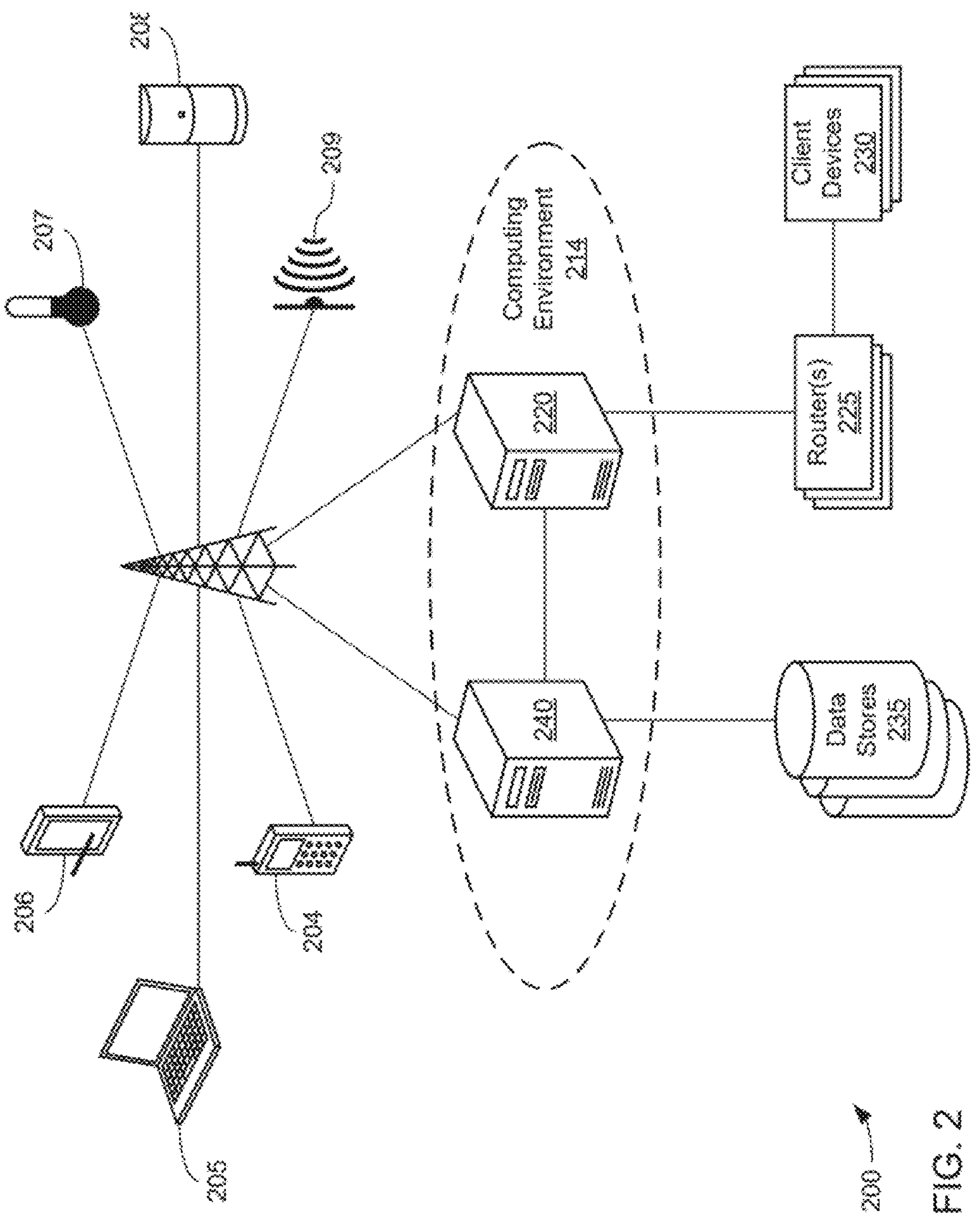
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
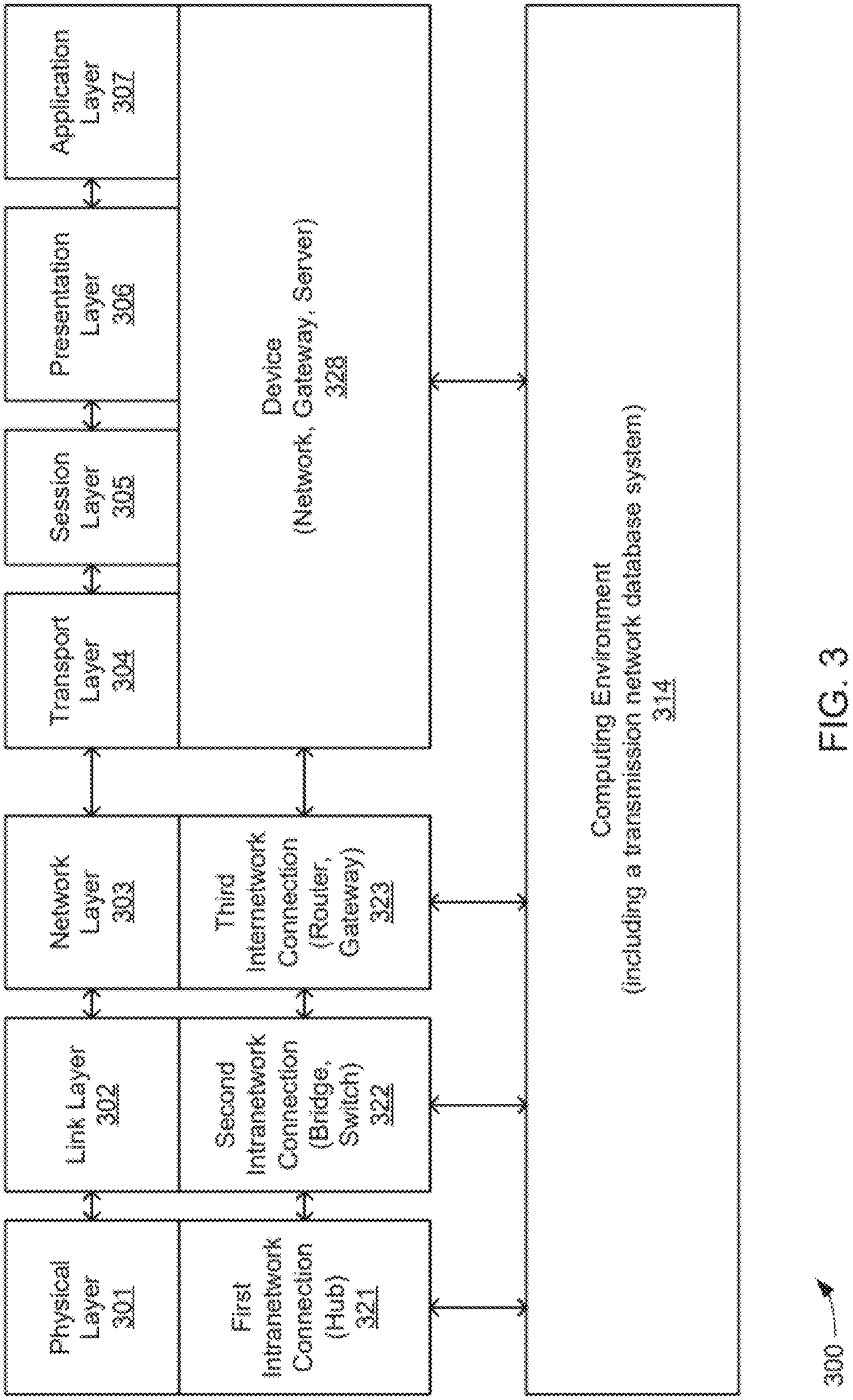
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in the same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
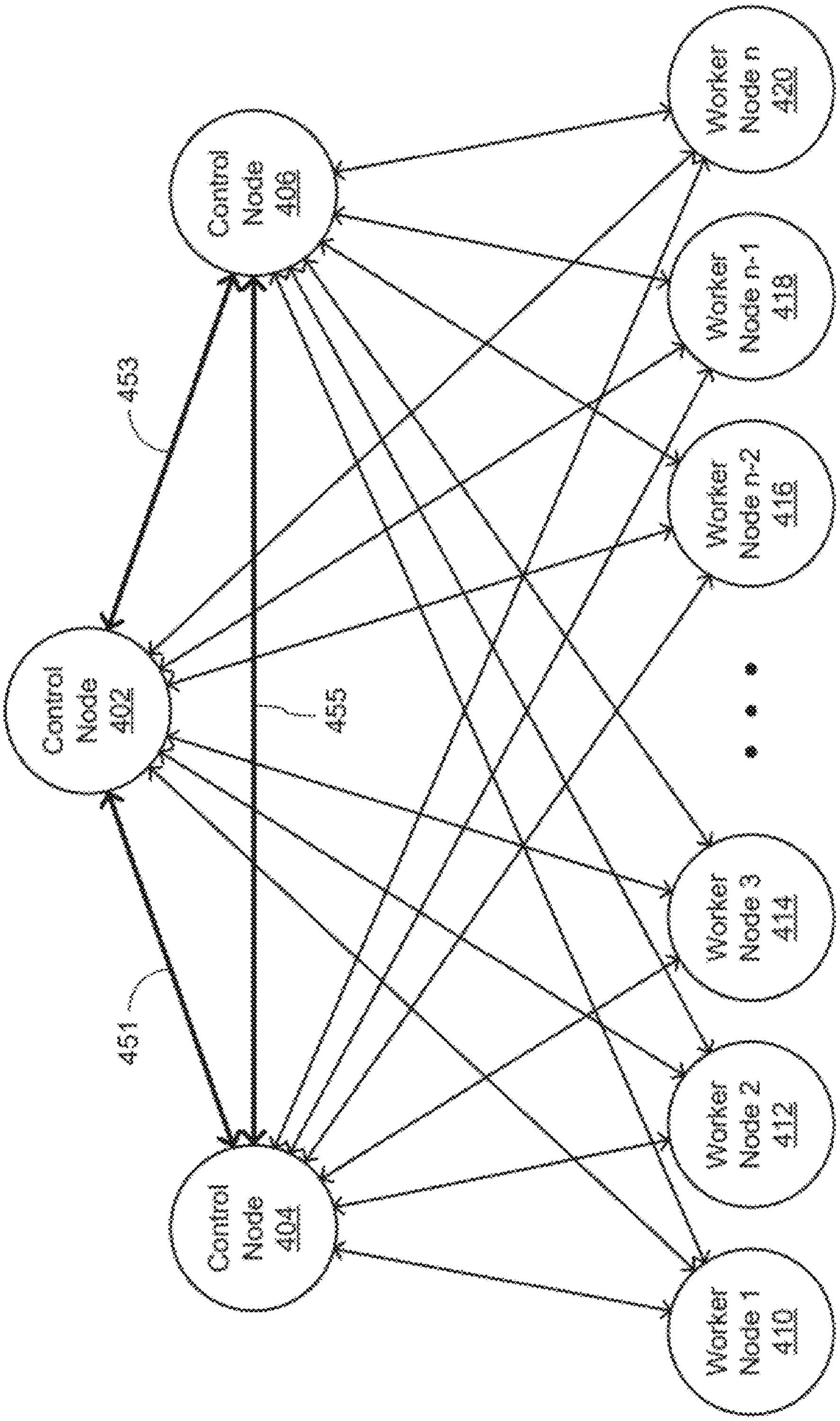
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
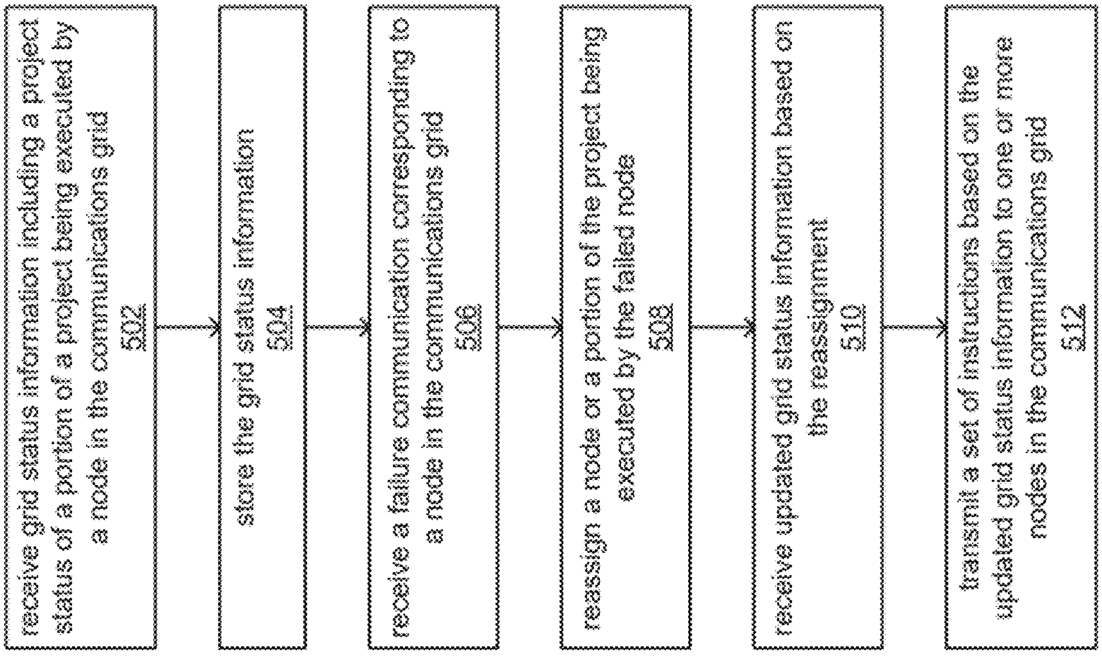
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
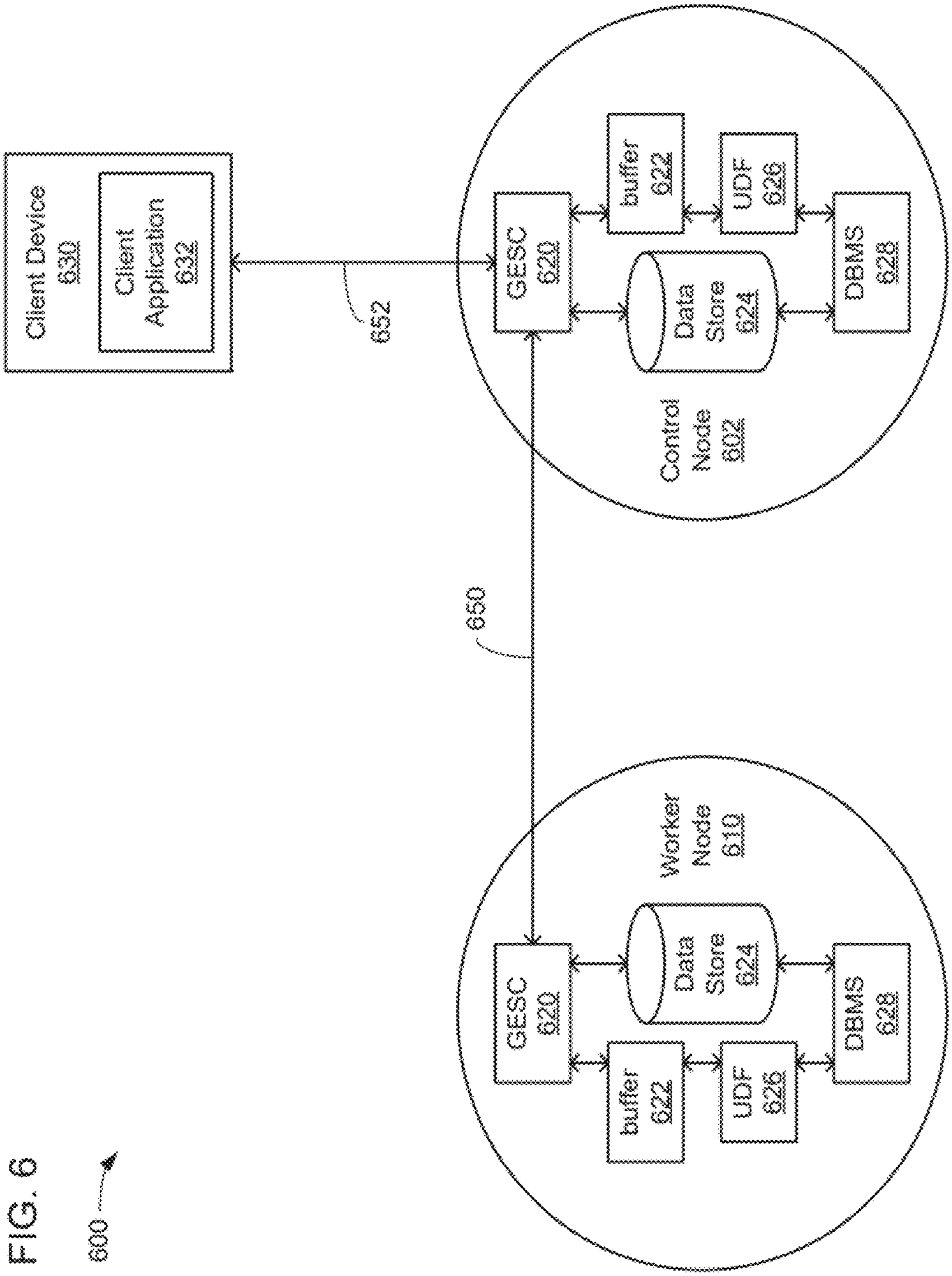
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
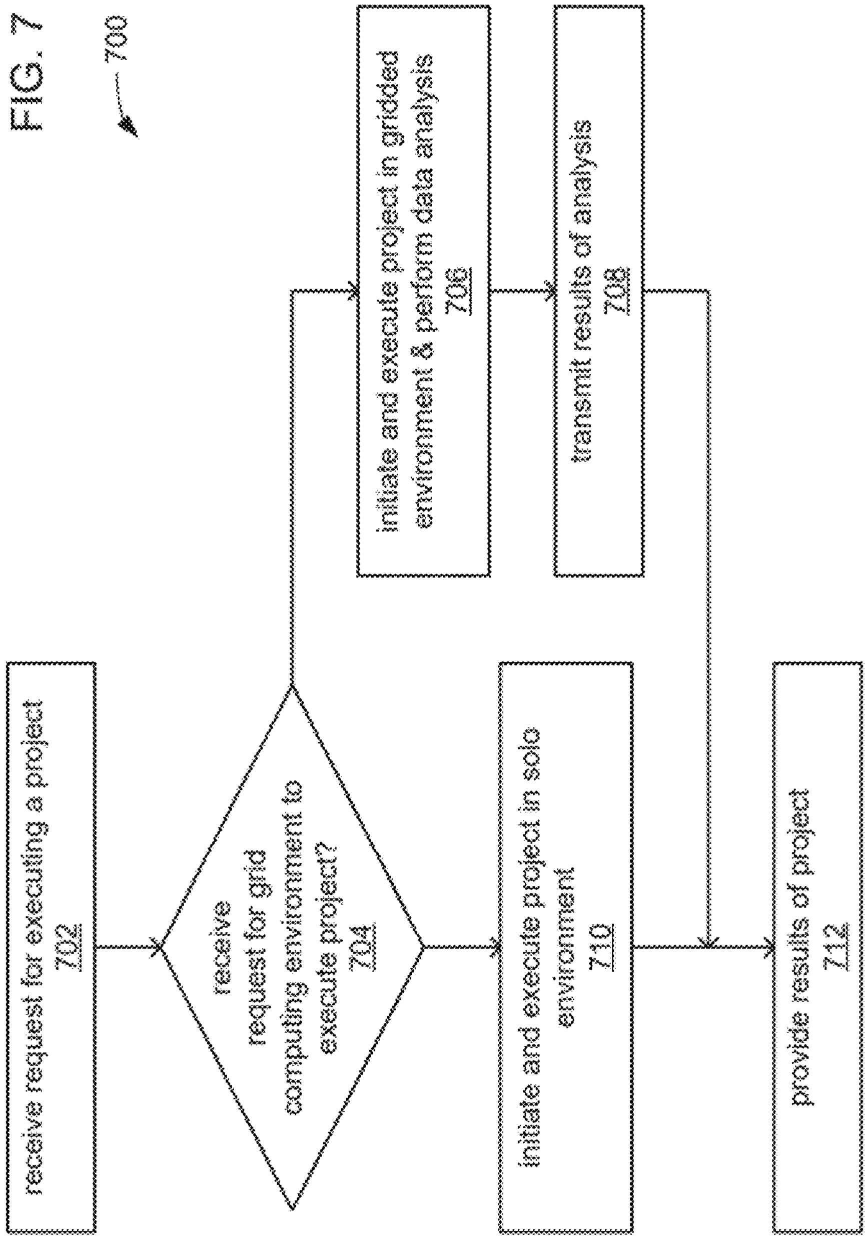
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
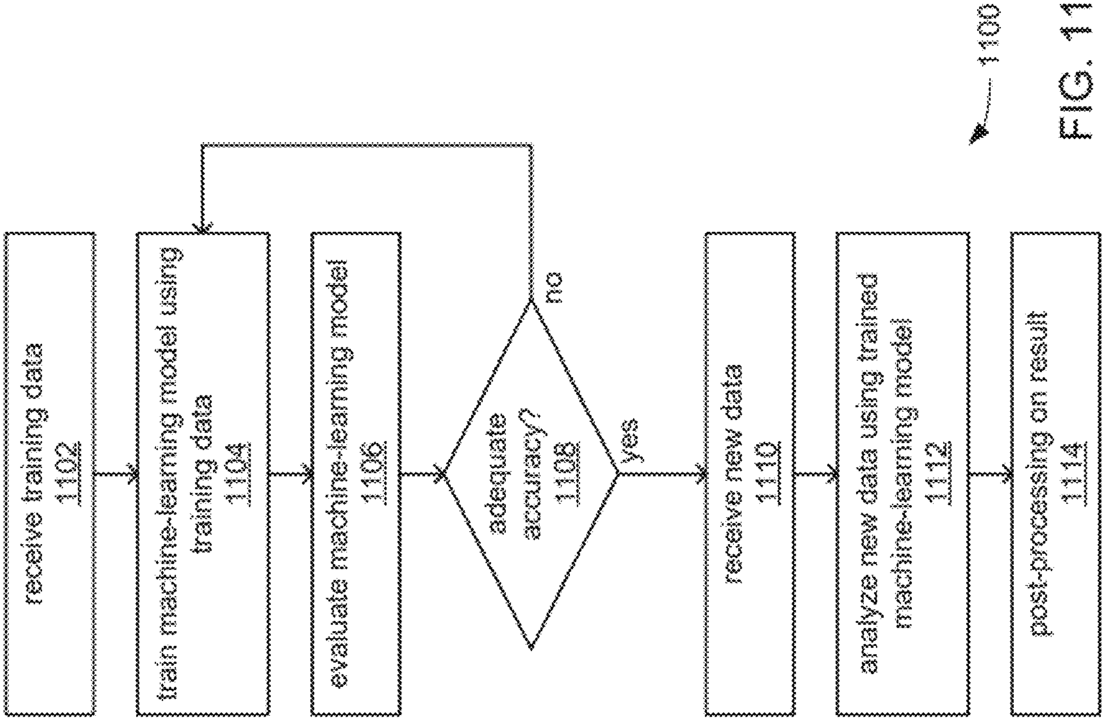
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
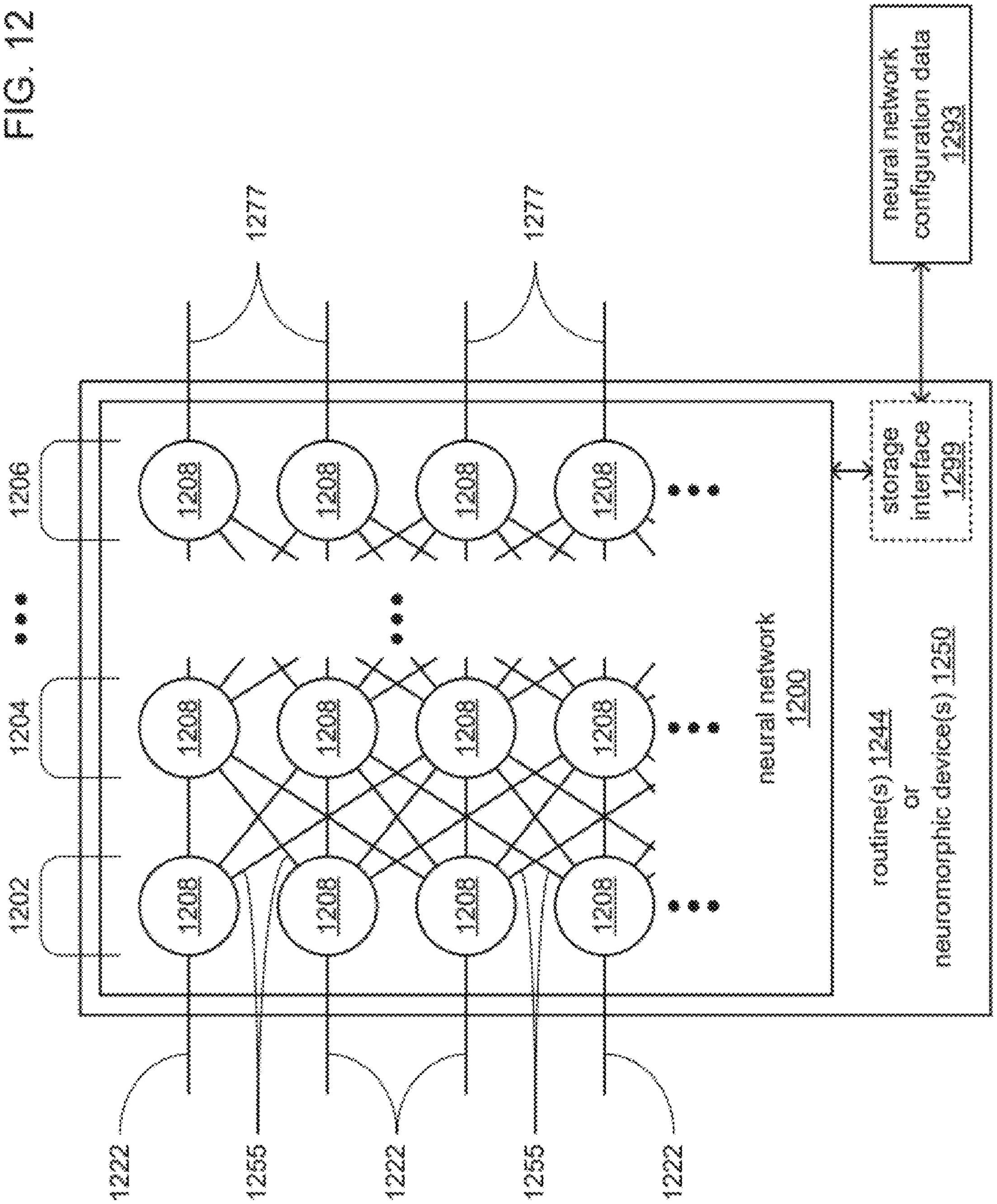
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a “forward” direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a “backward” direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
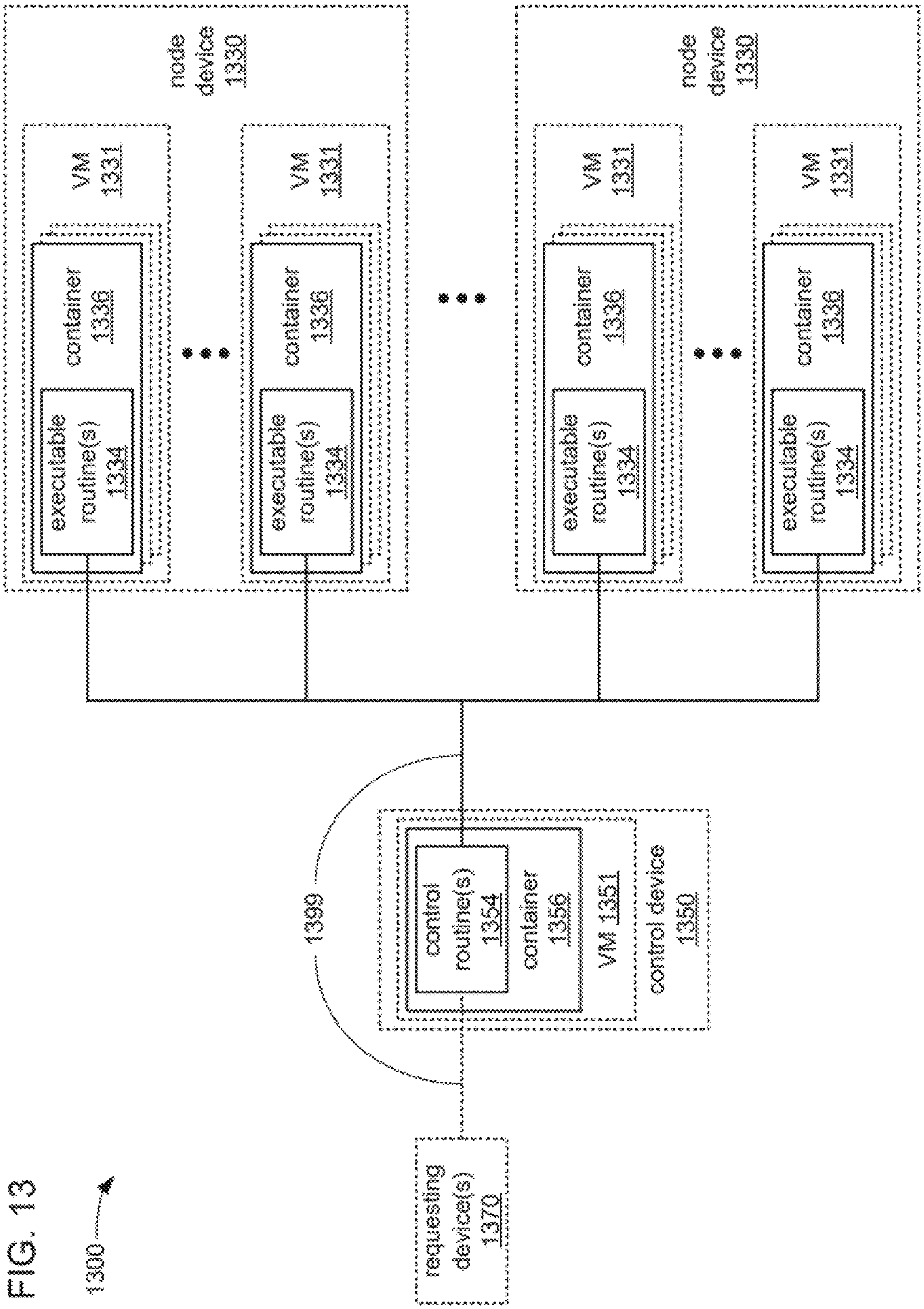
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to generating synthetic data. Synthetic data is data that has been created artificially using computer models, computer simulation, or algorithms. Synthetic data may be needed for a variety of reasons. For example, synthetic data may be needed for internal/external privacy controls to restrict access, usage, and sharing of real data. Synthetic data may be needed because collection of real data may be prohibitively expensive or difficult. Real data may need to be labeled manually, which may be a highly time intensive and error prone process. Undesirable bias or imbalance may also exist in the real data. Moreover, for certain rare, unprecedented scenarios, minimal to no real data may even exist. In each of the above situations, synthetic data may be needed to supplement real data. Real data is data that may be collected from experiments, observations, monitoring real world mechanisms, etc. Synthetic data may be used in addition to, or instead of, real data in any application in which real data is used. For example, in some embodiments, the synthetic data may be used in addition to, or instead of, real data to train machine learning models, validate models and algorithms, generate hypotheses, or otherwise enable decision making.

Synthetic data may be generated from real data. To be useful, synthetic data may be desired to mimic real data as closely as possible. Closeness between the synthetic data and the real data may be measured in many different ways. For example, one way to measure closeness between real data and synthetic data is by way of a marginal probability distribution. A marginal probability distribution of various variables in a set of data is a probability distribution without reference to the values of other variables in the set of data. In other words, if A and B are discrete random variables and $f(x, y)$ is the value of the joint probability distribution at (x, y), the marginal probability distribution of variable X may be given by a summation function as $\Sigma_X f(x, y)$ and the marginal probability distribution of variable Y may be given as $\Sigma_Y f(x, y)$. For synthetic data to look similar to real data, the marginal probability distributions of synthetic data may be similar to the marginal probability distribution of the real data. In other words, the marginal probability distribution of the synthetic data may be desired to closely resemble the marginal probability distribution of the real data such that the synthetic data looks similar to the real data. The closer the marginal probability distribution of the synthetic data to the marginal probability distribution of the real data, the closer is the synthetic data to the real data.

Another mechanism to measure closeness between the real data and synthetic data is a conditional probability distribution. Conditional probability distribution may indicate if synthetic data does a better job of improving outcomes for a task. In other words, a conditional probability distribution may help with determining if the synthetic data is able to solve a problem at least the same as, if not better than, the real data. Conditional probability distribution describes the probability that a randomly selected variable from a subset of a set of variables has a given characteristic.

In other words, conditional probability distribution describes the probability of an outcome (e.g., target) given a set of inputs. When the synthetic data closely resembles real data, the conditional probability distributions of the synthetic data resembles the conditional probability distribution of the real data. The closer the conditional probability distribution of the synthetic data to the conditional probability distribution of the real data, the closer the synthetic data to the real data.

In addition to having synthetic data closely resemble real data, in some embodiments, mitigating bias in the machine learning model that generates the synthetic data may be desired. Bias refers to the errors in the outcomes of a machine learning model. Bias may be attributed to prejudiced assumptions made by the machine learning model. Bias may lead to generation of skewed or unfair outcomes. Bias may also refer to how well or how objectively a machine learning model captures relationships between variables. Bias may occur, in some cases, due to biased or skewed training data used to train a machine learning model. Less bias in a machine learning model may be desirable. Bias may be measured by way of one or more bias or fairness metrics such as a demographic parity metric, a predictive parity metric, an equal accuracy metric, an equalized odds metric, or an equal opportunity metric. In some cases, other or additional bias metrics may be used. Thus, one or more of the bias metrics computed from the synthetic data may be used to adjust the bias in the machine learning model that generates the synthetic data.

Existing techniques for generating synthetic data that resemble real data are inadequate. In some embodiments, a Synthetic Minority Oversampling Technique (SMOTE) may be used to generate simulated data. SMOTE performs data augmentation by creating synthetic data points from real data. Another technique for generating synthetic data includes a generative machine learning model, such as a Gaussian Mixture Model (GMM) or a Generative Adversarial Network (GAN) (e.g., tabular GAN or TGAN). Synthetic data produced by these conventional approaches may not closely resemble the real data (e.g., in marginal probability distribution, conditional probability distribution), may have significant bias, and therefore, produce predictions that are less accurate and have more bias. Thus, the conventional mechanisms of generating synthetic data have technical problems.

The present disclosure provides technical solutions to address the technical problems above. Specifically, the present disclosure provides technical solutions for generating high quality synthetic data that closely resembles the real data from which the synthetic data is generated. The synthetic data generated using the proposed approach has a conditional probability distribution that closely resembles the conditional probability distribution of the real data. The synthetic data generated using the proposed approach also has a marginal probability distribution that closely resembles the marginal probability distribution of the real data. The synthetic data generated using the proposed approach also mitigates bias in the data.

In particular, to generate synthetic data whose marginal probability distribution closely resembles the marginal probability distribution of the real data, the present disclosure provides an adjudicator. The output from the adjudicator is used to compare the real data and the synthetic data. The adjudicator includes a machine learning model that seeks to decern real data distributions from synthetic data distributions. The machine learning model may use univariate or multivariate examinations of the synthetic data. To compare the real and synthetic data, the real data is combined with the synthetic data and a machine learning model is trained to discern real data from synthetic data. The objective is to maximize this machine learning model's error, meaning the model has trouble distinguishing real data from synthetic data, thereby generating synthetic data that more closely mirrors the marginal probability distribution of the real data.

To generate synthetic data whose conditional probability distribution closely mirrors the conditional probability distribution of the real data, the present disclosure provides another adjudicator. The adjudicator, a machine learning model, is trained to learn correlations between the independent (input) and dependent (target) variables of the synthetic data. The trained model is then used to inference/score/predict the outcome of the real training data, given the real inputs. The goal is to minimize the model's error predicting the outcome on the real data, after only learning the input and output relationships on the synthetic data, thereby generating synthetic data that may solve a prediction problem more accurately.

To mitigate bias for a specified one or more sensitive variables in the machine learning model that generates the synthetic data, the present disclosure provides another adjudicator. The adjudicator, a machine learning model, is trained to learn correlations between the independent (input) and dependent (target) variables of the synthetic data. Various fairness metrics may be computed from the synthetic data and evaluated for bias.

Synthetic data as provided herein cannot be generated in the human mind or using pen and paper. In particular, for real-world applications, thousands or millions of synthetic data vectors are generated. A human mind is not capable of practically generating such thousands or millions of synthetic data vectors in a reasonable amount of time. These thousands or millions of synthetic data vectors cannot be generated using open and paper either. Moreover, a human mind (or pen/paper) is incapable of practically generating synthetic data that closely resembles a marginal probability distribution and a conditional probability distribution of real data. Further, because the bias is determined based on outcomes of a machine learning model, even if a human mind (or pen/paper) could generate synthetic data (which it cannot), the human mind (or pen/paper) cannot generate synthetic data that mitigates bias in any machine learning model. Further, the mechanism described herein requires training and/or executing multiple machine learning models. A human mind cannot execute or train any machine learning model. Training or executing a machine learning model cannot occur on pen and paper either. Moreover, as described herein, the executing and/or training the multiple machine learning models is repeated multiple times. A human mind (or pen/paper) is incapable of repeatedly training and/or executing the multiple machine learning models. A human mind (or pen/paper) is also incapable of generating any hyperparameters.

Moreover, the present disclosure is not directed to any mathematical concepts. In particular, the present disclosure is not directed to any mathematical relationships, mathematical formulas or equations, or mathematical calculations. Rather, the present disclosure only involves or is based on mathematical concepts. Additionally, the present disclosure is integrated into a practical application. In particular, the proposed mechanism of (A) generating values of a first set of hyperparameters for a first trained machine learning model and values of a second set of hyperparameters for a second trained machine learning model, (B) inputting the values of the first set of hyperparameters and a set of real data into the first trained machine learning model and the values of the second set of hyperparameters and the set of real data into the second trained machine learning model, (C) generating a plurality of cluster centroids from the set of real data and the values of the first set of hyperparameters using the first trained machine learning model, (D) generating a plurality of synthetic data vectors based on the plurality of cluster centroids, the values of the second set of hyperparameters, and the set of real data using the second trained machine learning model, (E) computing an error function based on the plurality of synthetic data vectors for the first set of hyperparameters and the second set of hyperparameters based on predictions made by a third machine learning model, (F) computing an objective function value based on at least one of the similarity error function, the prediction error function, or the bias assessment error function, (G) determining that the objective function is not an optimal value, (H) responsive to determining that the objective function value is not an optimal value, updating the values of the first set of hyperparameters and the values of the second set of hyperparameters and repeating (B)-(G), or responsive to determining that the objective function value is an optimal value, execute (H), and (I) outputting the plurality of synthetic data vectors as a set of synthetic data is rooted in computer technology and improves the technology of generating synthetic data. In particular, as discussed in detail below, the synthetic data generated by the present disclosure is superior to the synthetic data generated by conventional mechanisms.

Thus, the present disclosure enables synthetic data generation that closely resembles real data, makes accurate predictions, and reduces bias for desired sensitive variables.

Figure 14:
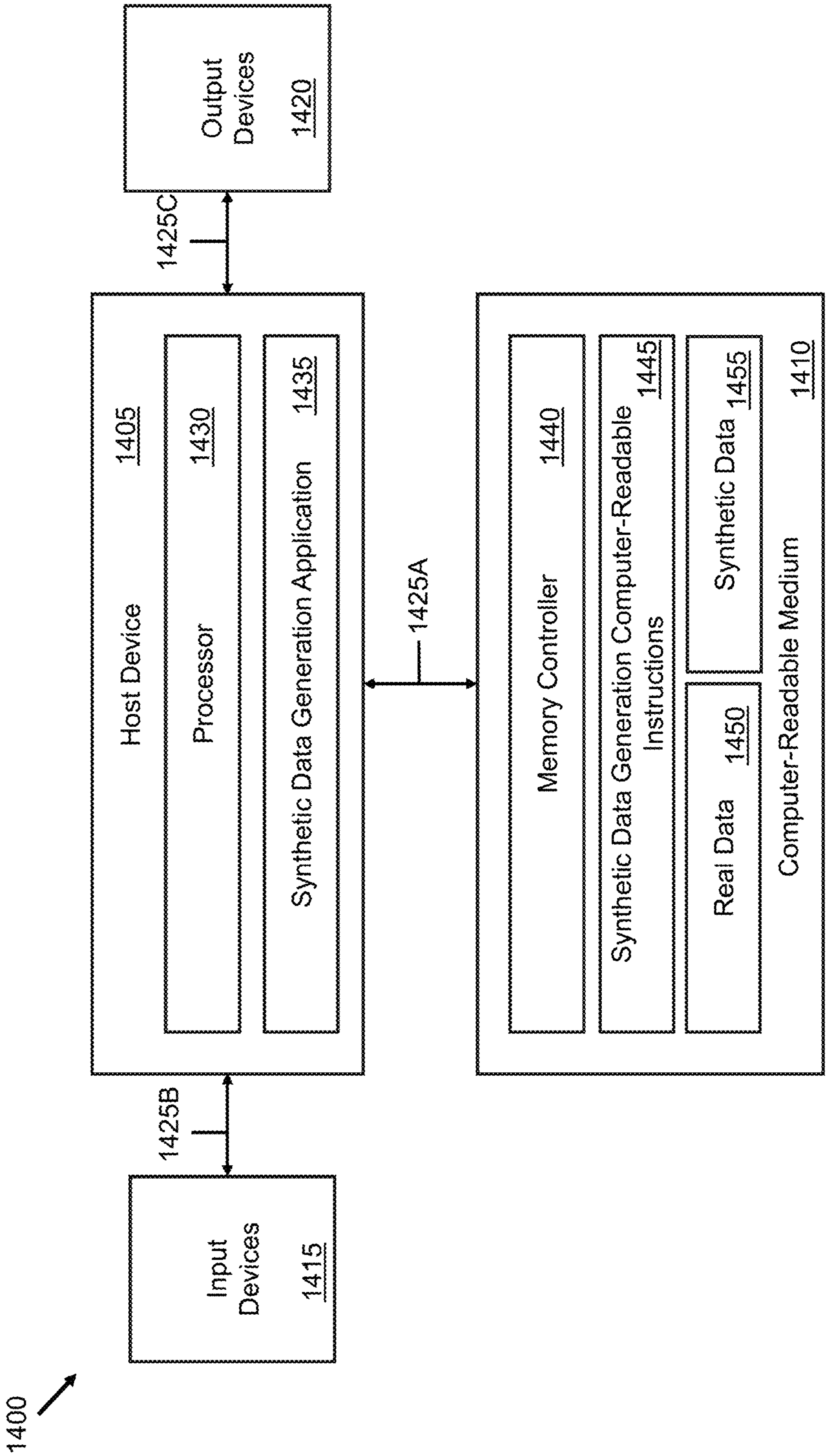
FIG. 14 illustrates a block diagram of an example synthetic data generation system, according to embodiments of the present technology.

Turning now to FIG. 14, a block diagram of an example synthetic data generation system 1400 is shown, in accordance with some embodiments of the present disclosure. The synthetic data generation system 1400 may be part of, or otherwise associated with, the computing environment 114. The synthetic data generation system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The synthetic data generation system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the synthetic data generation system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the synthetic data generation system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a synthetic data generation application 1435. The synthetic data generation application 1435 may be used to automatically generate simulated data.

The synthetic data generation application 1435 may be executed by the processor 1430. The instructions to execute the synthetic data generation application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the synthetic data generation system 1400 and operatively associated with the computer-readable medium 1410. The memory controller 1440 may be configured as a logical block or circuitry that receives instructions from the host device 1405 and performs operations in accordance with those instructions. For example, to execute the synthetic data generation application 1435, the host device 1405 may send a request to the memory controller 1440. The memory controller 1440 may read the instructions associated with the synthetic data generation application 1435. For example, the memory controller 1440 may read synthetic data generation computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM)

cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store real data 1450 and synthetic data 1455. The real data 1450 may include, and/or be used to generate, observation vectors for use by the synthetic data generation application 1435. In other words, the real data 1450 may be used to facilitate the generation of the synthetic data 1455 by the synthetic data generation application 1435.

It is to be understood that only some components of the synthetic data generation system 1400 are shown and described in FIG. 14. However, the synthetic data generation system 1400 may include other components such as various batteries and power sources, networking interfaces, routers, switches, external memory systems, controllers, etc. Generally speaking, the synthetic data generation system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
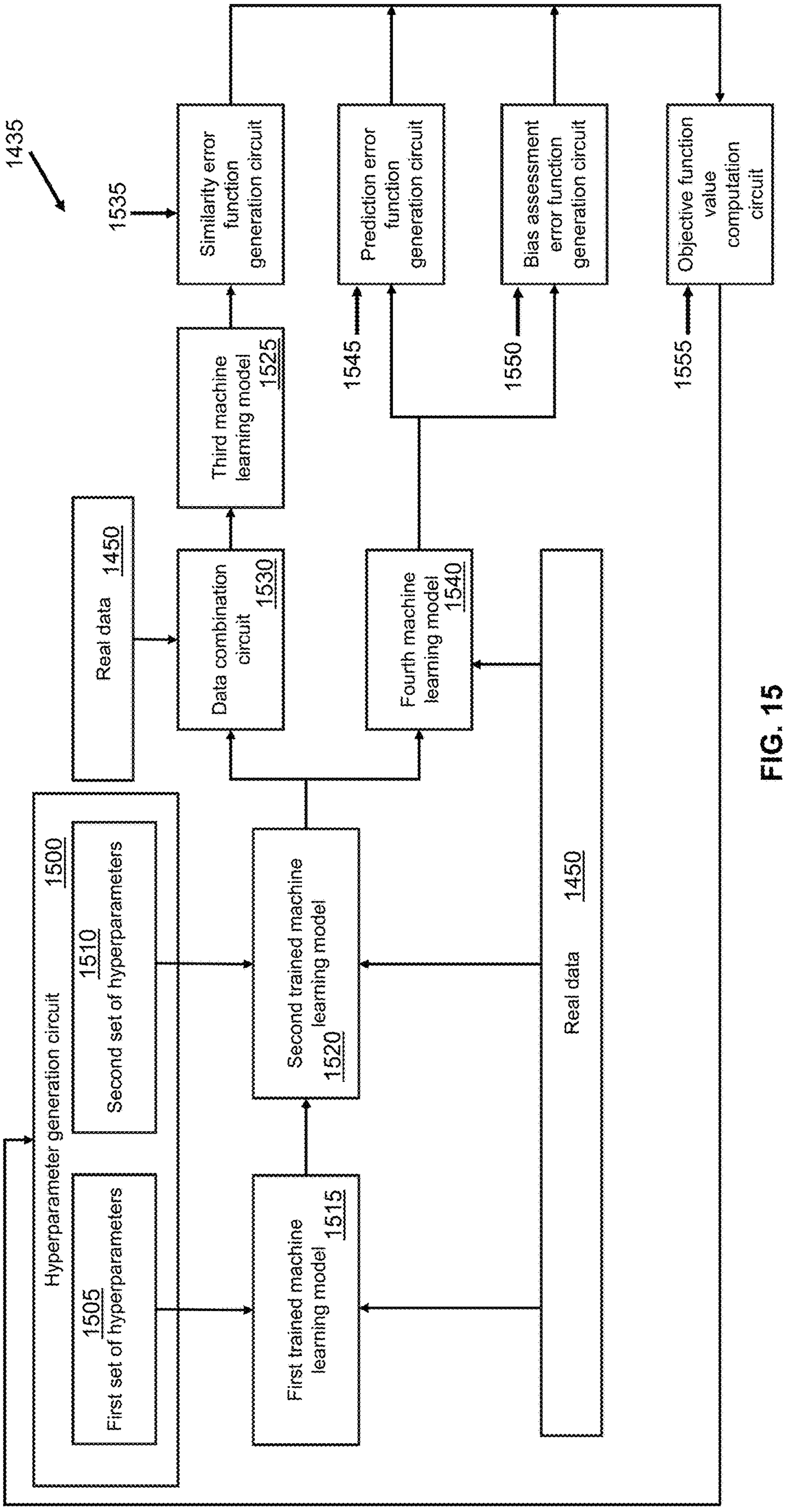
FIG. 15 illustrates a block diagram showing additional details of the synthetic data generation system of FIG. 1, according to embodiments of the present technology.

Turning to FIG. 15, an example block diagram shows the synthetic data generation application 1435 in greater detail, in accordance with some embodiments of the present disclosure. To generate the synthetic data 1455, the synthetic data generation application 1435 includes a hyperparameter generation circuit 1500 that is configured to generate one or more sets of hyperparameters. In some embodiments, one or more hyperparameters may be defined for each layer of a machine learning model and may vary based on the type of the layer. For example, in some embodiments, the hyperparameters may include the type of activation function, number of neurons in each layer, number of hidden layers, number of activation units in each layer, dropout rate, a number of groups, height/width of a convolution window, a dropout rate, a number of filters, an initialization method for filter weights, width and height padding dimensions, a number of categories or labels or unique values of the target variable value, number of training iterations, pooling size, batch size, etc. In other embodiments, the hyperparameters may include other or additional parameters that control the machine learning process. The hyperparameters that the hyperparameter generation circuit 1500 generates may be dependent on the type of the machine learning model for which the hyperparameters are being generated. In particular, the hyperparameter generation circuit 1500 may generate the hyperparameters that are suitable for the machine learning model for which the hyperparameters are being generated.

More specifically, the hyperparameter generation circuit 1500 may generate a first set of hyperparameters 1505 and a second set of hyperparameters 1510. The hyperparameter generation circuit 1500 may generate the first set of hyperparameters 1505 for a first trained machine learning model 1515 and the second set of hyperparameters 1510 for a second trained machine learning model 1520. Thus, the first set of hyperparameters 1505 may be suitable for the first trained machine learning model 1515 and the second set of hyperparameters 1510 may be suitable for the second trained machine learning model 1520. In some embodiments, the first set of hyperparameters 1505 may be different from the second set of hyperparameters 1510. In some embodiments, there may be some overlap between the first set of hyperparameters 1505 and the second set of hyperparameters 1510. Generating the first set of hyperparameters 1505 means that the hyperparameter generation circuit 1500 generates/selects values of one or more of the first set of hyperparameters with a goal to find optimal values of the first set of hyperparameters for the first trained machine learning model 1515. Generating the second set of hyperparameters 1510 means that the hyperparameter generation circuit 1500 generates/selects values of one or more of the second set of hyperparameters with a goal to find optimal values of the second set of hyperparameters for the second trained machine learning model 1520. In some embodiments, the values of the first set of hyperparameters 1505 and the second set of hyperparameters 1510 may be based on the real data 1450.

Figure 17:
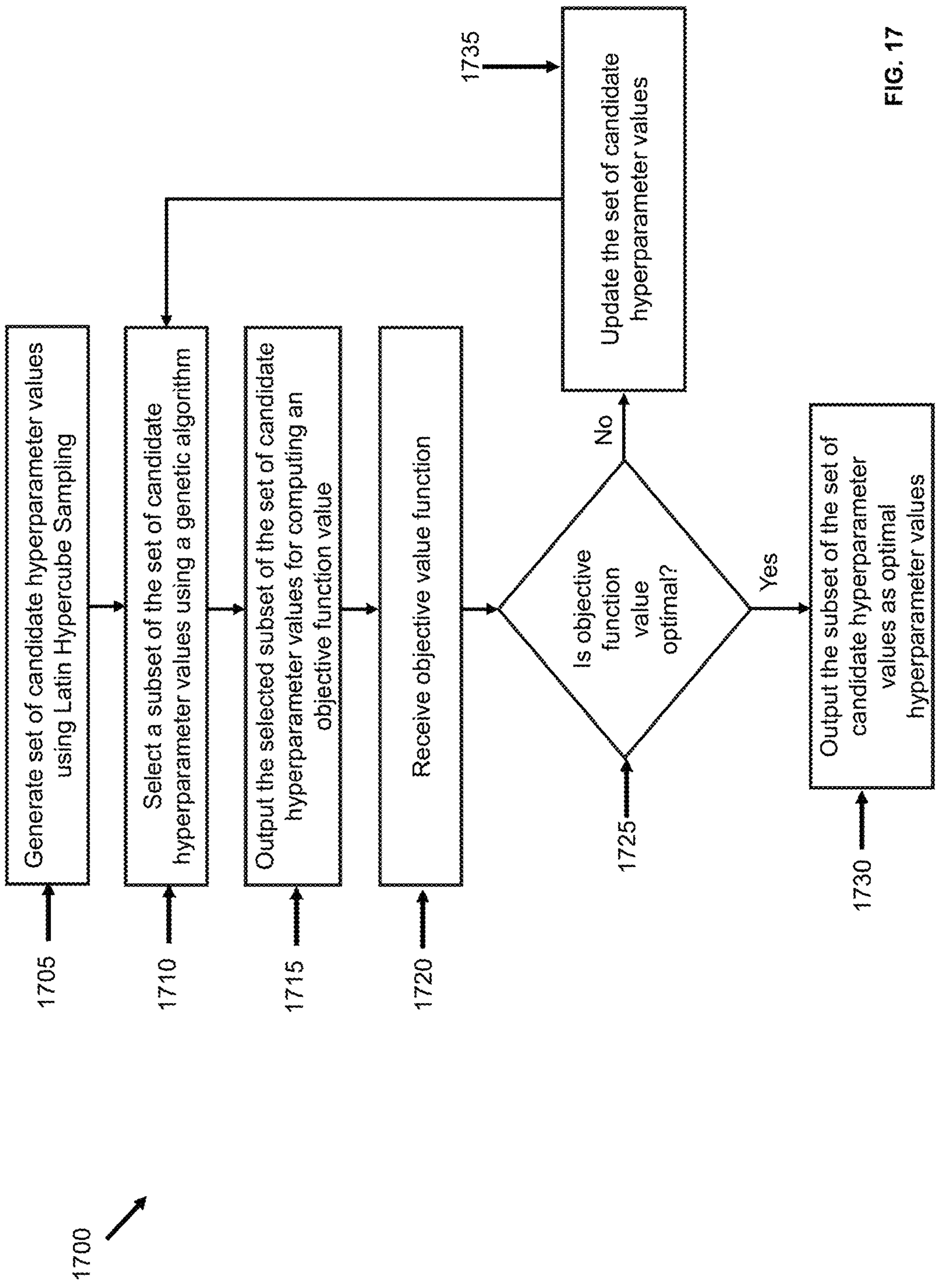
FIG. 17 illustrates a flowchart showing an example process for generating hyperparameters for synthetic data generation, according to embodiments of the present technology.

The first set of hyperparameter 1505 and the second set of hyperparameters 1510 may be used to generate the synthetic data 1455. By optimizing the values of the first set of hyperparameters 1505 and the second set of hyperparameters 1510, the hyperparameter generation circuit 1500 ensures that the synthetic data 1455 that is being generated mirrors (e.g., in conditional probability, marginal probability, bias, etc.) the real data 1450. FIG. 17 describes how the hyperparameter generation circuit 1500 generates the first set of hyperparameters 1505 and the second set of hyperparameters 1510 in more detail.

In some embodiments, each of the first trained machine learning model 1515 and the second trained machine learning model 1520 may be a generative machine learning model that was previously trained. A generative machine learning model may be used to learn underlying patterns or distributions in the real data 1450 and then generate the synthetic data 1455 from the real data. In some embodiments, the generative machine learning models may be used to generate synthetic data that has the same or similar marginal and conditional probability distributions as the real data 1450. In some embodiments, the first trained machine learning model 1515 may be a Gaussian Mixture Model (GMM), and the second trained machine learning model 1520 may be a Generative Adversarial Network (GAN) model. In other embodiments, the first trained machine learning model 1515 and/or the second trained machine learning model 1520 may be other types of generative machine learning models such as hidden Markov models, linear discriminant analysis models, deep belief networks, variational autoencoder models, etc. In some embodiments, both the first trained machine learning model 1515 and the second trained machine learning model 1520 may be of the same type.

In some embodiments, an output from the first trained machine learning model 1515 may be input into the second trained machine learning model 1520. In some embodiments, the combination of the first trained machine learning model 1515 and the second trained machine learning model 1520 may form a tabular GAN machine learning model and may generate more accurate synthetic data compared to using only one of the first trained machine learning model or the second trained machine learning model. To generate the synthetic data 1455, each of the first trained machine learning model 1515 and the second trained machine learning model 1520 may also receive the real data 1450. The real data 1450 is also referred to herein as a set of real data. Using the real data 1450 and the values of the first set of hyperparameters 1505, the first trained machine learning model 1515 may generate a plurality of cluster centroids that may be input into the second trained machine learning model 1520. A cluster centroid is a mean of a Gaussian kernel component within the first trained machine learning model 1515. Each cluster in the first trained machine learning model 1515 may be represented by a Gaussian distribution characterized by the mean (centroid), a covariance matrix, and a mixing coefficient. When fitting the first trained machine learning model 1515 to the input data, the cluster centroids represent the underlying data distribution with all the clusters together. Using the values of the second set of hyperparameters 1510, the real data 1450, and the plurality of cluster centroids, the second trained machine learning model 1520 may generate the synthetic data 1455. Additional details of generating the synthetic data 1455 using the first trained machine learning model 1515 and the second trained machine learning model 1520 are discussed in U.S. Pat. No. 11,416,712, titled "Tabular Data Generation with Attention for Machine Learning Model Training System," issued on Aug. 16, 2022, the entirety of which is incorporated by reference herein.

The synthetic data 1455 output from the second trained machine learning model 1520 is dependent on the values of the first set of hyperparameters 1505 and the second set of hyperparameters 1510. Thus, if the values of the first set of hyperparameters 1505 and/or the second set of hyperparameters 1510 are not optimal, the synthetic data 1450 generated from the second trained machine learning model 1520 may not closely resemble the real data 1450 (e.g., in terms of conditional probability, marginal probability, etc.). Therefore, the synthetic data generation application 1435 provides a mechanism to compare the synthetic data 1455 generated from the second trained machine learning model 1520 with the real data 1450 in various aspects, and then fine tune the values of the first set of hyperparameters 1505 and/or the second set of hyperparameters 1510 based on the comparison to refine the synthetic data. In some embodiments, when the values of the first set of hyperparameters 1505 and the second set of hyperparameters 1510 are optimal, the corresponding synthetic data 1455 that is output from the second trained machine learning model 1520 closely resembles the real data 1450 in conditional probability and marginal probability, as well as the machine learning models that generate the synthetic data have less bias.

To generate the synthetic data 1455 from the second trained machine learning model 1520 that has a same or similar marginal probability distribution as the real data 1450, the synthetic data generation application 1435 provides a third machine learning model 1525, also referred to herein as a first adjudicator. In some embodiments, the third machine learning model 1525 may be a random forest machine learning model. In other embodiments, the third machine learning model 1525 may be a gradient boosting neural network or another type of suitable discriminative or predictive machine learning model. The third machine learning model 1525, which may have been previously trained, may be executed using data generated by a data combination circuit 1530. Output from the third machine learning model 1525 may be used to adjust the values of the first set of hyperparameters 1505 and/or the second set of hyperparameters 1510. In particular, the output from the third machine learning model 1525 may be used to compute a similarity error function which may be indicative of differences in marginal probability distributions between the synthetic data 1455 and the real data 1450.

The data combination circuit 1530 is configured to combine the synthetic data 1455 generated by the second trained machine learning model 1520 with the real data 1450 input into the data combination circuit. In some embodiments, each of the real data 1450 and the synthetic data 1455 include a plurality of vectors. For example, the real data 1450 includes a plurality of real data vectors (also referred to herein as real observation vectors or actual real data vectors), while the synthetic data 1455 includes a plurality of synthetic data vectors (also referred to herein as synthetic observation vectors or actual synthetic data vectors). The data combination circuit 1530 combines the plurality of real data vectors with the plurality of synthetic data vectors to obtain a plurality of combined data vectors (also referred to herein as combined observation vectors). The plurality of combined data vectors may be input into the third machine learning model 1525.

In some embodiments, each of the real observation vectors and the synthetic observation vectors (generally referred to herein as observation vectors) may be arranged in a plurality of rows and a plurality of columns. Each row of the plurality of rows may be one "observation vector" or "observation record." Each column of the plurality of columns may be associated with one variable. Thus, for rows i=1, 2, . . . , N, where N is the number of observation vectors, and for columns, j=1, 2, . . . , n, where n is the number of variables in each observation vector, an observation vector $x_i$ may have a value $x_{ij}$ associated with a row i and column j. An example observation vector $x_i$ may be given as: $\{x_{i1}, x_{i2}, \ldots, x_{in}\}$ where i=1, 2, . . . , N. In some embodiments, the number of observation vectors in each of the real data 1450 and the synthetic data 1455 may be in the hundreds or thousands or millions depending on the application. Likewise, in some embodiments, the number of variables may be in the hundreds or thousands or millions depending on the application. In other embodiments, the data on the rows and columns may be transposed. In some embodiments, the synthetic data 1455 that is generated from the second trained machine learning model 1520 includes the same variables that are present in the real data 1450. Further, in some embodiments, the number of synthetic observation vectors may be the same as or different from the number of the real observation vectors.

In some embodiments, the data combination circuit 1530 may combine the real observation vectors and the synthetic observation vectors to obtain the combined observation vectors. In some embodiments, the data combination circuit 1530 may combine the real observation vectors and the synthetic observation vectors by appending the real observation vectors to the synthetic observation vectors, or vice-versa. These combined observation vectors are thus also arranged in a plurality of columns and a plurality of rows. Each row of the combined observation vectors corresponds to either a real observation vector or a synthetic observation vector. In some embodiments, the data combination circuit 1530 may shuffle the plurality of rows of the combined observation vectors. In some embodiments, the data combination circuit 1530 may randomly shuffle the rows.

In some embodiments, the data combination circuit 1530 may add a first binary label to each of the combined observation vectors. In some embodiments, the data combination circuit 1530 may add a new column to the plurality of columns for the first binary label. The first binary label may be indicative of whether a combined observation vector in a row is part of the real data 1450 (e.g., actual or known real data) or is part of the synthetic data 1455 (e.g., actual or known synthetic data). For example, in some embodiments, a label of 1 may indicate real data and a label of 0 may indicate synthetic data. In other embodiments, other numeric, alphabetical, or alphanumerical labels may be used.

Thus, the third machine learning model 1525 may receive the combined observation vectors from the data combination circuit 1530 and predict whether each of the combined observation vectors corresponds to real data or synthetic data. In other words, the third machine learning model 1525 classifies each of the combined observation vectors into a predicted real data or predicted synthetic data. In some embodiments, the third machine learning model 1525 may output a second binary label for each of the combined observation vectors. The second binary label, similar to the first binary label, may be indicative of the classification of a particular combined observation vector. Thus, each combined observation vector is classified twice: an actual or known classification indicated by the first binary label and a predicted classification indicated by the second binary label.

The third machine learning model 1525 may output the second binary labels to the similarity error function generation circuit 1535. The similarity error function generation circuit 1535 may compute a similarity error function based on a comparison of the values of the first binary label and the second binary label. To compute the similarity error function, the similarity error function generation circuit 1535 may compute a loss function based on the values of the first binary label and the second binary label.

In some embodiments, the loss function may be a cross-entropy loss function, also known as logarithmic loss or log loss. A cross-entropy function may be used to measure the performance of a classification model (e.g., the first trained machine learning model 1515, the second trained machine learning model 1520, and/or the third machine learning model 1525). The cross-entropy function may measure, or be indicative of, the differences between the actual data (e.g., the actual real or synthetic data indicated by the first binary label) and predicted data (e.g., the predicted real or synthetic data indicated by the second binary label). In some embodiments, the similarity error function generation circuit 1535 may compute the cross-entropy using Equation 1:

$$L = -\frac{1}{N}\left[\sum_{j=1}^{N}[t_j\log(p_j) + (1-t_j)\log(1-p_j)]\right] \quad \text{Equation 1}$$

In Equation 1 above, N is the number of combined observation vectors, $t_j$ is the first binary label of the $j^{th}$ combined observation vector and may have a value of either 0 or 1 indicating synthetic or real data, and $p_j$ is the probability distribution generated based on the first binary label and the second binary label.

In other embodiments, the loss function may be a Bernoulli loss function. The Bernoulli loss function, similar to the cross-entropy loss function, may measure the difference between the first marginal probability distribution and the second marginal probability distribution to determine the differences between the actual data (e.g., the actual real or synthetic data indicated by the first binary label and the first marginal probability distribution) and predicted data (e.g., the predicted real or synthetic data indicated by the second binary label and the second marginal probability distribution). The Bernoulli function describes the probability of a random variable with two outcomes (e.g., real or synthetic). For example, the Bernoulli function may indicate an outcome of success with a probability p and an outcome of failure with a probability q=1−p. The probability of an outcome k using the Bernoulli function may be defined by:

$$f(k, p) = p^k(1-p)^{1-k} \quad \text{Equation 2}$$

In Equation 2 above, $f$(k, p) is the probability of outcome k with a probability of success, p. The outcome k may only take two values, k=0 and k=1. When k=0, Equation 2 becomes 1-p and when k=1, Equation 2 becomes p.

In other embodiments, other types of suitable loss functions may be used. In general, a larger value of the loss function is desired. A larger value of the loss function may indicate that the synthetic data 1455 is difficult to distinguish from the real data 1450. Responsive to calculating the loss function, the similarity error function generation circuit 1535 may multiply the loss function with a negative one to obtain the similarity error function. The smaller the similarity error function, the closer the synthetic data 1455 to the real data 1450. The similarity error function may be used to compute an objective function value.

Referring still to FIG. 15, to generate the synthetic data 1455 from the second trained machine learning model 1520 whose conditional probability distribution is same or similar as the probability distribution of the real data 1450, as well as measure bias in the first trained machine learning model 1515 and/or the second trained machine learning model, a fourth machine learning model 1540 may be used. The fourth machine learning model 1540 may also be referred to herein as a second adjudicator. In some embodiments, the fourth machine learning model 1540 may be a random forest machine learning model. In other embodiments, the fourth machine learning model 1540 may be a gradient boosting neural network or another type of suitable discriminative or predictive machine learning model. To generate the synthetic data 1455 whose conditional probability distribution is same as or similar to the conditional probability distribution of the real data 1450, the fourth machine learning model 1540 may be first trained on the synthetic data that is output from the second trained machine learning model.

In some embodiments, the fourth machine learning model 1540 may be trained to predict a first target value. The first target value may be dependent on the application to which the observation vectors belong. In some embodiments, the first target value may be based on a problem that a user is trying to solve or what the user is trying to predict. For example, if the goal is to predict a user's income based on the user's age, where the use lives, and the user's occupation, the observation vectors may include variable values associated with users' age, address, and occupation, and the first target value may be the predicted user's income. In some embodiments, the first target value may include a single variable or be univariate (e.g., income). In some embodiments, if multiple variables are desired to be predicted (e.g., income and promotion), the first target value may be multiple-variable or be multi-variate.

Thus, the fourth machine learning model 1540 is trained using the synthetic data 1455 generated by the second trained machine learning model 1520 to predict a first target value. Upon training the fourth machine learning model 1540 with the synthetic data 1455, the fourth machine learning model is executed to predict a second target value on the real data 1450. If the synthetic data 1455 closely mirrors the real data 1450, the predictions from the fourth machine learning model 1540 of the real data 1450 may match or be close to actual user incomes known from the real data. In some embodiments, the first target value may be the same as the second target value. In some embodiments, the first target value may be different from the second target value. The second target value may also be univariate or multi-variate.

A prediction error function generation circuit 1545 may compute a prediction error function based on predictions from the fourth machine learning model 1540. The prediction error function may be indicative of a difference in conditional probability distribution between the synthetic data 1455 and the real data 1450. In particular, the prediction error function generation circuit 1545 may compute a loss function. The loss function is the prediction error function. In some embodiments, the loss function may be a cross-entropy loss function. The prediction error function generation circuit 1545 may compute the cross-entropy loss function using Equation 1. In some embodiments, the loss function may be a least squares estimation function. In some embodiments, the prediction error function generation circuit 1545 may compute the least squares estimation function as:

$$S=\sum_{i=1}^{N} r_i^2 \qquad \text{Equation 3}$$

In Equation 3 above, S is the sum of squared residuals, N is the total number of observation vectors (real observation vectors+synthetic observation vectors), and r is a residual computed for the $i^{th}$ observation vector computed as a difference between the first target value and the second target value. In other embodiments, the prediction error function generation circuit 1545 may compute other loss functions. The prediction error function may also be used to compute the objective function value. The smaller the value of the prediction error function, the closer the synthetic data 1455 to the real data 1450 in conditional probability distribution. Conditional model distributions may be generated by their associated models as a result of attempting to minimize their respective prediction errors.

To reduce the bias in the machine learning model (e.g., the first trained machine learning model 1515, the second trained machine learning model 1520, and/or the fourth machine learning model 1540), the fourth machine learning model 1540 may again be trained on the synthetic data 1455. The fourth machine learning model 1540 may be trained to predict a third target value. The third target value may be dependent on a bias variable that is designed to be adjusted. For example, if the goal is to reduce income disparity for all genders having other same or similar qualifications, the third target value may be income. Gender may be considered a sensitive variable. In some embodiments, the third target value may include a single variable or be univariate (e.g., income). In some embodiments, if multiple variables are desired to be adjusted for bias (e.g., income and promotion), the third target value may be multiple-variable or be multi-variate.

Using the selected sensitive variable and the predictions from the fourth machine learning model 1540, a bias assessment error function generation circuit 1550 computes one or more bias parity values depending upon the desired goal. Bias parity values may be considered fairness metrics that may be used to measure and reduce bias in the synthetic data 1455. These fairness metrics are configured to ensure that the machine learning models (e.g., the first trained machine learning model 1515, the second trained machine learning model 1520, and the fourth machine learning model 1540) treat all individuals equals regardless of their underlying characteristics such as age, gender, race, etc. In some embodiments, the fairness metrics may include a demographic parity, a predictive parity, an equal accuracy parity, an equalized odds parity, or an equal opportunity parity.

A demographic parity measures if the outcome of a machine learning model is independent of the sensitive variable. The demographic parity is indicative of the maximum measured difference in the selection rate of each category of a sensitive variable. For example, the demographic parity may measure if the fourth machine learning model 1540 is predicting income without considering the gender of an individual. In some embodiments, a demographic parity value of zero may indicate that the outcome of the fourth machine learning model 1540 is fair (e.g., independent of the gender). The lower the value of the demographic parity, the lower the demographic bias in the synthetic data 1455. The demographic parity may be used to balance out historical biases that impact the data.

The demographic parity considers a binary classification setting where the training examples include triples (X, A, Y), where $X \in X$ is a feature vector, $A \in A$ is a protected attribute, and $Y \in \{0, 1\}$ is a label. The feature vector X may either contain the protected attribute A as one of the features or contain other features that may be arbitrarily indicative of A. For example, if the classification task is to predict whether or not someone will default on a loan, each training example may correspond to a person, where X represents their demographics, income level, past payment history, and loan amount; A represents their race; and Y represents whether or not they defaulted on that loan. X may contain their race as one of the features or, for example, contain their zipcode—a feature may be correlated with race. The demographic parity learns an accurate classifier h: $X \rightarrow \{0, 1\}$ from some set (e.g., family) of classifiers H, such as linear threshold rules, decision trees, or neural nets, while satisfying some definition of fairness. The classifiers in H may not explicitly depend on A. P[h(X)=ŷ|A=a]=P[h(X)=>]-> Probability that the classifier predicts equal proportion of positive predictions in each group (e.g., no disparate impact). E[h(X)|A=a]=E[h(X)] for all—Demographic parity. ŷ—values that Y may take from (0,1)

A predictive parity measures a likelihood of an equal outcome across various groups (e.g., the sensitive variable). The predictive parity is indicative of a maximum measured difference in the average probability to receive a positive outcome between each category of the sensitive variable. For example, the predictive parity may require income to be equal for all genders. In some embodiments, a predictive parity value of zero may indicate that the outcome of the fourth machine learning model 1540 is fair (e.g., independent of the gender). The lower the value of the predictive parity, the higher the likelihood of equal outcome (and therefore lower bias) in the synthetic data 1455. The predictive parity may be used to ascertain that each group within a population has on average a same chance of being selected. The condition for predictive parity is:

For all a,b∈A, P(Y=1|C=1,A=a)=P(Y=1|C=1,A=b), where the observed characteristics of an individual (variables) may be denoted by X, a category containing a salient group (e.g. race) may be specified by A, the binary outcome variable may be denoted Y, and the decision making classifier may be C(X,A).

An equal accuracy parity requires that a machine learning model's predictions are equally accurate for all groups of the sensitive variable. The equal accuracy parity is indicative of a maximum difference in accuracy between each category of the sensitive variable. The equal accuracy parity may be used to assess whether a model equally works for each category of the sensitive variable. The condition for equal accuracy parity is, for all a,b ∈A P(C=Y|A=a)=P(C=Y|A=b) where the observed characteristics of an individual (variables) may be denoted by X, a category containing a salient group (e.g. race) may be specified by A, the binary outcome variable may be denoted Y, and the decision making classifier may be C(X,A). The equal accuracy parity requires equal accuracy across groups. The evaluation metric required parity in this case is the accuracy.

An equalized odds parity requires that that a machine learning model's predictions are equally accurate for all groups of the sensitive variable. The equalized odds parity is indicative of a maximum measured difference in true positive rate or false positive rate between each category of the sensitive variable. In some embodiments, an equalized odds parity value of one may indicate that the outcome of the fourth machine learning model 1540 is fair (e.g., equally accurate across genders). The higher the value of the equalized odds parity, the higher the likelihood of equal outcome (and therefore lower bias) in the synthetic data 1455. The equalized odds parity may be used when it is important to find all the positive examples regardless of the category of the sensitive variable, and simultaneously the false positives are more costly. An equalized odds parity may consider a binary classification setting where the training examples consist of triples (X, A, Y), where X∈X is a feature vector, A∈A is a protected attribute, and Y∈{0, 1} is a label. The feature vector X may either contain the protected attribute A as one of the features or contain other features that may be arbitrarily indicative of A. For example, if the classification task is to predict whether or not someone will default on a loan, each training example may correspond to a person, where X represents their demographics, income level, past payment history, and loan amount; A represents their race; and Y represents whether or not they defaulted on that loan. X may contain their race as one of the features or, for example, contain their zipcode—a feature that may be correlated with race. The goal is to learn an accurate classifier h: X→{0, 1} from some set (e.g., family) of classifiers H, such as linear threshold rules, decision trees, or neural nets, while satisfying some definition of fairness. The classifiers in H may not explicitly depend on A. P[h(X)=^y|A=a, Y=y]=P[h(X)=y|Y=y] for all a, y, and y^.-> True Positive Parity.

An equal opportunity parity is indicative of a maximum measured difference in true positive rate between each category of the sensitive variable. The equal opportunity parity may be used when it is important to find all the positive examples regardless of the category of the sensitive variable. The equal opportunity parity may be used to compare true positive rates between different groups. In some embodiments, an equal opportunity parity value of zero may indicate that the outcome of the fourth machine learning model 1540 is fair (e.g., provides equal opportunities for each gender). The lower the value of the equal opportunity parity, the higher the likelihood of equal opportunity (and therefore lower bias) in the synthetic data 1455. The equal opportunity may be considered a relaxed version of the equalized odds parity that only considers conditional expectations with respect to positive labels, (e.g., Y=1). As an example, equal opportunity requires that the individuals in group A who are qualified to be hired are just as likely to be chosen as individuals in group B who are qualified to be hired. However, by not considering whether false positive rates are equivalent across groups, equal opportunity does not capture the costs of misclassification disparities.

In other embodiments, other or additional fairness metrics may be used. In some embodiments, the bias assessment error function generation circuit 1550 may compute the value of one fairness metric based on a user input. In some embodiments, the bias assessment error function generation circuit 1550 may compute multiple fairness metrics and then combine them to obtain a bias assessment error function indicative of a bias in the synthetic data 1455. In some embodiments, the bias assessment error function generation circuit 1550 may combine the fairness metrics by taking an average of the various computed fairness metrics. In some embodiments, the bias assessment error function generation circuit 1550 may combine the fairness metrics by taking a weighted average of the various computed fairness metrics. The fairness metrics that are more important may be accorded a higher weight. In other embodiments, the bias assessment error function generation circuit 1550 may combine the various fairness metrics in other ways. The bias assessment error function computed by the bias assessment error function generation circuit 1550 may be used to compute the objective function value.

An objective function value computation circuit 1555 may be configured to compute the objective function value. Thus, the objective function value computation circuit 1555 may receive the similarity error function computed by the similarity error function generation circuit 1535, the prediction error function computed by the prediction error function generation circuit 1545, and the bias assessment error function computed by the bias assessment error function generation circuit 1550. In some embodiments, the objective function value computation circuit 1555 computes the objective function value by taking a weighted average of the similarity error function, the prediction error function, and the bias assessment error function. In some embodiments, the weights assigned to each of the similarity error function, the prediction error function, and the bias assessment error function may be dependent upon the relative importance of each of the similarity error function, the prediction error function, and the bias assessment error function. For example, if having a closer marginal probability distribution is more important than having a closer conditional probability distribution, in some embodiments, the similarity error function may be assigned a higher weight than the prediction error function. In some embodiments, if reducing bias is more important than the marginal and conditional probability distributions, then the bias assessment error function may be assigned a higher weight value than the similarity error function or the prediction error function. Thus, the weight value assigned to each of the similarity error function, the prediction error function, and the bias assessment error function may be dependent upon the relative importance of each of the similarity error function, the prediction error function, and the bias assessment error function.

In some embodiments, the objective function value computation circuit 1555 may dynamically adjust the values of the weights assigned to each of the similarity error function, the prediction error function, and the bias assessment error function. In some embodiments, the similarity error function, the prediction error function, and the bias assessment error function may adjust the weights based on a comparison of the similarity error function with a first threshold, a comparison of the prediction error function with a second threshold, and a comparison of the bias assessment error function with a third threshold. In other embodiments, the weights may be static predetermined weight values.

In some embodiments, the objective function value computation circuit 1555 may compute the objective function value by taking a simple average of the similarity error function, the prediction error function, and the bias assessment error function. In other embodiments, the objective function value computation circuit 1555 may compute the objective function value in other ways.

Responsive to computing the objective function value, the objective function value computation circuit 1555 may send the objective function value to the hyperparameter generation circuit 1500, which may then determine if the objective function value is optimal or not. In other embodiments, the objective function value computation circuit 1555 may determine whether the objective function value is optimal or not. In some embodiments, the objective function value may be optimal if the similarity error function is less than a first threshold, the prediction error function is less than a second threshold, and the bias assessment error function is less than a third threshold. The first threshold, the second threshold, and the third threshold used to determine optimality may be the same as or different from the first threshold, the second threshold, and the third threshold used to adjust weights during computation of the objective function value. In some embodiments, the objective function value computation circuit 1555 may determine whether the objective function value is optimal or not by comparing the computed objective function value with a predetermined threshold. For example, if the computed objective function value is greater than or equal to the predetermined threshold, the objective function value computation circuit 1555 may determine that the computed objective function value is not optimal. In other embodiments, the objective function value computation circuit 1555 may determine whether the objective function value is optimal or not in other ways.

In some embodiments, the objective function value computation circuit 1555 may be programmed with a stopping criterion. In some embodiments, the stopping criterion may be a time threshold where the process of computing the objective function value and adjusting the first set of hyperparameters 1505 and the second set of hyperparameters 1510 based on the computed objective function value is continued for a period of time indicated by the time threshold. When the time threshold is reached, the values of the first set of hyperparameters 1505 and the second set of hyperparameters 1510 are considered optimal values. In some embodiments, the stopping criterion may be a number of iterations where the process of computing the objective function value and adjusting the first set of hyperparameters 1505 and the second set of hyperparameters 1510 based on the computed objective function value is repeated a set number of times based on the number of iterations. When the number of iterations have been executed, the values of the first set of hyperparameters 1505 and the second set of hyperparameters 1510 are considered optimal values.

In some embodiments, the stopping criterion may be based on a difference between objective function values computed in consecutive iterations. For example, in some embodiments, a difference in the computed objective function values from two consecutive iterations (e.g., Iteration 1 and Iteration 2) may be determined. If that difference is less than a predetermined threshold, the computed objective function value (e.g., in Iteration 2) may be considered optimal. In other embodiments, the objective function value computation circuit 1555 may determine the optimality of the objective function value in other ways.

If the objective function value is not optimal, the hyperparameter generation circuit 1500 may generate new hyperparameter values for the first set of hyperparameters 1505 and the second set of hyperparameters 1510 to compute new synthetic data by the second trained machine learning model 1520. By changing the first set of hyperparameters 1505 and the second set of hyperparameters 1510, the synthetic data 1455 generated by the second trained machine learning model 1520 may be changed. In some embodiments, the hyperparameter generation circuit 1500 may use a SAS Evolutionary Algorithm Guiding Local Search (EAGLS) algorithm provided by SAS Institute Inc. of Cary, North Carolina to generate and update the first set of hyperparameters 1505 and the second set of hyperparameters 1510. The EAGLS algorithm uses a default hybrid search strategy that begins with a Latin hypercube sample (LHS) (e.g., the operation 1705), which provides a more uniform sample of the hyperparameter space. The best samples from the LHS may then be used to seed a genetic algorithm (GA), which crosses and mutates the best samples in an iterative process to generate a new population of model configurations for each iteration, as discussed above. A final step of the GA permits generating set search (GSS) algorithms to be used on a selected subset of the current population. GSS algorithms may be designed for problems that have continuous variables and have the advantage that, in practice, may require significantly fewer evaluations than GAs in order to converge. Furthermore, GSS algorithms may provide a measure of local optimality that may be useful in performing multimodal optimization.

In addition, the following additional "growth steps" may be used whenever continuous variables are present: (a) local search selection in which a small subset of points are selected based on their fitness score and distance to (1) other points and (2) pre-existing locally optimal points; and (b) local search optimization in which local search optimization begins concurrently for each selected point. The only change that is made to the original optimization problem is that the variables' lower and upper bounds are modified to temporarily fix integer variables at their current setting. The EAGLS algorithm may perform these additional growth steps at each iteration, thereby permitting selected members of the population (based on diversity and fitness) to benefit from local optimization over the continuous variables. If only integer variables are present, these additional "growth steps" may not be needed.

In some embodiments, instead of using all of the similarity error function, the prediction error function, and the bias assessment error function to compute the objective function value, in some embodiments, the objective function value computation circuit 1555 may use only one or two of the similarity error function, the prediction error function, and the bias assessment error function to compute the objective function value. For example, in some embodiments, the objective function value computation circuit 1555 may compute the objective function value using only the similarity error function. In some embodiments, the objective function value computation circuit 1555 may compute the objective function value using only the prediction error function. In some embodiments, the objective function value computation circuit 1555 may compute the objective function value using only the bias assessment error function. In some embodiments, the objective function value computation circuit 1555 may compute the objective function value using only the similarity error function and the prediction error function. In some embodiments, the objective function value computation circuit 1555 may compute the objective function value using only the similarity error function and the bias assessment error function. In some embodiments, the objective function value computation circuit 1555 may compute the objective function value using only the prediction error function and the bias assessment error function.

Figure 16:
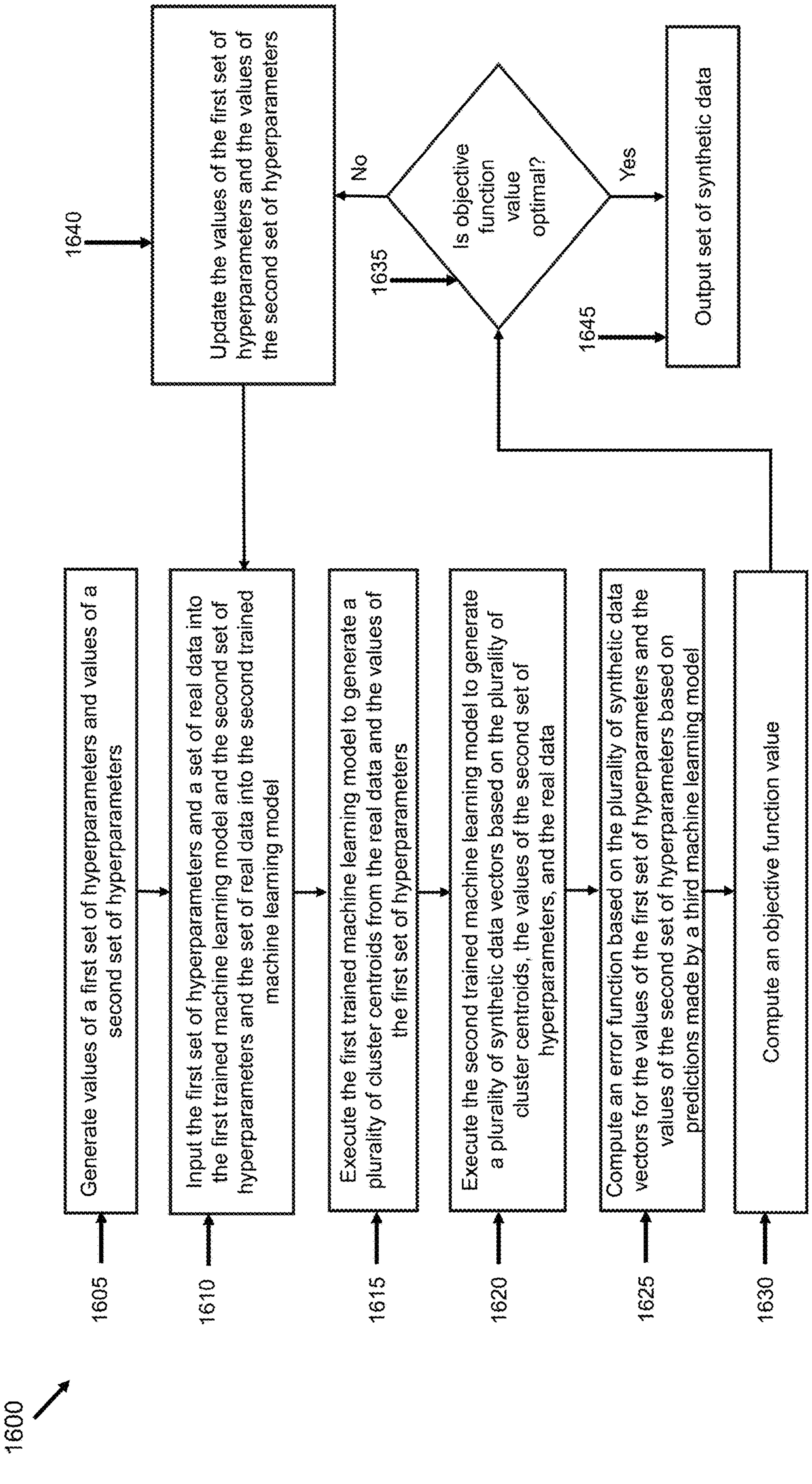
FIG. 16 illustrates a flowchart showing a first example process for generating synthetic data, according to embodiments of the present technology.

Turning now to FIG. 16, an example flowchart outlines the operations of a process 1600 to generate synthetic data, in accordance with some embodiments of the present disclosure. In particular, the process 1600 may be used to generate synthetic data that more closely mirrors both a conditional probability distribution and a marginal probability distribution of real data, as well as reduces bias in the machine learning model for a specified set of variables. In other words, the process 1600 computes the objective function value from a combination of the similarity error function, the prediction error function, and the bias assessment error function. The operations of the process 1600 may be executed by one or more processors (e.g., the processor 1430) associated with the synthetic data generation application 1435. In particular, one or more processors may execute computer-readable instructions (e.g., the synthetic data generation computer-readable instructions 1445) to generate the synthetic data. The process 1600 may include other or additional operations depending upon the embodiment.

At operation 1605, the processor generates the values of the first set of hyperparameters 1505 for the first trained machine learning model 1515 and the values of the second set of hyperparameters 1510 for the second trained machine learning model 1520. In some embodiments, the processor may generate the values of the first set of hyperparameters 1505 and the values of the second set of hyperparameters 1510 as described below in FIG. 17. In other embodiments, the processor may use other or additional mechanisms to generate the values of the first set of hyperparameters 1505 and/or the values of the second set of hyperparameters 1510.

At operation 1610, the processor inputs the values of the first set of hyperparameters 1500 and a set of real data (e.g., the real data 1450) into the first trained machine learning model 1515 and the values of the second set of hyperparameters 1510 and the set of real data into the second trained machine learning model 1520.

At operation 1615, the processor executes the first trained machine learning model 1515 to generate a plurality of cluster centroids from the set of real data and the values of the first set of hyperparameters. The processor inputs the plurality of cluster centroids into the second trained machine learning model 1520.

At operation 1620, the processor executes the second trained machine learning model 1520 to generate a plurality of synthetic data vectors (e.g., the synthetic data 1455) based on the plurality of cluster centroids received from the first trained machine learning model 1515, the values of the second set of hyperparameters 1510, and the set of real data (e.g., the real data 1450).

At operation 1625, the processor computes an error function based on the plurality of synthetic data vectors for the first set of hyperparameters and the second set of hyperparameters based on predictions made by a third machine learning model. The error function includes a combination of the similarity error function indicative of a difference in marginal probability distribution between the plurality of synthetic data vectors and the set of real data, the prediction error function indicative of a difference in conditional probability distribution between the plurality of synthetic data vectors and the set of real data, and the bias assessment error function indicative of a bias in the first trained machine learning model 1515, the second trained machine learning model 1520, and/or the fourth machine learning model 1540. The third machine learning model at this operation includes the third machine learning model 1525 to compute the second binary label, which is then used by the similarity error function generation circuit 1535 to compute the similarity error function. The third machine learning model at this operation also includes the fourth machine learning model 1540 that is used to predict the second target value used by the prediction error function generation circuit 1545 to compute the prediction error function and the third target value which is used by the bias assessment error function generation circuit 1550 to compute the bias assessment error function.

At operation 1630, the processor computes an objective function value based on at least one of the similarity error function, the prediction error function, or the bias assessment error function. In particular, in some embodiments, the objective function value computation circuit 1555 combines the similarity error function, the prediction error function, and the bias assessment error function using a weighted average to compute the objective function value, as discussed above.

At operation 1635, the processor determines if the objective function is an optimal value. In some embodiments, the optimal value of the objective function value corresponds to a value in which the similarity error function is less than or equal to a first threshold, the prediction error function is less than or equal to a second threshold, and the bias assessment error function is less than or equal to a third threshold. In other embodiments, other mechanisms of determining optimality or using the stopping criterion, as discussed above, may be used.

If the processor determines that the objective function value is not optimal, the processor 1600 updates the first set of hyperparameters 1505 and the second set of hyperparameters 1510 at operation 1640 and the process 1600 loops back to the operation 1610 to generate new synthetic data with the updated values of the first set of hyperparameters and the updated values of the second set of hyperparameters.

On the other hand, if at the operation 1635, the processor determines that the objective function value computed at the operation 1630 is an optimal value, the process 1600 proceeds to operation 1645 where the synthetic data 1455 generated at the operation 1620 is output. This synthetic data has a marginal probability distribution that closely resembles the marginal probability distribution of the real data 1450, has a conditional probability distribution that closely resembles the conditional probability distribution of the real data, and the models that generate the synthetic data 1455 have less bias. This synthetic data may be used for any of a variety of purposes. For example, in some embodiments, the synthetic data may be used to train another machine learning model.

Turning now to FIG. 17, an example flowchart outlines the operations of a process 1700 to generate and update the values of first set of hyperparameters 1505 and the second set of hyperparameters 1510, in accordance with some embodiments of the present disclosure. In particular, the process 1700 may be implemented by the hyperparameter generation circuit 1500 to generate values for each of the first set of hyperparameter 1505 and the second set of hyperparameters 1510. The process 1700 may also be implemented by the hyperparameter generation circuit 1500 to update the values for each of the first set of hyperparameter 1505 and the second set of hyperparameters 1510. Thus, the process 1700 explains the operations 1605 and 1640 in greater detail. The operations of the process 1700 may be executed by one or more processors (e.g., the processor 1430) associated with the synthetic data generation application 1435. In particular, one or more processors may execute computer-readable instructions (e.g., the synthetic data generation computer-readable instructions 1445) to generate the synthetic data. The process 1700 may include other or additional operations depending upon the embodiment. The process 1700 below is explained with respect to the first set of hyperparameters 1505. However, the process 1700 may similarly be applied for generating/updating the values of the second set of hyperparameters 1510.

At operation 1705, the processor generates a set of candidate hyperparameter values using Latin Hypercube Sampling (LHS). LHS is a local search optimization technique that examines values of each of the first set of hyperparameters 1505 and ensures that each value shows up once in a set of randomly blended combinations. In other embodiments, the processor may use other mechanisms such as random search, grid search, etc. to generate the set of candidate hyperparameter values for each of the set of first hyperparameters 1505.

At operation 1710, the processor selects a subset of the set of candidate hyperparameter values using a genetic algorithm. A genetic algorithm is configured to select an optimal set of hyperparameter values. Thus, for each hyperparameter in the first set of hyperparameters 1505, the genetic algorithm may select a subset of hyperparameter values from the set of candidate hyperparameter values selected at the operation 1705. To select the subset of hyperparameter values, the genetic algorithm may create an initial population of vectors based on the set of candidate hyperparameter values. For example, in some embodiments, each vector of the initial population may have one value selected from the set of candidate hyperparameter values for each hyperparameter in the first set of hyperparameters 1505. From the initial population, the genetic algorithm may calculate an initial function value for each vector. For each vector, the genetic algorithm may also build a mutant vector where each hyperparameter's value in that vector is calculated as a mutation of the hyperparameter values of that hyperparameter in other vectors, a trial vector where each hyperparameter's value is selected from either the current value of that hyperparameter or the value of that hyperparameter in the mutant vector, and the new function value is calculated from the trial vector. The genetic algorithm may compare the initial function value with the new function value to determine if convergence is reached. If convergence is not reached, the building of the mutant vector, the trial vector, the calculation of the new function value, and comparison with the initial function value is repeated until convergence is reached. When convergence is reached, the value of the hyperparameter corresponding to the initial function value is selected for that hyperparameter. The selected values for each hyperparameter of the first set of hyperparameters 1505 form the subset of the set of candidate hyperparameter values.

At operation 1715, the processor outputs the subset of the set of candidate hyperparameter values selected at the operation 1710 for computing an objective function value, as described above at the operation 1630. In particular, the processor may output the subset of the set of candidate hyperparameter values for the first set of hyperparameters 1505 to the first trained machine learning model 1515 and the subset of the set of candidate hyperparameter values for the second set of hyperparameters 1510 to the second trained machine learning model 1520.

At operation 1720, the processor receives the computed objective function value and at operation 1725, the processor determines if the received objective function value is an optimal value. The operation 1725 is analogous to the operation 1635. In some embodiments, the operation 1725 may occur at the objective function value generation circuit 1555 in which case the operations 1720 and 1725 may not be needed. Rather, the processor may receive an indication from the objective function value generation circuit 1555 that the objective function value is not optimal and that the values of the first set of hyperparameters 1505 and the second set of hyperparameters 1510 need to be adjusted. If the operation 1725 is performed by the hyperparameter generation circuit 1500, the processor may determine whether the computed objective function value is optimal or not similar to the operation 1635.

If the processor determines that the objective function value is optimal at the operation 1725, then at operation 1730, the processor outputs the values of the first set of hyperparameters 1505 and the second set of hyperparameters 1510 selected at the operation 1710 as optimal hyperparameter values. Otherwise, at operation 1735, the processor computes a new set of candidate hyperparameter values using LHS, similar to the operation 1705, and loops back to the operation 1710 to select a new subset of the set of candidate hyperparameter values using the genetic algorithm.

Figure 18:
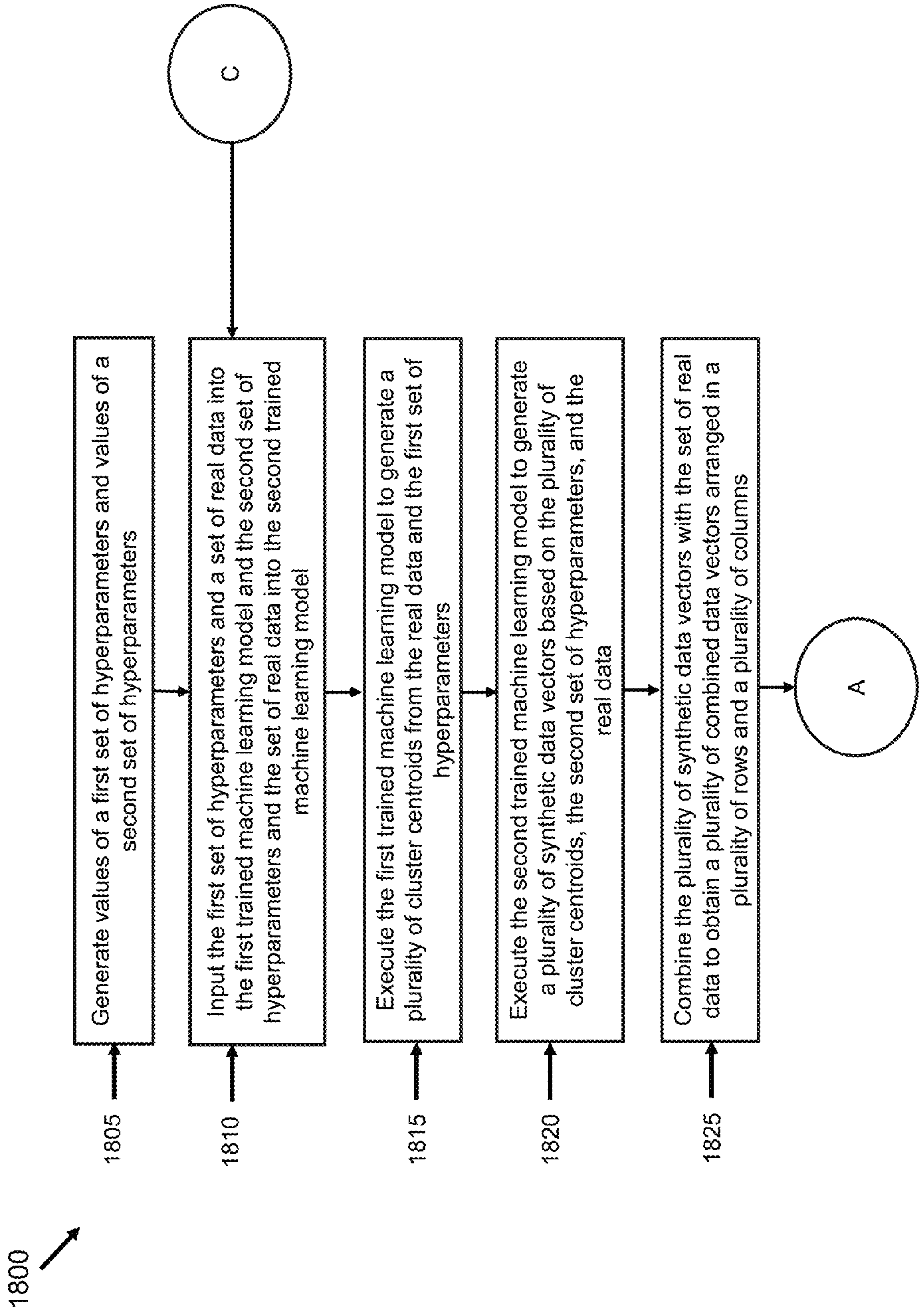
FIG. 18 illustrates a flowchart showing a second example process for generating synthetic data, according to embodiments of the present technology.
Figure 18:
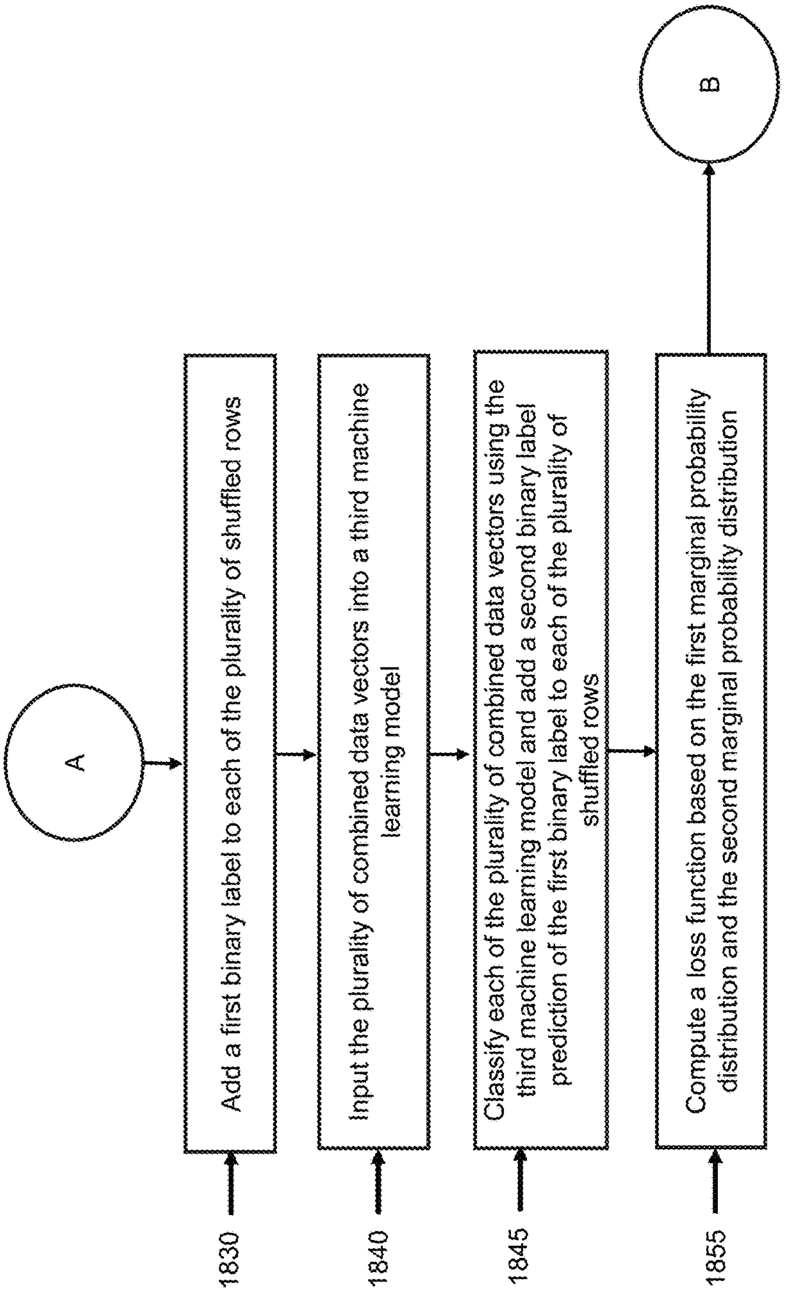
Figure 18:
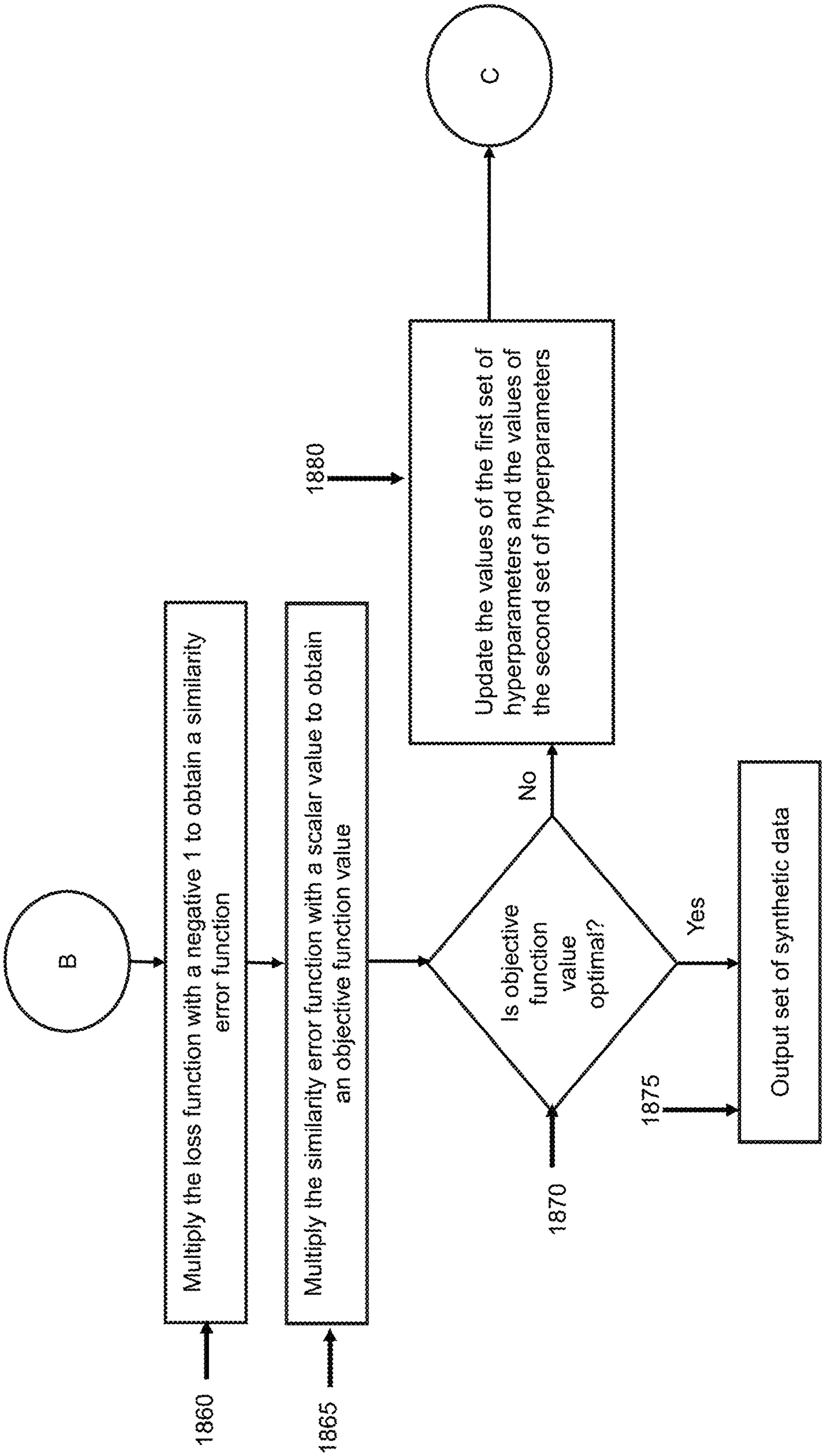

Turning now to FIG. 18, an example flowchart outlines the operations of a process 1800 to generate the synthetic data 1455, in accordance with some embodiments of the present disclosure. In particular, in contrast to the process 1600 in which all of the similarity error function, the prediction error function, and the bias assessment error function were used to generate the synthetic data 1455, the process 1800 generates the synthetic data using only the similarity error function. The operations of the process 1800 may be executed by one or more processors (e.g., the processor 1430) associated with the synthetic data generation application 1435. In particular, one or more processors may execute computer-readable instructions (e.g., the synthetic data generation computer-readable instructions 1445) to generate the synthetic data. The process 1800 may include other or additional operations depending upon the embodiment.

At operation 1805, the processor generates values of a first set of hyperparameters for a first trained machine learning model and values of a second set of hyperparameters for a second trained machine learning model. Operation 1805 is analogous to the operation 1605.

At operation 1810, the processor inputs the values of the first set of hyperparameters and the real data 1450 into the first trained machine learning model 1515 and the values of the second set of hyperparameters and the real data into the second trained machine learning model 1520. The operation 1810 is analogous to the operation 1610.

At operation 1815, the processor executes the first trained machine learning model 1515 to generate a plurality of cluster centroids from the real data 1450 and the values of the first set of hyperparameters received from the operation 1810. The operation 1815 is analogous to the operation 1615.

At operation 1820, the processor executes the second trained machine learning model 1520 to generate a plurality of synthetic data vectors (e.g., the synthetic data 1455) based on the plurality of cluster centroids from the operation 1815, the values of the second set of hyperparameters received from the operation 1810, and the real data 1450. The operation 1820 is analogous to the operation 1620.

At operation 1825, the processor combines the synthetic data 1455 with the real data 1450 to obtain a plurality of combined data vectors, as discussed above with respect to the data combination circuit 1530. The plurality of combined data vectors are arranged in a plurality of rows and a plurality of columns. Each row of the plurality of rows corresponds to one of the plurality of combined data vectors. In particular, to combine the synthetic data 1455 with the real data 1450, the processor appends the synthetic data vectors to the real data vectors to obtain the plurality of combined data vectors. Further, the processor shuffles the plurality of rows to obtain a plurality of shuffled rows of the plurality of combined data vectors.

At operation 1830, the processor adds a first binary label to each of the plurality of shuffled rows. In some embodiments, the shuffling of the plurality of rows may occur after adding the first binary label. The first binary label indicates whether a row of the plurality of rows includes actual real data or actual synthetic data.

At operation 1840, the processor inputs the plurality of shuffled rows into the third machine learning model 1525 and at operation 1845, the processor executes the third machine learning model 1525 to classify each of the plurality of combined data vectors using a second binary label. The second binary label indicates whether each of the plurality of combined data vectors includes predicted real data or predicted synthetic data.

At operation 1855, the processor computes a loss function. In some embodiments, the loss function may be a cross-entropy loss function or a Bernoulli loss function.

At operation 1860, the processor multiplies the loss function with a negative one to obtain a similarity error function. The similarity error function is indicative of a difference in the first marginal probability distribution and the second marginal probability distribution.

At operation 1865, the processor multiplies the similarity error function with a scalar value to compute the objective function value. In some embodiments, the scalar value is a weight value to be assigned to the similarity error function. In some embodiments, the weight value may be based on the importance level to be accorded to the similarity error function. In some embodiments, the higher the importance of the similarity error function, the higher the weight value.

At operation 1870, the processor determines whether the objective function value is optimal or not. The operation 1870 is analogous to the operation 1635.

If the processor determines that the objective function value computed at the operation 1865 is optimal, then the process 1800 proceeds to operation 1875 where the synthetic data 1455 generated at the operation 1820 is output. The operation 1875 is analogous to the operation 1645. On the other hand, if at the operation 1870, the processor determines that the objective function value is not an optimal value, at operation 1880, the processor updates the values of the first set of hyperparameters and the values of the second set of hyperparameters and loops back to the operation 1810. The operation 1875 is analogous to the operation 1640.

Figure 19:
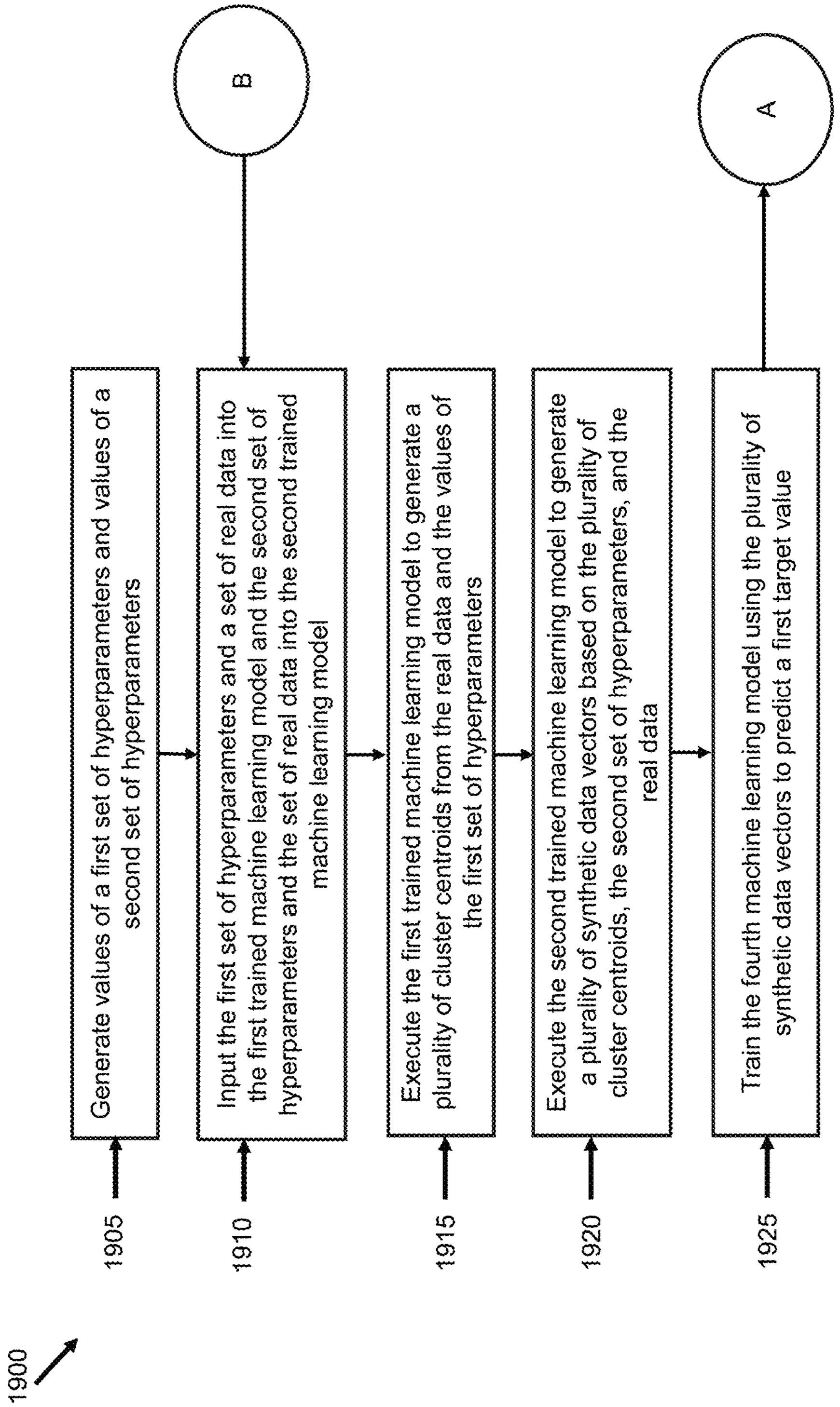
FIG. 19 illustrates a flowchart showing a third example process for generating synthetic data, according to embodiments of the present technology.
Figure 19:
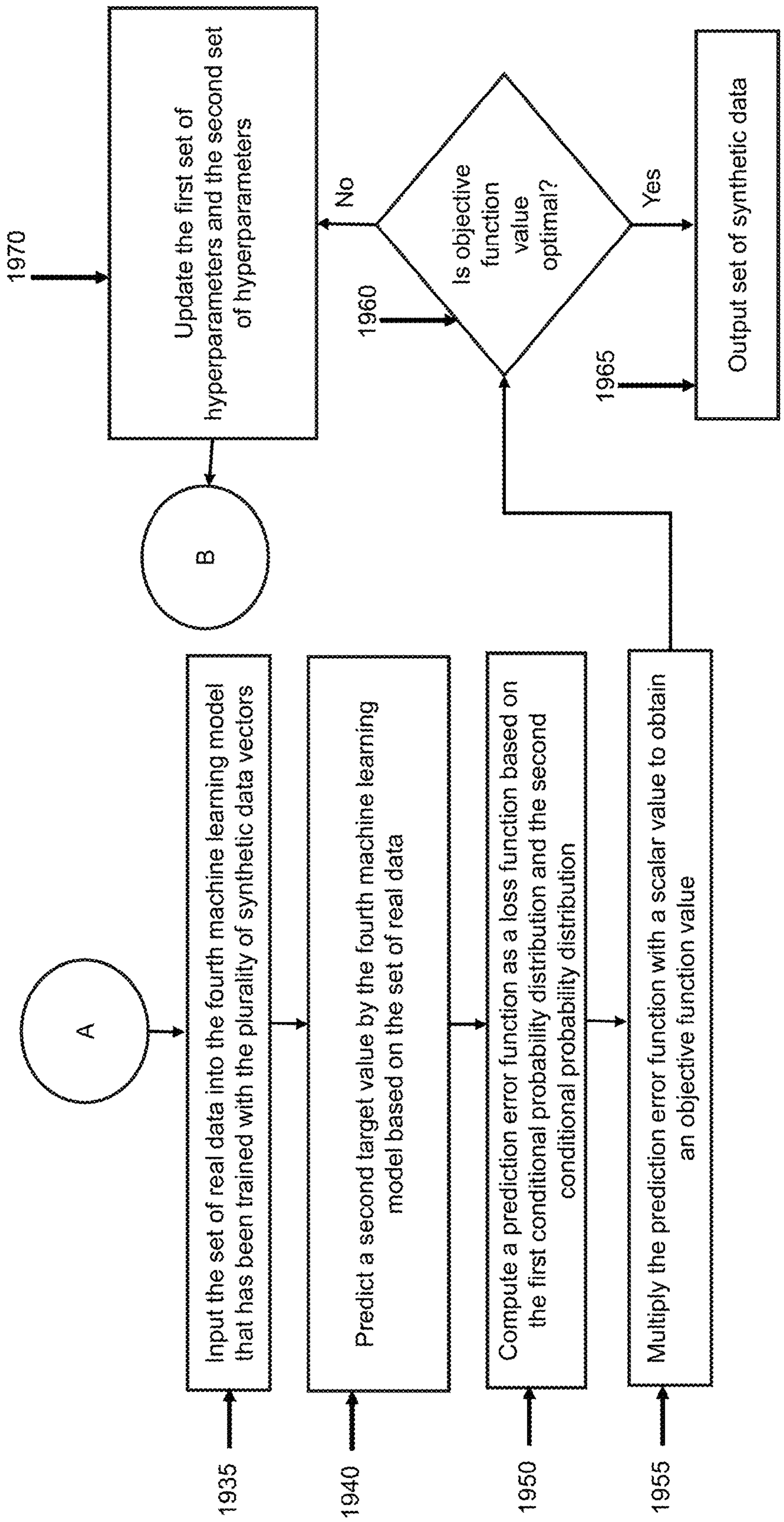

Referring to FIG. 19, an example flowchart outlines the operations of a process 1900 to generate the synthetic data 1455, in accordance with some embodiments of the present disclosure. In particular, in contrast to the process 1600 in which all of the similarity error function, the prediction error function, and the bias assessment error function were used to generate the synthetic data 1455, the process 1900 generates the synthetic data using only the prediction error function. The operations of the process 1900 may be executed by one or more processors (e.g., the processor 1430) associated with the synthetic data generation application 1435. In particular, one or more processors may execute computer-readable instructions (e.g., the synthetic data generation computer-readable instructions 1445) to generate the synthetic data. The process 1900 may include other or additional operations depending upon the embodiment.

At operation 1905, the processor generates values of a first set of hyperparameters for a first trained machine learning model and values of a second set of hyperparameters for a second trained machine learning model. Operation 1905 is analogous to the operation 1605.

At operation 1910, the processor inputs the values of the first set of hyperparameters and the real data 1450 into the first trained machine learning model 1515 and the values of the second set of hyperparameters and the real data into the second trained machine learning model 1520. The operation 1910 is analogous to the operation 1610.

At operation 1915, the processor executes the first trained machine learning model 1515 to generate a plurality of cluster centroids from the real data 1450 and the values of the first set of hyperparameters received from the operation 1910. The operation 1915 is analogous to the operation 1615.

At operation 1920, the processor executes the second trained machine learning model 1520 to generate a plurality of synthetic data vectors (e.g., the synthetic data 1455) based on the plurality of cluster centroids from the operation 1915, the values of the second set of hyperparameters received from the operation 1910, and the real data 1450. The operation 1920 is analogous to the operation 1620.

At operation 1925, the processor trains the fourth machine learning model 1540 using the synthetic data 1455 to predict a first target value.

At operation 1935, the processor inputs the real data 1450 into the fourth machine learning model 1540 that has been trained at the operation 1925 with the synthetic data 1455.

At operation 1940, the processor predicts a second target value by the fourth machine learning model 1540 based on the real data 1450.

At operation 1950, the processor computes a prediction error function by the prediction error function generation circuit 1545 as a loss function. The prediction error function is indicative of a difference in the first conditional probability distribution and the second conditional probability distribution.

At operation 1955, the processor multiplies the prediction error function with a scalar value to obtain the objective function value. In some embodiments, the scalar value is a weight value to be assigned to the prediction error function. In some embodiments, the weight value may be based on the importance level to be accorded to the prediction error function. In some embodiments, the higher the importance of the prediction error function, the higher the weight value.

At operation 1960, the processor determines whether the objective function value is optimal or not. The operation 1960 is analogous to the operation 1635. If the processor determines that the objective function value computed at the operation 1955 is optimal, then the process 1900 proceeds to operation 1965 where the synthetic data 1455 generated at the operation 1920 is output. The operation 1965 is analogous to the operation 1645. On the other hand, if at the operation 1960, the processor determines that the objective function value is not an optimal value, at operation 1970, the processor updates the values of the first set of hyperparameters and the values of the second set of hyperparameters and loops back to the operation 1910. The operation 1970 is analogous to the operation 1640.

Figure 20:
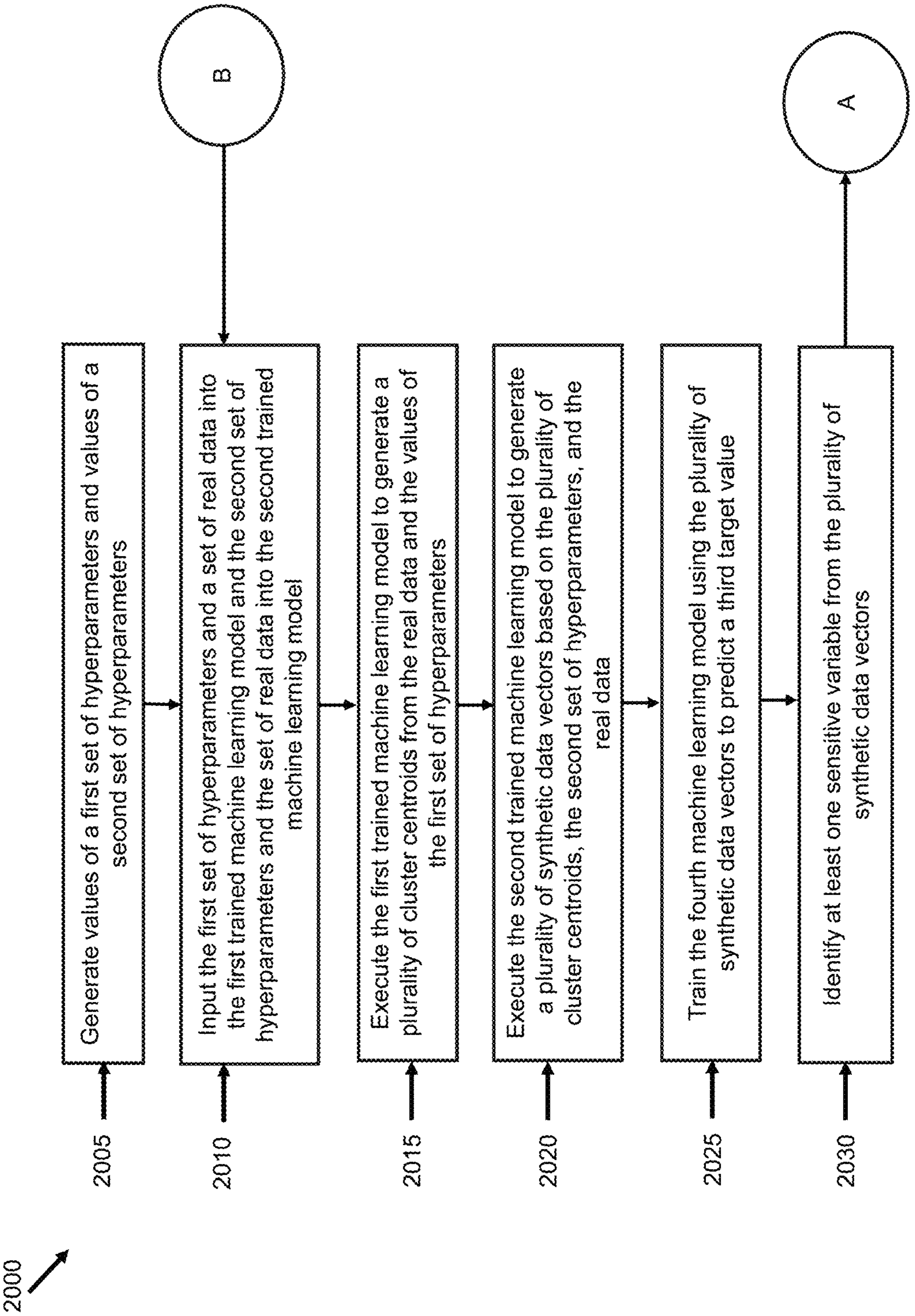
FIG. 20 illustrates a flowchart showing a fourth example process for generating synthetic data, according to embodiments of the present technology.
Figure 20:
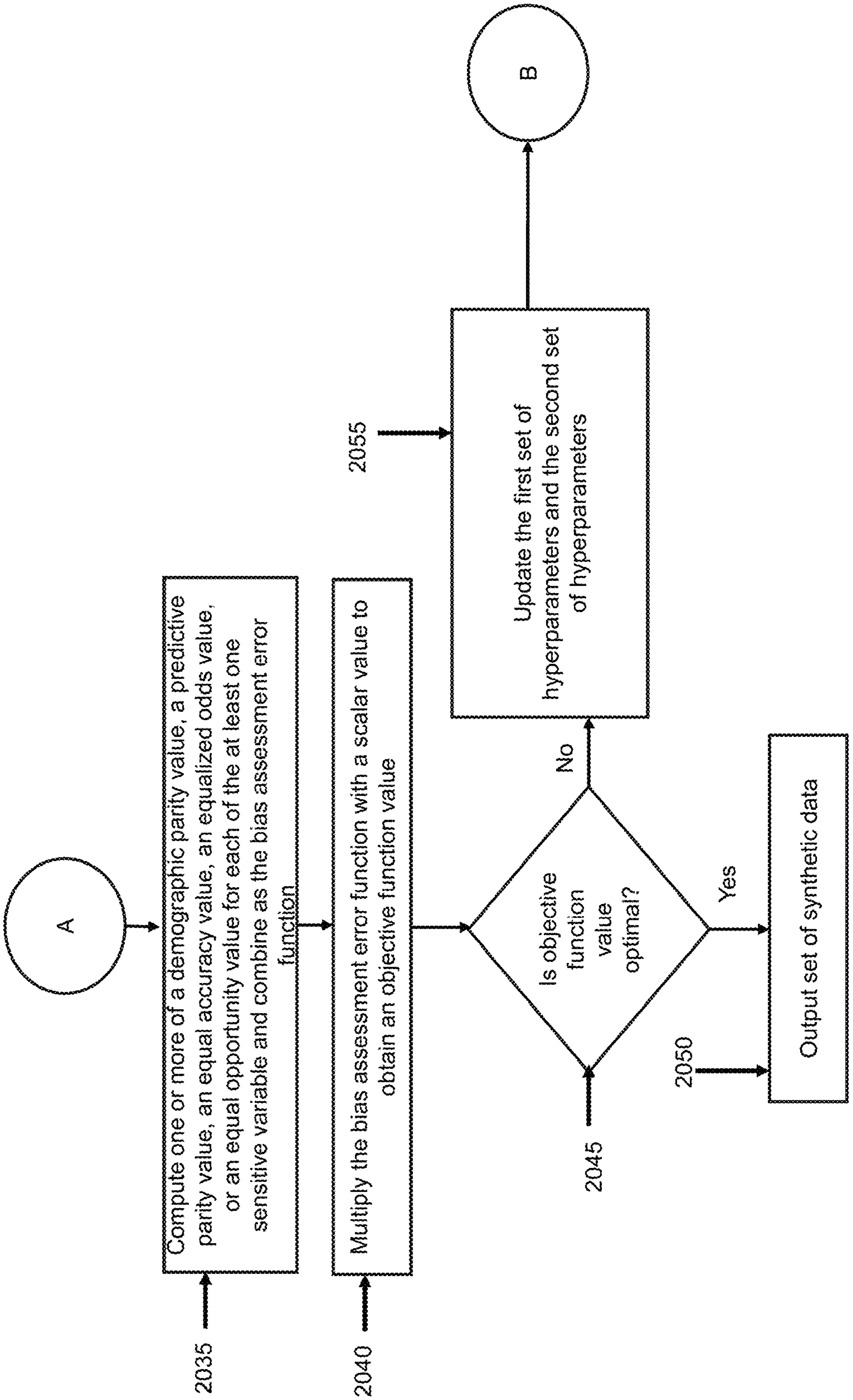

Referring to FIG. 20, an example flowchart outlines the operations of a process 2000 to generate the synthetic data 1455, in accordance with some embodiments of the present disclosure. In particular, in contrast to the process 1600 in which all of the similarity error function, the prediction error function, and the bias assessment error function were used to generate the synthetic data 1455, the process 2000 generates the synthetic data using only the bias assessment error function. The operations of the process 2000 may be executed by one or more processors (e.g., the processor 1430) associated with the synthetic data generation application 1435. In particular, one or more processors may execute computer-readable instructions (e.g., the synthetic data generation computer-readable instructions 1445) to generate the synthetic data. The process 2000 may include other or additional operations depending upon the embodiment.

At operation 2005, the processor generates values of a first set of hyperparameters for a first trained machine learning model and values of a second set of hyperparameters for a second trained machine learning model. Operation 2005 is analogous to the operation 1605.

At operation 2010, the processor inputs the values of the first set of hyperparameters and the real data 1450 into the first trained machine learning model 1515 and the values of the second set of hyperparameters and the real data into the second trained machine learning model 1520. The operation 2010 is analogous to the operation 1610.

At operation 2015, the processor executes the first trained machine learning model 1515 to generate a plurality of cluster centroids from the real data 1450 and the values of the first set of hyperparameters received from the operation 2010. The operation 2015 is analogous to the operation 1615.

At operation 2020, the processor executes the second trained machine learning model 1520 to generate a plurality of synthetic data vectors (e.g., the synthetic data 1455) based on the plurality of cluster centroids from the operation 2015, the values of the second set of hyperparameters received from the operation 2010, and the real data 1450. The operation 2020 is analogous to the operation 1620.

At operation 2025, the processor trains the fourth machine learning model 1540 using the synthetic data 1455 to predict a third target value.

At operation 2030, the processor identifies at least one sensitive variable from the synthetic data 1455.

At operation 2035, the processor computes one or more of a demographic parity value, a predictive parity value, an equal accuracy value, an equalized odds value, or an equal opportunity value for each of the at least one sensitive variable. The processor also combines the computed one or more of the demographic parity value, the predictive parity value, the equalized odds value, or the equal opportunity value. In some embodiments, the processor may compute an average of the computed one or more of the demographic parity value, the predictive parity value, the equalized odds value, and the equal opportunity value to compute the bias assessment error function. The bias assessment error function is indicative of a bias in the plurality of synthetic data vectors.

At operation 2040, the processor multiplies the bias assessment error function with a scalar value to obtain the objective function value. In some embodiments, the scalar value is a weight value to be assigned to the bias assessment error function. In some embodiments, the weight value may be based on the importance level to be accorded to the bias assessment error function. In some embodiments, the higher the importance of the bias assessment error function, the higher the weight value.

At operation 2045, the processor determines whether the objective function value is optimal or not. The operation 2045 is analogous to the operation 1635. If the processor determines that the objective function value computed at the operation 2040 is optimal, then the process 2000 proceeds to operation 2050 where the synthetic data 1455 generated at the operation 2020 is output. The operation 2045 is analogous to the operation 1645. On the other hand, if at the operation 2045, the processor determines that the objective function value is not an optimal value, at operation 2055, the processor updates the values of the first set of hyperparameters and the values of the second set of hyperparameters and loops back to the operation 2010. The operation 2055 is analogous to the operation 1640.

Figure 21:
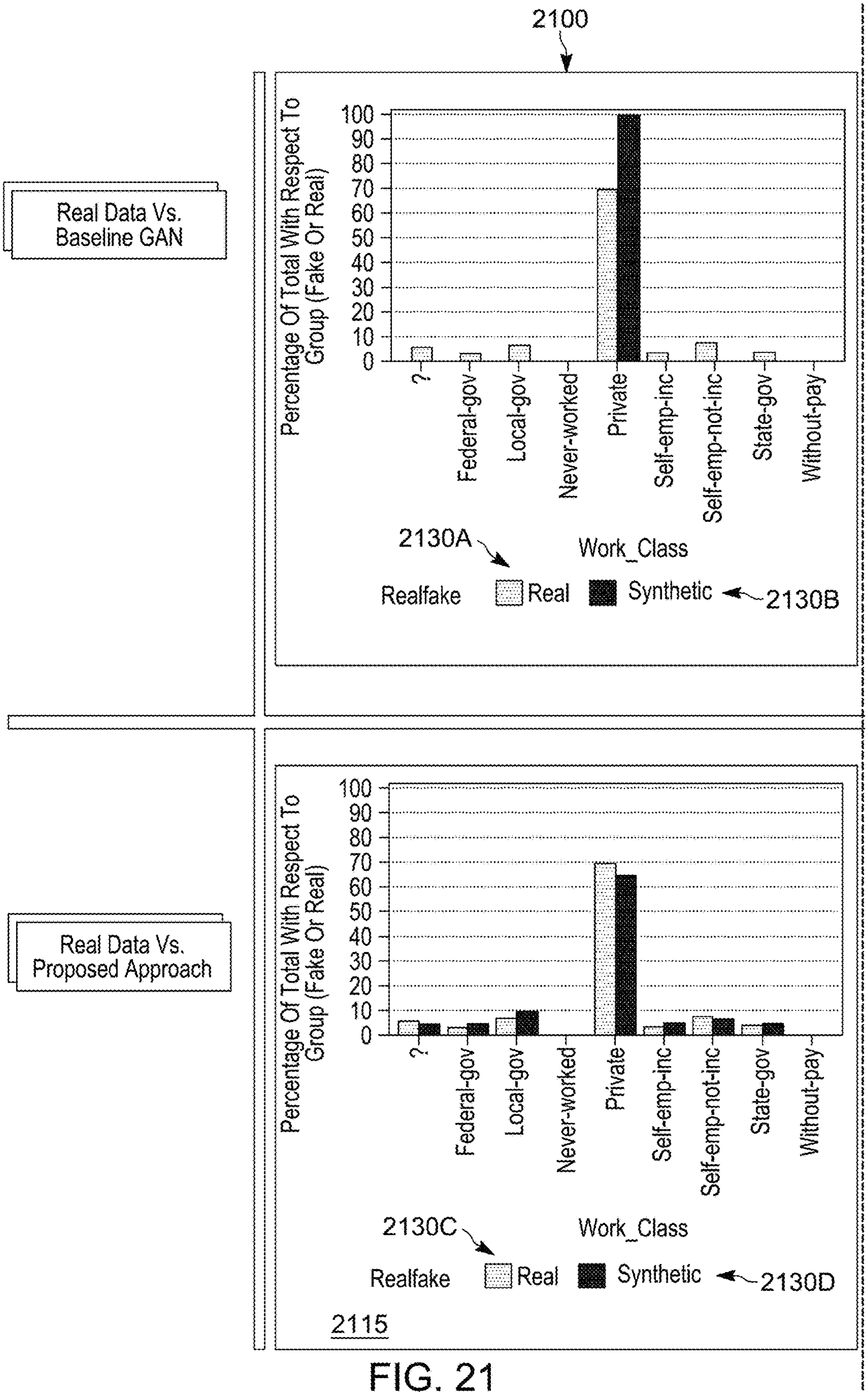
FIG. 21 illustrates example graphs comparing synthetic data generated using the proposed approach with synthetic data generated using a conventional approach, according to embodiments of the present technology.
Figure 22:
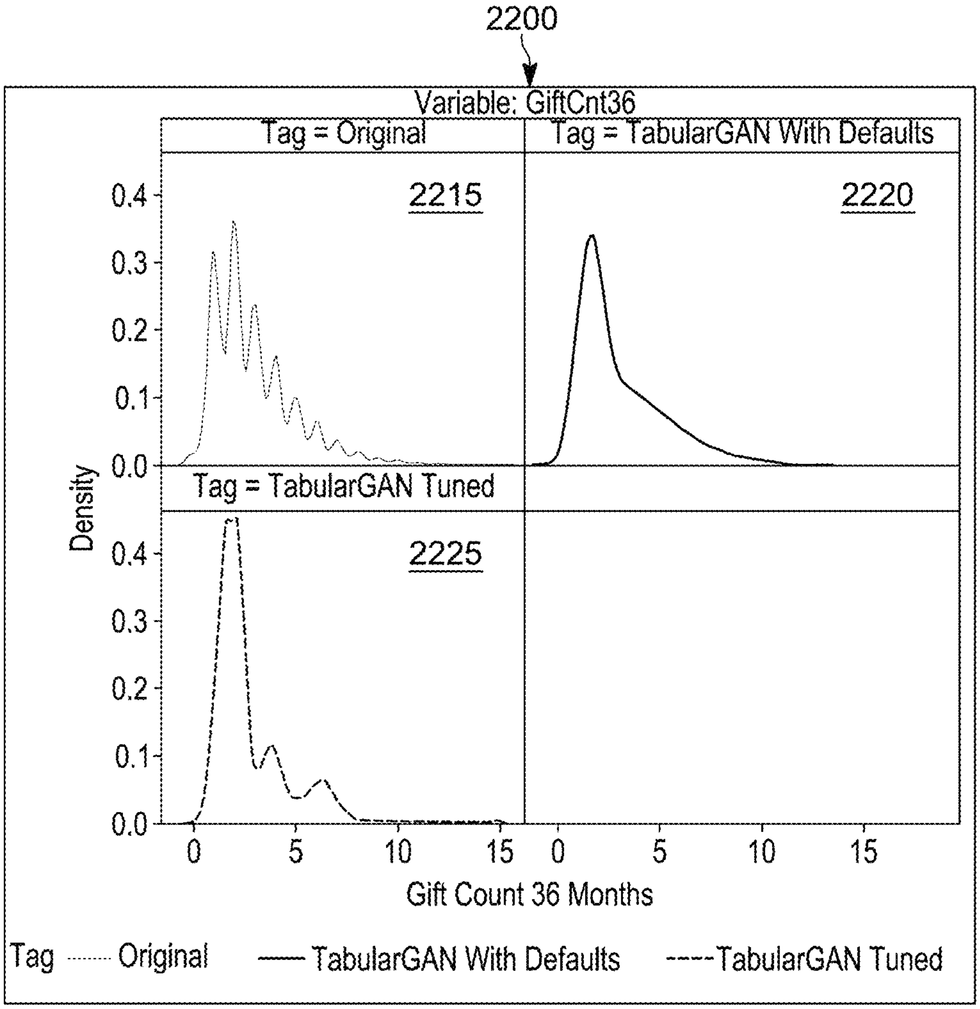
FIG. 22 illustrates example graphs comparing synthetic data generated using the proposed approach with synthetic data generated using a conventional approach, according to embodiments of the present technology.
Figure 22:
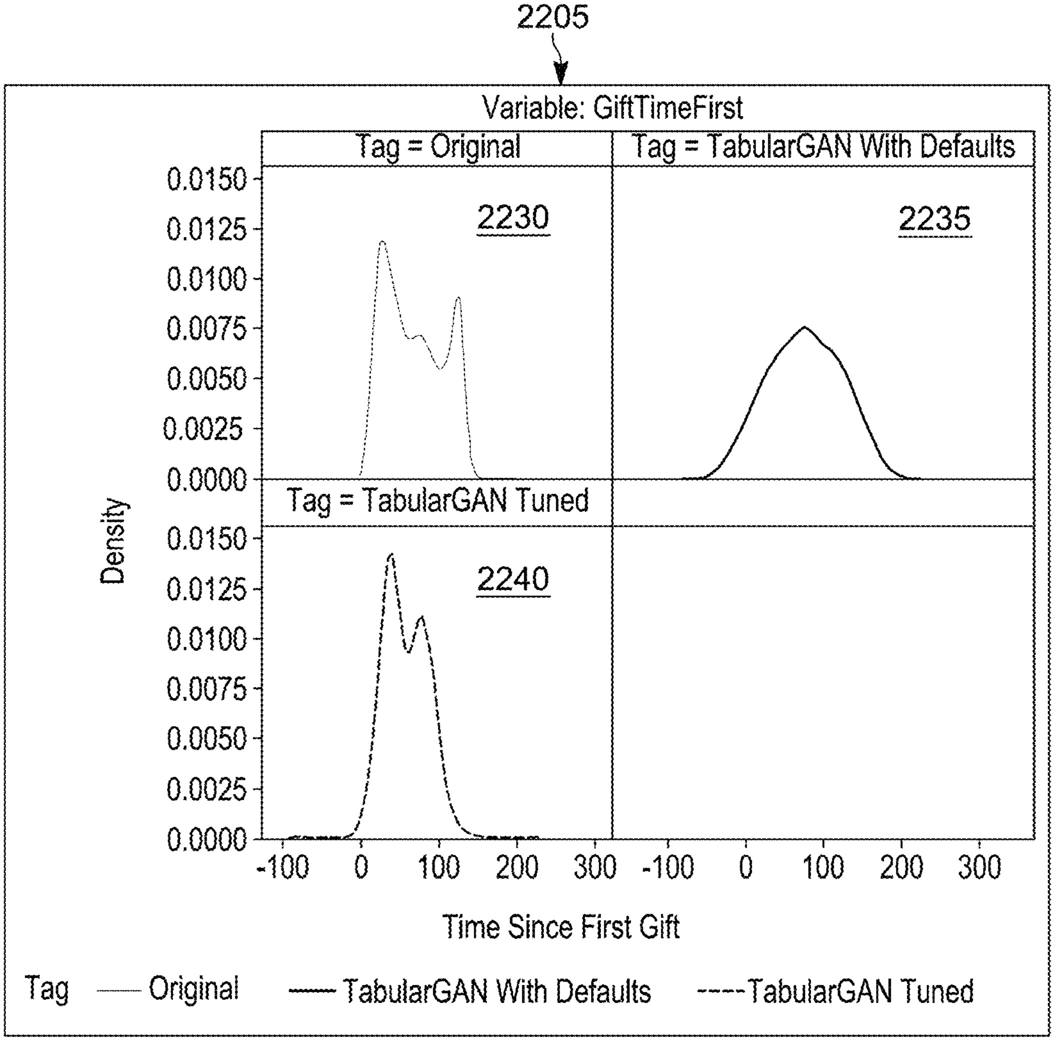
Figure 22:
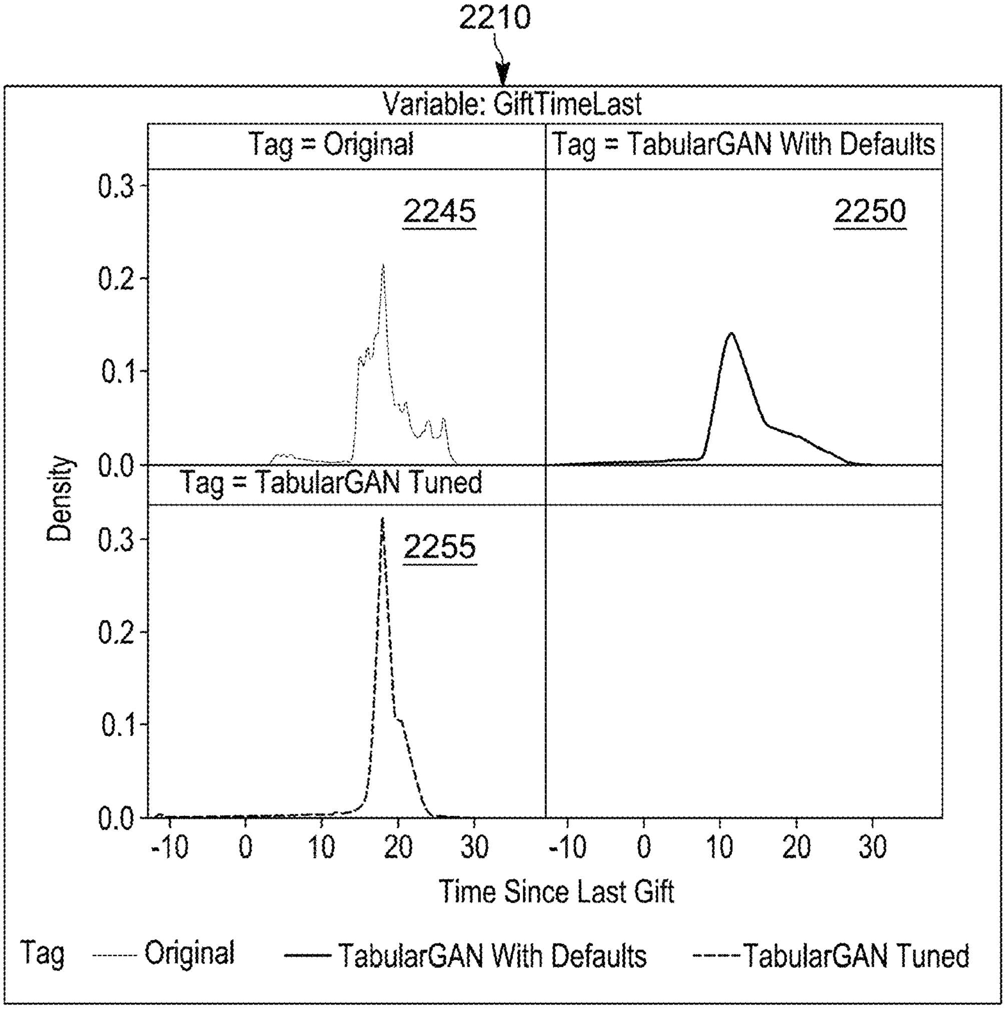

Referring now to FIGS. 21-24, example experimental results are shown, in accordance with some embodiments of the present disclosure. These experimental results compare the proposed approach disclosed in the present disclosure with a baseline or conventional approach. The baseline approach in FIG. 21 corresponds to a baseline GAN approach, which includes generating synthetic data from a single GAN model. FIG. 22 uses a tabular GAN as a baseline approach, which produces synthetic data from the combination of the first trained machine learning model 1515 and the second trained machine learning model 1520 without tuning the values of the first set of hyperparameters 1505 and the second set of hyperparameters 1510. For example, in the tabular GAN approach, default values of the first set of hyperparameters are input into the first trained machine learning model 1515 and default values of the second set of hyperparameters are input into the second trained machine learning model 1520. The synthetic data output from the second trained machine learning model 1520 is the synthetic data used in the baseline GAN experiments. In contrast, using the proposed approach, the default values of the first set of hyperparameters and the second set of hyperparameters are tuned and the synthetic data is regenerated until optimal values of the first set of hyperparameters and the second set of hyperparameters are achieved. The synthetic data corresponding to the optimal values of the first set of hyperparameters and the second set of hyperparameters is used in the proposed approach for the experiments.

Turning specifically to FIG. 21, example graphs 2100-2125 are shown, in accordance with some embodiments of the present disclosure. The graphs 2100-2110 compare the real data with synthetic data produced by the baseline GAN approach and the graphs 2115-2125 compare the real data with synthetic data produced by the proposed approach for marginal probability distribution. In other words, the graphs 2100-2125 compare how close the synthetic data is to the real data when the synthetic data is generated using the baseline GAN approach and the proposed approach. The graphs 2100-2125 compare the marginal probability distribution for continuous variables. For example, the graphs 2100 and 2115 compare the marginal probability distribution for a variable "work_class," the graphs 2105 and 2120 compare the marginal probability distribution for a variable "education," while the graphs 2115 and 2125 compare the marginal probability distribution for a variable "marital_status."

Referring specifically to the graphs 2100 and 2115, each of those graphs plot a percentage of the specific "work_class" type (e.g., federal_gov, local_gov, private, etc.) in the total number of observation vectors against the specific "work_class" type. The graph 2100 includes bars 2130A for real data and bars 2130B for synthetic data produced by the baseline GAN, while the graph 2115 includes bars 2130C for the real data and bars 2130D for the synthetic data. For the synthetic data to look like the real data, the bars for the real should be somewhat the same size as the bars for the synthetic data. As seen from the graphs 2100 and 2115, the bars 2130C are closer to the bars 2130D than the bars 2130A and 2130B, thereby indicating that the synthetic data generated by the proposed approach resembles the real data more closely than the synthetic data produced by the baseline GAN approach.

Referring to the graphs 2105 and 2120, each of those graphs plot a percentage of the specific "education" type (e.g., masters, bachelors, doctorate, etc.) in the total number of observation vectors against the specific "education" type. The graph 2105 includes bars 2135A for real data and bars 2135B for synthetic data produced by the baseline GAN, while the graph 2120 includes bars 2135C for the real data and bars 2135D for the synthetic data. For the synthetic data to look like the real data, the bars for the real should be somewhat the same size as the bars for the synthetic data. As seen from the graphs 2105 and 2120, the bars 2135C are closer to the bars 2135D than the bars 2135A and 2135B, thereby indicating that the synthetic data generated by the proposed approach resembles the real data more closely than the synthetic data produced by the baseline GAN approach.

Referring specifically to graphs 2110 and 2125, each of those graphs plot a percentage of the specific "marital_status" type (e.g., divorced, separated, widowed, etc.) in the total number of observation vectors against the specific "marital_status" type. The graph 2110 includes bars 2140A for real data and bars 2140B for synthetic data produced by the baseline GAN, while the graph 2125 includes bars 2140C for the real data and bars 2140D for the synthetic data. Again, for the synthetic data to look like the real data, the bars for the real should be somewhat the same size as the bars for the synthetic data. As seen from the graphs 2110 and 2125, the bars 2140C are closer to the bars 2140D than the bars 2140A and 2140B, thereby indicating that the synthetic data generated by the proposed approach resembles the real data more closely than the synthetic data produced by the baseline GAN approach.

Thus, the proposed approach produces synthetic data that has a closer marginal probability distribution to the real data than the baseline GAN approach.

Turning now to FIG. 22, example graphs 2200-2210 are shown, in accordance with some embodiments of the present disclosure. Each of the graphs 2200-2210 compares the real data with synthetic data produced by the tabular GAN approach and the synthetic data produced by the proposed approach for conditional probability distribution. In other words, the graphs 2200-2210 compare a density error function of the real data with the synthetic data produced by the tabular GAN approach and proposed approach. Each of the graphs 2200-2210 compares the conditional probability distributions for a different variable. Synthetic data that mirrors or more closely follows the shape of the density plot of the real data more closely resembles the real data.

Thus, the graph 2200 includes graphlets 2215, 2220, and 2225. The graphlet 2215 corresponds to the density error function of the real data, the graphlet 2220 corresponds to the density error function of the synthetic data produced by Tabular GAN and the graphlet 2225 corresponds to the density error function of the synthetic data produced by the proposed approach. The shape of the plot in the graphlet 2225 corresponding to the synthetic data produced by the proposed approach more closely follows the shape of the plot of the graphlet 2215 corresponding to the real data compared to the shape of the plot in the graphlet 2220. Thus, the synthetic data produced by the proposed approach follows the conditional probability distribution of the real data more closely than the synthetic data produced by the Tabular GAN approach.

The graph 2205 includes graphlets 2230, 2235, and 2240. The graphlet 2230 corresponds to the density error function of the real data, the graphlet 2235 corresponds to the density error function of the synthetic data produced by Tabular GAN and the graphlet 2240 corresponds to the density error function of the synthetic data produced by the proposed approach. The shape of the plot in the graphlet 2240 corresponding to the synthetic data produced by the proposed approach more closely follows the shape of the plot of the graphlet 2230 corresponding to the real data compared to the shape of the plot in the graphlet 2235. Thus, the synthetic data produced by the proposed approach follows the conditional probability distribution of the real data more closely than the synthetic data produced by the Tabular GAN approach.

The graph 2210 includes graphlets 2245, 2250, and 2255. The graphlet 2245 corresponds to the density error function of the real data, the graphlet 2250 corresponds to the density error function of the synthetic data produced by Tabular GAN and the graphlet 2255 corresponds to the density error function of the synthetic data produced by the proposed approach. The shape of the plot in the graphlet 2255 corresponding to the synthetic data produced by the proposed approach more closely follows the shape of the plot of the graphlet 2245 corresponding to the real data compared to the shape of the plot in the graphlet 2250. Thus, the synthetic data produced by the proposed approach follows the conditional probability distribution of the real data more closely than the synthetic data produced by the Tabular GAN approach.

Referring now to FIG. 23, example tables comparing accuracy of predictions made using synthetic data generated by the baseline GAN approach and the proposed approach are shown, in accordance with some embodiments of the present disclosure. In particular, table 2300 shows three different models (e.g., the weighted Bayesian network, weighted random forest, and weighted gradboost forest) that are used to make predictions using only real data 2305, a combination of real data and synthetic data produced by the baseline GAN approach (referred to below as synthetic data 1) 2310, and a combination of real data and synthetic data produced by the proposed approach (referred to below as synthetic data 2) 2315. Similarly, table 2320 shows three different models (e.g., the weighted support vector machine, weighted random forest, and weighted gradboost forest) that are used to make predictions using only real data 2305, the synthetic data 1 2310, and the synthetic data 2 2315. The table 2300 uses a different data set (PVA97nk data set) than the table 2320 (census data set).

In particular, in each of the tables 2300 and 2320, each of the three models were trained using the real data 2305 and then each of the three trained models were used to make predictions on holdout data. Similarly, in each of the tables 2300 and 2320, each of the three models were trained using the synthetic data 1 2310 and then each of the three trained models were used to make predictions on the same holdout data. Each of the three models were also trained using the synthetic data 2 2315 and then each of the three trained models were used to make predictions on the same holdout data in each of the tables 2300 and 2320. Based on the predictions on the holdout data, an F1 score was computed for each prediction. The F1 score captures the accuracy of the predictions. The F1 score may be used for evaluating the performance of classification models. In some embodiments, the F1 score may range from 0 to 1. The higher the F1 score, the higher the accuracy of prediction.

In some embodiments, the F1 score may be computed as $$F1 = 2 * \left[\frac{\text{Precision} \times \text{Recall}}{\text{Precision} + \text{Recall}}\right] \text{ where Precision} = \frac{\text{True Positives}}{\text{True Positives} + \text{False Positives}} \text{ and Recall} = \frac{\text{True Positives}}{\text{True Positives} + \text{False Negatives}}.$$

The computed values of the F1 score are shown in the tables 2300 and 2320.

As seen from the table 2300, the F1 score for the synthetic data 2 2315 (including the synthetic data produced by the proposed approach) is higher for all three models, indicating that the proposed approach outperforms the baseline GAN across all three models. As seen from the table 2320, the F1 score for the synthetic data 2 2315 (including the synthetic data produced by the proposed approach) is higher than the baseline GAN approach for two of the models, again indicating that the proposed approach is largely outperforming the baseline GAN. The F1 score for the real data 2305 could not be generated for the table 2320. Thus, the synthetic data produced using the proposed approach provides a high level of accuracy of predictions.

Turning to FIG. 24, an example table 2400 compares the bias in predictions made using synthetic data generated by the baseline GAN approach and the synthetic data generated by the proposed approach. In particular, four models (random forest, logistic regression model, support vector machine (SVM), and gradient boosting model) were each trained using a combination of real data and synthetic data produced by the proposed approach, as well as a combination of real data and synthetic data produced by the baseline GAN approach. The trained models were then used to make predictions on holdout data. Based on the predictions on the holdout data, a prediction bias parity score was computed for each prediction for a sensitive variable "race." The prediction bias parity score captures the bias in the predictions. Lower the prediction bias parity score, the lower the bias in prediction. The computed values of the prediction bias parity score are shown in the table 2400.

As seen from the table 2400, across all models, the proposed approach has a lower prediction bias parity score compared to the baseline GAN approach. Thus, the proposed approach outperforms (e.g., has less bias) the baseline GAN approach across all models.

Example 1

1. A non-transitory computer-readable medium comprising computer-readable instructions stored thereon that when executed by a processor cause the processor to: (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) execute the first trained machine learning model to generate a plurality of cluster centroids from the set of real data and the values of the first set of hyperparameters; (D) execute the second trained machine learning model to generate a plurality of synthetic data vectors based on the plurality of cluster centroids, the values of the second set of hyperparameters, and the set of real data; (E) combine the plurality of synthetic data vectors with the set of real data to obtain a plurality of combined data vectors arranged in a plurality of rows and a plurality of columns, wherein each row of the plurality of rows corresponds to one of the plurality of combined data vectors; (F) add a first binary label to each of the plurality of rows, the first binary label indicating whether a row of the plurality of rows comprises actual real data or actual synthetic data; (G) execute a third machine learning model to classify each of the plurality of combined data vectors using a second binary label, wherein the second binary label indicates whether each of the plurality of combined data vectors comprises predicted real data or predicted synthetic data; (H) compute an objective function value based on the first binary label and the second binary label; (I) determine whether the objective function value is optimal or not; (J) responsive to determining that the objective function value does not have an optimal value, update the values of the first set of hyperparameters and the values of the second set of hyperparameters and repeat (B)-(J), or responsive to determining that the objective function value is an optimal value, execute (K); and (K) output the plurality of synthetic data vectors as a set of synthetic data.
2. The non-transitory computer-readable medium of claim 1, wherein each of the first trained machine learning model and the second trained machine learning model is a generative machine learning model, and wherein an output from the first trained machine learning model is input into the second trained machine learning model.
3. The non-transitory computer-readable medium of claim 2, wherein the first trained machine learning model is a Gaussian Mixture Model, and the second trained machine learning model is a Generative Adversarial Network model.
4. The non-transitory computer-readable medium of claim 1, wherein the third machine learning model is a random forest model.
5. The non-transitory computer-readable medium of claim 1, wherein to compute the objective function value, the computer-readable instructions further cause the processor to: compute a loss function based on the first marginal probability distribution and the second marginal probability distribution; multiply the loss function with a negative 1 to obtain a similarity error function, wherein the similarity error function is indicative of a difference in the first marginal probability distribution and the second marginal probability distribution; and compute the objective function value from the similarity error function.

6. The non-transitory computer-readable medium of claim 5, wherein the computer-readable instructions further cause the processor to multiply the similarity error function with a scalar value to compute the objective function value.

7. The non-transitory computer-readable medium of claim 5, wherein the loss function comprises a cross-entropy loss function or a Bernoulli loss function.

8. The non-transitory computer-readable medium of claim 5, wherein the optimal value of the objective function value corresponds to a value in which the similarity error function is less than a threshold.

9. The non-transitory computer-readable medium of claim 1, wherein to combine the plurality of synthetic data vectors with the set of real data, the computer-readable instructions further cause the processor to: append the plurality of synthetic data vectors to the set of real data to obtain the plurality of combined data vectors; and shuffle the plurality of rows to obtain a plurality of shuffled rows of the plurality of combined data vectors.

10. The non-transitory computer-readable medium of claim 1, wherein to generate the values of the first set of hyperparameters and the values of the second set of hyperparameters, the computer-readable instructions further cause the processor to: generate a first set of candidate hyperparameter values and a second set of candidate hyperparameter values using Latin Hypercube Sampling; select a first subset of hyperparameter values from the first set of candidate hyperparameter values and select a second subset of hyperparameter values from the second set of candidate hyperparameter values using a genetic algorithm; and output the first subset of hyperparameter values as the values of the first set of hyperparameters and output the second subset of hyperparameter values as the values of the second set of hyperparameters.

11. The non-transitory computer-readable medium of claim 1, wherein the set of synthetic data is used to train a fourth machine learning model.

12. A system comprising: a memory having computer-readable instructions stored thereon; and a processor that executes the computer-readable instructions to: (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) execute the first trained machine learning model to generate a plurality of cluster centroids from the set of real data and the values of the first set of hyperparameters; (D) execute the second trained machine learning model to generate a plurality of synthetic data vectors based on the plurality of cluster centroids, the values of the second set of hyperparameters, and the set of real data; (E) combine the plurality of synthetic data vectors with the set of real data to obtain a plurality of combined data vectors arranged in a plurality of rows and a plurality of columns, wherein each row of the plurality of rows corresponds to one of the plurality of combined data vectors; (F) add a first binary label to each of the plurality of rows, the first binary label indicating whether a row of the plurality of rows comprises actual real data or actual synthetic data; (G) execute a third machine learning model to classify each of the plurality of combined data vectors using a second binary label, wherein the second binary label indicates whether each of the plurality of combined data vectors comprises predicted real data or predicted synthetic data; (H) compute an objective function value based on the first binary label and the second binary label; (I) determine whether the objective function value is optimal or not; (J) responsive to determining that the objective function value does not have an optimal value, update the values of the first set of hyperparameters and the values of the second set of hyperparameters and repeat (B)-(J), or responsive to determining that the objective function value is an optimal value, execute (K); and (K) output the plurality of synthetic data vectors as a set of synthetic data.

13. The system of claim 12, wherein each of the first trained machine learning model and the second trained machine learning model is a generative machine learning model, and wherein an output from the first trained machine learning model is input into the second trained machine learning model.

14. The system of claim 13, wherein the first trained machine learning model is a Gaussian Mixture Model, and the second trained machine learning model is a Generative Adversarial Network model.

15. The system of claim 12, wherein the third machine learning model is a random forest model.

16. The system of claim 12, wherein to compute the objective function value, the computer-readable instructions further cause the processor to: compute a loss function based on the first marginal probability distribution and the second marginal probability distribution; multiply the loss function with a negative 1 to obtain a similarity error function, wherein the similarity error function is indicative of a difference in the first marginal probability distribution and the second marginal probability distribution; and compute the objective function value from the similarity error function.

17. The system of claim 16, wherein the computer-readable instructions further cause the processor to multiply the similarity error function with a scalar value to obtain the objective function value.

18. The system of claim 16, wherein the loss function comprises a cross-entropy loss function or a Bernoulli loss function.

19. The system of claim 16, wherein the optimal value of the objective function value corresponds to a value in which the similarity error function is less than a threshold.

20. The system of claim 12, wherein to combine the plurality of synthetic data vectors with the set of real data, the computer-readable instructions further cause the processor to: append the plurality of synthetic data vectors to the set of real data to obtain the plurality of combined data vectors; and shuffle the plurality of rows to obtain a plurality of shuffled rows of the plurality of combined data vectors.

21. The system of claim 12, wherein to generate the values of the first set of hyperparameters and the values of the second set of hyperparameters, the computer-readable instructions further cause the processor to: generate a first set of candidate hyperparameter values and a second set of candidate hyperparameter values using Latin Hypercube Sampling; select a first subset of hyperparameter values from the first set of candidate hyperparameter values and select a second subset of hyperparameter values from the second set of candidate hyperparameter values using a genetic algorithm; and output the first subset of hyperparameter values as the values of the first set of hyperparameters and output the second subset of hyperparameter values as the values of the second set of hyperparameters.

22. The system of claim 12, wherein the set of synthetic data is used to train a fourth machine learning model.

23. A method comprising: (A) generating, by a processor executing computer-readable instruction stored on a memory, values of a first set of hyperparameters for a first trained machine learning model and values of a second set of hyperparameters for a second trained machine learning model; (B) inputting, by the processor, the values of the first set of hyperparameters and a set of real data into the first trained machine learning model and the values of the second set of hyperparameters and the set of real data into the second trained machine learning model; (C) executing, by the processor, the first trained machine learning model to generate a plurality of cluster centroids from the set of real data and the values of the first set of hyperparameters; (D) executing, by the processor, the second trained machine learning model to generate a plurality of synthetic data vectors based on the plurality of cluster centroids, the values of the second set of hyperparameters, and the set of real data; (E) combining, by the processor, the plurality of synthetic data vectors with the set of real data for obtaining a plurality of combined data vectors arranged in a plurality of rows and a plurality of columns, wherein each row of the plurality of rows corresponds to one of the plurality of combined data vectors; (F) adding, by the processor, a first binary label to each of the plurality of rows, the first binary label indicating whether a row of the plurality of rows comprises actual real data or actual synthetic data; (G) executing, by the processor, a third machine learning model to classify each of the plurality of combined data vectors using a second binary label, wherein the second binary label indicates whether each of the plurality of combined data vectors comprises predicted real data or predicted synthetic data; (H) computing, by the processor, an objective function value based on the first binary label and the second binary label; (I) determining, by the processor, whether the objective function value is optimal or not; (J) responsive to determining that the objective function value does not have an optimal value, updating, by the processor, the values of the first set of hyperparameters and the values of the second set of hyperparameters and repeat (B)-(J), or responsive to determining that the objective function value is an optimal value, executing, by the processor, (K); and (K) outputting, by the processor, the plurality of synthetic data vectors as a set of synthetic data.

24. The method of claim 23, wherein the first trained machine learning model is a Gaussian Mixture Model, the second trained machine learning model is a Generative Adversarial Network model, and the third machine learning model is a random forest model.

25. The method of claim 23, wherein to compute the objective function value, the method further comprises: computing, by the processor, a loss function based on the first marginal probability distribution and the second marginal probability distribution; multiplying, by the processor, the loss function with a negative 1 to obtain a similarity error function, wherein the similarity error function is indicative of a difference in the first marginal probability distribution and the second marginal probability distribution; and multiplying, by the processor, the similarity error function with a scalar value to obtain the objective function value.

26. The method of claim 25, wherein the loss function comprises a cross-entropy loss function or a Bernoulli loss function.

27. The method of claim 25, wherein the optimal value of the objective function value corresponds to a value in which the similarity error function is less than a threshold.

28. The method of claim 23, wherein to combine the plurality of synthetic data vectors with the set of real data, the method further comprises: appending, by the processor, the plurality of synthetic data vectors to the set of real data to obtain the plurality of combined data vectors; and shuffling, by the processor, the plurality of rows to obtain a plurality of shuffled rows of the plurality of combined data vectors.

29. The method of claim 23, wherein to generate the values of the first set of hyperparameters and the values of the second set of hyperparameters, the method further comprises: generating, by the processor, a first set of candidate hyperparameter values and a second set of candidate hyperparameter values using Latin Hypercube Sampling; selecting, by the processor, a first subset of hyperparameter values from the first set of candidate hyperparameter values and select a second subset of hyperparameter values from the second set of candidate hyperparameter values using a genetic algorithm; and outputting, by the processor, the first subset of hyperparameter values as the values of the first set of hyperparameters and output the second subset of hyperparameter values as the values of the second set of hyperparameters.

30. The method of claim 23, wherein the set of synthetic data is used to train a fourth machine learning model.

Example 2

1. A non-transitory computer-readable medium comprising computer-readable instructions stored thereon that when executed by a processor cause the processor to: (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) execute the first trained machine learning model to generate a plurality of cluster centroids from the set of real data and the values of the first set of hyperparameters; (D) execute the second trained machine learning model to generate a plurality of synthetic data vectors based on the plurality of cluster centroids, the values of the second set of hyperparameters, and the set of real data; (E) train a third machine learning model using the plurality of synthetic data vectors to predict a first target value; (F) input the set of real data into the third machine learning model that has been trained with the plurality of synthetic data vectors; (G) predict a second target value by the third machine learning model based on the set of real data; (H) compute an objective function value based on the first target value and the second target value; (I) determine whether the objective function value is optimal or not; (J) responsive to determining that the objective function value is not an optimal value, update the values of the first set of hyperparameters and the values of the second set of hyperparameters and repeat (B)-(J), or responsive to determining that the objective function value is an optimal value, execute (K); and (K) output the plurality of synthetic data vectors as a set of synthetic data.

2. The non-transitory computer-readable medium of claim 1, wherein each of the first trained machine learning model and the second trained machine learning model is a generative machine learning model, and wherein an output from the first trained machine learning model is input into the second trained machine learning model.

3. The non-transitory computer-readable medium of claim 2, wherein the first trained machine learning model is a Gaussian Mixture Model, and the second trained machine learning model is a Generative Adversarial Network model.

4. The non-transitory computer-readable medium of claim 1, wherein the third machine learning model is a random forest model.

5. The non-transitory computer-readable medium of claim 1, wherein to compute the objective function value, the computer-readable instructions further cause the processor to: compute a prediction error function as a loss function based on the first conditional probability distribution and the second conditional probability distribution, wherein the prediction error function is indicative of a difference in the first conditional probability distribution and the second conditional probability distribution; and multiply the prediction error function with a scalar value to obtain the objective function value.

6. The non-transitory computer-readable medium of claim 5, wherein the loss function comprises a cross-entropy loss function or a least squares estimation function.

7. The non-transitory computer-readable medium of claim 5, wherein the optimal value of the objective function value corresponds to a value in which the prediction error function is less than a threshold.

8. The non-transitory computer-readable medium of claim 1, wherein to generate the values of the first set of hyperparameters and the values of the second set of hyperparameters, the computer-readable instructions further cause the processor to: generate a first set of candidate hyperparameter values and a second set of candidate hyperparameter values using Latin Hypercube Sampling; select a first subset of hyperparameter values from the first set of candidate hyperparameter values and select a second subset of hyperparameter values from the second set of candidate hyperparameter values using a genetic algorithm; and output the first subset of hyperparameter values as the values of the first set of hyperparameters and output the second subset of hyperparameter values as the values of the second set of hyperparameters.

9. The non-transitory computer-readable medium of claim 1, wherein the set of synthetic data is used to train a fourth machine learning model.

10. A system comprising: a memory having computer-readable instructions stored thereon; and a processor that executes the computer-readable instructions to: (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) execute the first trained machine learning model to generate a plurality of cluster centroids from the set of real data and the values of the first set of hyperparameters; (D) execute the second trained machine learning model to generate a plurality of synthetic data vectors based on the plurality of cluster centroids, the values of the second set of hyperparameters, and the set of real data; (E) train a third machine learning model using the plurality of synthetic data vectors to predict a first target value; (F) input the set of real data into the third machine learning model that has been trained with the plurality of synthetic data vectors; (G) predict a second target value by the third machine learning model based on the set of real data; (H) compute an objective function value based on the first target value and the second target value; (I) determine whether the objective function value is optimal or not; (J) responsive to determining that the objective function value is not an optimal value, update the values of the first set of hyperparameters and the values of the second set of hyperparameters and repeat (B)-(J), or responsive to determining that the objective function value is an optimal value, execute (K); and (K) output the plurality of synthetic data vectors as a set of synthetic data.

11. The system of claim 10, wherein each of the first trained machine learning model and the second trained machine learning model is a generative machine learning model, and wherein an output from the first trained machine learning model is input into the second trained machine learning model.

12. The system of claim 11, wherein the first trained machine learning model is a Gaussian Mixture Model, and the second trained machine learning model is a Generative Adversarial Network model.

13. The system of claim 10, wherein the third machine learning model is a random forest model.

14. The system of claim 10, wherein to compute the objective function value, the computer-readable instructions further cause the processor to: compute a prediction error function as a loss function based on the first conditional probability distribution and the second conditional probability distribution, wherein the prediction error function is indicative of a difference in the first conditional probability distribution and the second conditional probability distribution; and multiply the prediction error function with a scalar value to obtain the objective function value.

15. The system of claim 14, wherein the loss function comprises a cross-entropy loss function or a least squares estimation function.

16. The system of claim 14, wherein the optimal value of the objective function value corresponds to a value in which the prediction error function is less than a threshold.

17. The system of claim 10, wherein to generate the values of the first set of hyperparameters and the values of the second set of hyperparameters, the computer-readable instructions further cause the processor to: generate a first set of candidate hyperparameter values and a second set of candidate hyperparameter values using Latin Hypercube Sampling; select a first subset of hyperparameter values from the first set of candidate hyperparameter values and select a second subset of hyperparameter values from the second set of candidate hyperparameter values using a genetic algorithm; and output the first subset of hyperparameter values as the values of the first set of hyperparameters and output the second subset of hyperparameter values as the values of the second set of hyperparameters.

18. The system of claim 10, wherein the set of synthetic data is used to train a fourth machine learning model.

19. A method comprising: (A) generating, by a processor executing computer-readable instruction stored on a memory, values of a first set of hyperparameters for a first trained machine learning model and values of a second set of hyperparameters for a second trained machine learning model; (B) inputting, by the processor, the values of the first set of hyperparameters and a set of real data into the first trained machine learning model and the values of the second set of hyperparameters and the set of real data into the second trained machine learning model; (C) executing, by the processor, the first trained machine learning model to generate a plurality of cluster centroids from the set of real data and the values of the first set of hyperparameters; (D) executing, by the processor, the second trained machine learning model to generate a plurality of synthetic data vectors based on the plurality of cluster centroids, the values of the second set of hyperparameters, and the set of real data; (E) training, by the processor, a third machine learning model using the plurality of synthetic data vectors to predict a first target value; (F) inputting, by the processor, the set of real data into the third machine learning model that has been trained with the plurality of synthetic data vectors; (G) predicting, by the processor, a second target value by the third machine learning model based on the set of real data; (H) computing, by the processor, an objective function value based on the first target value and the second target value; (I) determining, by the processor, whether the objective function value is optimal or not; (J) responsive to determining that the objective function value is not an optimal value, updating, by the processor, the values of the first set of hyperparameters and the values of the second set of hyperparameters and repeat (B)-(J), or responsive to determining that the objective function value is an optimal value, executing, by the processor, (K); and (K) outputting, by the processor, the plurality of synthetic data vectors as a set of synthetic data.

20. The method of claim 19, wherein each of the first trained machine learning model and the second trained machine learning model is a generative machine learning model, and wherein an output from the first trained machine learning model is input into the second trained machine learning model.

21. The method of claim 20, wherein the first trained machine learning model is a Gaussian Mixture Model, and the second trained machine learning model is a Generative Adversarial Network model.

22. The method of claim 19, wherein the third machine learning model is a random forest model.

23. The method of claim 19, wherein to compute the objective function value, the method further comprises: computing, by the processor, a prediction error function as a loss function based on the first conditional probability distribution and the second conditional probability distribution, wherein the prediction error function is indicative of a difference in the first conditional probability distribution and the second conditional probability distribution; and multiplying, by the processor, the prediction error function with a scalar value to obtain the objective function value.

24. The method of claim 23, wherein the loss function comprises a cross-entropy loss function or a least squares estimation function.

25. The method of claim 23, wherein the optimal value of the objective function value corresponds to a value in which the prediction error function is less than a threshold.

26. The method of claim 19, wherein to generate the values of the first set of hyperparameters and the values of the second set of hyperparameters, the method further comprises: generating, by the processor, a first set of candidate hyperparameter values and a second set of candidate hyperparameter values using Latin Hypercube Sampling; selecting, by the processor, a first subset of hyperparameter values from the first set of candidate hyperparameter values and select a second subset of hyperparameter values from the second set of candidate hyperparameter values using a genetic algorithm; and outputting, by the processor, the first subset of hyperparameter values as the values of the first set of hyperparameters and output the second subset of hyperparameter values as the values of the second set of hyperparameters.

27. The method of claim 19, wherein the set of synthetic data is used to train a fourth machine learning model.

Example 3

1. A non-transitory computer-readable medium comprising computer-readable instructions stored thereon that when executed by a processor cause the processor to: (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) execute the first trained machine learning model to generate a plurality of cluster centroids from the set of real data and the values of the first set of hyperparameters; (D) execute the second trained machine learning model to generate a plurality of synthetic data vectors based on the plurality of cluster centroids, the values of the second set of hyperparameters, and the set of real data; (E) train a third machine learning model using the plurality of synthetic data vectors to predict a first target value; (F) identify at least one sensitive variable from the plurality of synthetic data vectors; (G) compute one or more of a demographic parity value, a predictive parity value, an equal accuracy value, an equalized odds value, or an equal opportunity value for each of the at least one sensitive variable; (H) combine the computed one or more of the demographic parity value, the predictive parity value, the equalized odds value, or the equal opportunity value as the bias assessment error function, wherein the bias assessment error function is indicative of a bias in the first trained machine learning model or the second trained machine learning model; (I) compute an objective function value based on the bias assessment error function; (J) determine whether the objective function value is optimal or not; (K) responsive to determining that the objective function value is not an optimal value, update the values of the first set of hyperparameters and the values of the second set of hyperparameters and repeat (B)-(K), or responsive to determining that the objective function value is an optimal value, execute (L); and (L) output the plurality of synthetic data vectors as a set of synthetic data.

2. The non-transitory computer-readable medium of claim 1, wherein each of the first trained machine learning model and the second trained machine learning model is a generative machine learning model, and wherein an output from the first trained machine learning model is input into the second trained machine learning model.

3. The non-transitory computer-readable medium of claim 2, wherein the first trained machine learning model is a Gaussian Mixture Model, and the second trained machine learning model is a Generative Adversarial Network model.

4. The non-transitory computer-readable medium of claim 1, wherein the third machine learning model is a random forest model.

5. The non-transitory computer-readable medium of claim 1, wherein the computer-readable instructions further cause the processor to multiply the bias assessment error function with a scalar value to obtain the objective function value.

6. The non-transitory computer-readable medium of claim 1, wherein the optimal value of the objective function value corresponds to a value in which the bias assessment error function is less than a threshold.

7. The non-transitory computer-readable medium of claim 1, wherein to generate the values of the first set of hyperparameters and the values of the second set of hyperparameters, the computer-readable instructions further cause the processor to: generate a first set of candidate hyperparameter values and a second set of candidate hyperparameter values using Latin Hypercube Sampling; select a first subset of hyperparameter values from the first set of candidate hyperparameter values and select a second subset of hyperparameter values from the second set of candidate hyperparameter values using a genetic algorithm; and output the first subset of hyperparameter values as the values of the first set of hyperparameters and output the second subset of hyperparameter values as the values of the second set of hyperparameters.

8. The non-transitory computer-readable medium of claim 1, wherein the set of synthetic data is used to train a fourth machine learning model.

9. The non-transitory computer-readable medium of claim 1, wherein the computer-readable instructions further cause the processor to compute an average of the computed one or more of the demographic parity value, the predictive parity value, the equalized odds value, and the equal opportunity value to compute the bias assessment error function.

10. A system comprising: a memory having computer-readable instructions stored thereon; and a processor that executes the computer-readable instructions to: (A) generate values of a first set of hyperparameters for a first trained machine learning model and values of a second set of hyperparameters for a second trained machine learning model; (B) input the values of the first set of hyperparameters and a set of real data into the first trained machine learning model and the values of the second set of hyperparameters and the set of real data into the second trained machine learning model; (C) execute the first trained machine learning model to generate a plurality of cluster centroids from the set of real data and the values of the first set of hyperparameters; (D) execute the second trained machine learning model to generate a plurality of synthetic data vectors based on the plurality of cluster centroids, the values of the second set of hyperparameters, and the set of real data; (E) train a third machine learning model using the plurality of synthetic data vectors to predict a first target value; (F) identify at least one sensitive variable from the plurality of synthetic data vectors; (G) compute one or more of a demographic parity value, a predictive parity value, an equal accuracy value, an equalized odds value, or an equal opportunity value for each of the at least one sensitive variable; (H) combine the computed one or more of the demographic parity value, the predictive parity value, the equalized odds value, or the equal opportunity value as the bias assessment error function, wherein the bias assessment error function is indicative of a bias in the first trained machine learning model or the second trained machine learning model; (I) compute an objective function value based on the bias assessment error function; (J) determine whether the objective function value is optimal or not; (K) responsive to determining that the objective function value is not an optimal value, update the values of the first set of hyperparameters and the values of the second set of hyperparameters and repeat (B)-(K), or responsive to determining that the objective function value is an optimal value, execute (L); and (L) output the plurality of synthetic data vectors as a set of synthetic data.

11. The system of claim 10, wherein each of the first trained machine learning model and the second trained machine learning model is a generative machine learning model, and wherein an output from the first trained machine learning model is input into the second trained machine learning model.

12. The system of claim 11, wherein the first trained machine learning model is a Gaussian Mixture Model, and the second trained machine learning model is a Generative Adversarial Network model.

13. The system of claim 10, wherein the third machine learning model is a random forest model.

14. The system of claim 10, wherein the computer-readable instructions further cause the processor to multiply the bias assessment error function with a scalar value to obtain the objective function value.

15. The system of claim 10, wherein the optimal value of the objective function value corresponds to a value in which the bias assessment error function is less than a threshold.

16. The system of claim 10, wherein to generate the values of the first set of hyperparameters and the values of the second set of hyperparameters, the computer-readable instructions further cause the processor to: generate a first set of candidate hyperparameter values and a second set of candidate hyperparameter values using Latin Hypercube Sampling; select a first subset of hyperparameter values from the first set of candidate hyperparameter values and select a second subset of hyperparameter values from the second set of candidate hyperparameter values using a genetic algorithm; and output the first subset of hyperparameter values as the values of the first set of hyperparameters and output the second subset of hyperparameter values as the values of the second set of hyperparameters.

17. The system of claim 10, wherein the set of synthetic data is used to train a fourth machine learning model.

18. The system of claim 10, wherein the computer-readable instructions further cause the processor to compute an average of the computed one or more of the demographic parity value, the predictive parity value, the equalized odds value, and the equal opportunity value to compute the bias assessment error function.

19. A method comprising: (A) generating, by a processor executing computer-readable instruction stored on a memory, values of a first set of hyperparameters for a first trained machine learning model and values of a second set of hyperparameters for a second trained machine learning model; (B) inputting, by the processor, the values of the first set of hyperparameters and a set of real data into the first trained machine learning model and the values of the second set of hyperparameters and the set of real data into the second trained machine learning model; (C) executing, by the processor, the first trained machine learning model to generate a plurality of cluster centroids from the set of real data and the values of the first set of hyperparameters; (D) executing, by the processor, the second trained machine learning model to generate a plurality of synthetic data vectors based on the plurality of cluster centroids, the values of the second set of hyperparameters, and the set of real data; (E) training, by the processor, a third machine learning model using the plurality of synthetic data vectors to predict a first target value; (F) identifying, by the processor, at least one sensitive variable from the plurality of synthetic data vectors; (G) compute one or more of a demographic parity value, a predictive parity value, an equal accuracy value, an equalized odds value, or an equal opportunity value for each of the at least one sensitive variable; (H) combining, by the processor, the computed one or more of the demographic parity value, the predictive parity value, the equalized odds value, or the equal opportunity value as the bias assessment error function, wherein the bias assessment error function is indicative of a bias in the first trained machine learning model or the second trained machine learning model; (I) computing, by the processor, an objective function value based on the bias assessment error function; (J) determining, by the processor, whether the objective function value is optimal or not; (K) responsive to determining that the objective function value is not an optimal value, updating, by the processor, the values of the first set of hyperparameters and the values of the second set of hyperparameters and repeat (B)-(K), or responsive to determining that the objective function value is an optimal value, executing, by the processor, (L); and (L) outputting, by the processor, the plurality of synthetic data vectors as a set of synthetic data.

20. The method of claim 19, wherein each of the first trained machine learning model and the second trained machine learning model is a generative machine learning model, and wherein an output from the first trained machine learning model is input into the second trained machine learning model.

21. The method of claim 20, wherein the first trained machine learning model is a Gaussian Mixture Model, and the second trained machine learning model is a Generative Adversarial Network model.

22. The method of claim 19, wherein the third machine learning model is a random forest model.

23. The method of claim 19, further comprising multiplying, by the processor, the bias assessment error function with a scalar value to obtain the objective function value.

24. The method of claim 19, wherein the optimal value of the objective function value corresponds to a value in which the bias assessment error function is less than a threshold.

25. The method of claim 19, wherein to generate the values of the first set of hyperparameters and the values of the second set of hyperparameters, the method further comprises: generating, by the processor, a first set of candidate hyperparameter values and a second set of candidate hyperparameter values using Latin Hypercube Sampling; selecting, by the processor, a first subset of hyperparameter values from the first set of candidate hyperparameter values and select a second subset of hyperparameter values from the second set of candidate hyperparameter values using a genetic algorithm; and outputting, by the processor, the first subset of hyperparameter values as the values of the first set of hyperparameters and output the second subset of hyperparameter values as the values of the second set of hyperparameters.

26. The method of claim 19, wherein the set of synthetic data is used to train a fourth machine learning model.

27. The method of claim 19, further comprising computing, by the processor, an average of the computed one or more of the demographic parity value, the predictive parity value, the equalized odds value, and the equal opportunity value to compute the bias assessment error function.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A computer-implemented method for coordinated multi-staged training of one or more artificial neural networks for synthetic data generation comprising:

initializing one or more training configurations for training a first generative artificial neural network (ANN) using an input of a first set of hyperparameters;

training, by a processing circuit executing the one or more training configurations for the first generative ANN, the first generative ANN to generate cluster centroids using an input of a non-synthetic training set comprising non-synthetic data samples;

in response to training the first generative ANN, generating, by the processing circuit executing the first generative ANN, a plurality of cluster centroids associated with the non-synthetic data samples;

initializing one or more training configurations for training a second generative ANN using an input of a second set of hyperparameters;

training, by the processing circuit executing the one or more training configurations for the second generative ANN, the second generative ANN to generate synthetic data samples using (a) an input of the non-synthetic training set and (b) an input of the plurality of cluster centroids generated by the first generative ANN;

in response to training the second generative ANN, generating, by the processing circuit executing the second generative ANN, a plurality of synthetic data samples;

accessing, by a plurality of model adjudicators, the plurality of synthetic data samples and the non-synthetic data samples, wherein the plurality of model adjudicators are arranged in a control path between the first and second generative ANNs and a hyperparameter generation circuit;

generating, by the plurality of model adjudicators, a feedback control signal based on an evaluation of the plurality of synthetic data samples relative to the non-synthetic data samples, wherein the evaluation comprises at least one of a marginal distribution similarity, a conditional prediction error, or a bias metric;

determining, by the plurality of model adjudicators, a multi-stage objective performance metric based on the evaluation and representing convergence of the first generative ANN and the second generative ANN;

controlling, by a training control circuit, a continuation or a termination of the coordinated multi-stage training based on the multi-stage objective performance metric; and when the multi-stage objective performance metric fails to satisfy one or more training thresholds, using the multi-stage objective performance metric to control a hyperparameter search operation of a hyperparameter generation circuit for tuning the first set of hyperparameters and the second set of hyperparameters, using the feedback control signal to initiate and control a hyperparameter search operation of a hyperparameter generation circuit, including automatically tuning the first set of hyperparameters and the second set of hyperparameters and retraining the first generative ANN and the second generative ANN using updated hyperparameters.

2. A system for coordinated multi-staged training of generative artificial neural networks for synthetic data generation, comprising:

a database storing non-synthetic data samples;

a memory storing computer-executable instructions; and one or more processing circuits configured to execute the computer-executable instructions to perform operations comprising:

initializing, by a hyperparameter generation circuit, one or more training configurations for training a first generative artificial neural network (ANN) using an input of a first set of hyperparameters;

training, by the one or more processing circuits executing the one or more training configurations for the first generative ANN, the first generative ANN to generate cluster centroids using an input of a non-synthetic training set comprising non-synthetic data samples retrieved from the database;

in response to training the first generative ANN, generating, by the one or more processing circuits executing the first generative ANN, a plurality of cluster centroids associated with the non-synthetic data samples;

initializing, by the hyperparameter generation circuit, one or more training configurations for training a second generative ANN using an input of a second set of hyperparameters;

training, by the one or more processing circuits executing the one or more training configurations for the second generative ANN, the second generative ANN to generate synthetic data samples using (a) an input of the non-synthetic training set and (b) an input of the plurality of cluster centroids generated by the first generative ANN;

in response to training the second generative ANN, generating, by the one or more processing circuits executing the second generative ANN, a plurality of synthetic data samples;

accessing, by a plurality of model adjudicators, the plurality of synthetic data samples and the non-synthetic data samples, wherein the plurality of model adjudicators are interposed within a control path between the first and second generative ANNs and the hyperparameter generation circuit;

generating, by the plurality of model adjudicators, a feedback control signal based on an evaluation of the plurality of synthetic data samples relative to the non-synthetic data samples, wherein the evaluation comprises at least one of a marginal distribution similarity, a conditional prediction error, or a bias metric;

determining a multi-stage objective performance metric based on the evaluation and representing convergence of the first generative ANN and the second generative ANN;

controlling, by a training control circuit, a continuation or a termination of the coordinated multi-stage training based on the multi-stage objective performance metric; and when the multi-stage objective performance metric fails to satisfy one or more training thresholds, using the multi-stage objective performance metric to control a hyperparameter search operation of a hyperparameter generation circuit for tuning the first set of hyperparameters and the second set of hyperparameters, using the feedback control signal to control a hyperparameter search operation of the hyperparameter generation circuit, including generating updated hyperparameters and retraining the first generative ANN and the second generative ANN using the updated hyperparameters.

3. The computer-implemented method of claim 1, wherein each of the first generative artificial neural network and the second generative artificial neural network comprises a generative machine learning model, and wherein an output of the first generative artificial neural network is provided as an input to the second generative artificial neural network.

4. The computer-implemented method of claim 3, wherein the first generative artificial neural network comprises a Gaussian Mixture Model and the second generative artificial neural network comprises a Generative Adversarial Network.

5. The computer-implemented method of claim 1, wherein at least one of the plurality of model adjudicators comprises a random forest model.

6. The computer-implemented method of claim 1, wherein the plurality of model adjudicators comprise:

a first adjudicator configured to generate the marginal distribution similarity; and a second adjudicator configured to generate the conditional prediction error and the bias metric.

7. The computer-implemented method of claim 1, wherein generating the marginal distribution similarity comprises:

combining the plurality of synthetic data samples with the non-synthetic data samples to obtain a plurality of combined data samples;

randomizing an ordering of the plurality of combined data samples;

associating a first classification identifier with each of the plurality of combined data samples, the first classification identifier indicating whether a corresponding combined data sample comprises a non-synthetic data sample or a synthetic data sample;

inputting the plurality of combined data samples into at least one of the plurality of model adjudicators;

classifying, by the at least one model adjudicator, each of the plurality of combined data samples as corresponding to either a synthetic data sample or a non-synthetic data sample;

computing a classification loss based on differences between the first classification identifiers and classifications generated by the at least one model adjudicator; and determining the marginal distribution similarity based on the computed classification loss.

8. The computer-implemented method of claim 1, wherein generating the conditional prediction error comprises:

training at least one of the plurality of model adjudicators using the plurality of synthetic data samples to predict one or more target values;

applying the trained model adjudicator to the non-synthetic data samples to generate corresponding predicted target values;

comparing the predicted target values generated from the non-synthetic data samples with target values learned from the plurality of synthetic data samples; and determining the conditional prediction error based on the comparison.

9. The computer-implemented method of claim 1, wherein generating the bias metric comprises computing one or more of:

demographic parity,
predictive parity,
equal accuracy,
equalized odds, and
equal opportunity.

10. The computer-implemented method of claim 1, wherein the one or more training thresholds comprise:

a first threshold associated with the marginal distribution similarity;

a second threshold associated with the conditional prediction error; and a third threshold associated with the bias metric.

11. The computer-implemented method of claim 1, wherein the multi-stage objective performance metric comprises a weighted combination of:

the marginal distribution similarity, the conditional prediction error, and the bias metric.

12. The computer-implemented method of claim 10, wherein controlling continuation or termination of the coordinated multi-stage training comprises comparing the weighted combination against a predetermined threshold.

13. The system of claim 2, wherein each of the first generative artificial neural network and the second generative artificial neural network comprises a generative machine learning model, and wherein an output of the first generative artificial neural network is provided as an input to the second generative artificial neural network.

14. The system of claim 13, wherein the first generative artificial neural network comprises a Gaussian Mixture Model and the second generative artificial neural network comprises a Generative Adversarial Network.

15. The system of claim 2, wherein at least one of the plurality of model adjudicators comprises a random forest model.

16. The system of claim 2, wherein the plurality of model adjudicators comprise:

a first adjudicator configured to generate the marginal distribution similarity; and a second adjudicator configured to generate the conditional prediction error and the bias metric.

17. The system of claim 2, wherein generating the marginal distribution similarity comprises:

combining the plurality of synthetic data samples with the non-synthetic data samples to obtain a plurality of combined data samples;

randomizing an ordering of the plurality of combined data samples;

associating a first classification identifier with each of the plurality of combined data samples, the first classification identifier indicating whether a corresponding combined data sample comprises a non-synthetic data sample or a synthetic data sample;

inputting the plurality of combined data samples into at least one of the plurality of model adjudicators;

classifying, by the at least one model adjudicator, each of the plurality of combined data samples as corresponding to either a synthetic data sample or a non-synthetic data sample;

computing a classification loss based on differences between the first classification identifiers and classifications generated by the at least one model adjudicator; and determining the marginal distribution similarity based on the computed classification loss.

18. The system of claim 2, wherein generating the conditional prediction error comprises:

training at least one of the plurality of model adjudicators using the plurality of synthetic data samples to predict one or more target values;

applying the trained model adjudicator to the non-synthetic data samples to generate corresponding predicted target values;

comparing the predicted target values generated from the non-synthetic data samples with target values learned from the plurality of synthetic data samples; and determining the conditional prediction error based on the comparison.

19. The system of claim 2, wherein generating the bias metric comprises computing one or more of:

demographic parity, predictive parity, equal accuracy, equalized odds, and equal opportunity.

20. The system of claim 2, wherein the one or more training thresholds comprise:

a first threshold associated with the marginal distribution similarity;

a second threshold associated with the conditional prediction error; and a third threshold associated with the bias metric.

21. The system of claim 2, wherein the multi-stage objective performance metric comprises a weighted combination of:

the marginal distribution similarity, the conditional prediction error, and the bias metric.

22. The computer-implemented method of claim 20, wherein controlling continuation or termination of the coordinated multi-stage training comprises comparing the weighted combination against a predetermined threshold.

* * * * *